US012553989B2

(12) United States Patent
Fuke et al.

(10) Patent No.: US 12,553,989 B2
(45) Date of Patent: Feb. 17, 2026

(54) RADIO WAVE SCATTERING BODY, AND MEMBER FOR ATTENUATING RADIO WAVES COMPRISING RADIO WAVE SCATTERING BODY

(71) Applicant: NITTO DENKO CORPORATION, Ibaraki (JP)

(72) Inventors: Kazuhiro Fuke, Ibaraki (JP); Takehiro Ui, Ibaraki (JP); Yuya Matsuzaki, Ibaraki (JP); Kyohei Akiyama, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 298 days.

(21) Appl. No.: 18/269,424

(22) PCT Filed: Dec. 24, 2021

(86) PCT No.: PCT/JP2021/048345
§ 371 (c)(1),
(2) Date: Jun. 23, 2023

(87) PCT Pub. No.: WO2022/138947
PCT Pub. Date: Jun. 30, 2022

(65) Prior Publication Data
US 2024/0069154 A1 Feb. 29, 2024

(30) Foreign Application Priority Data

Dec. 25, 2020 (JP) .................................. 2020-217603
Dec. 23, 2021 (JP) .................................. 2021-209526

(51) Int. Cl.
*G01S 7/03* (2006.01)
*H01Q 1/42* (2006.01)
*H01Q 17/00* (2006.01)

(52) U.S. Cl.
CPC ................ *G01S 7/03* (2013.01); *H01Q 1/42* (2013.01); *H01Q 17/00* (2013.01)

(58) Field of Classification Search
CPC ........ H01Q 17/008; H01Q 1/42; H01Q 17/00; H05K 9/0081; G01S 7/027
See application file for complete search history.

(56) References Cited

U.S. PATENT DOCUMENTS 5,017,939 A * 5/1991 Wu ........................ H01Q 15/02
343/753
8,847,835 B2 * 9/2014 Kuhne ................... H01Q 13/28
343/781 R (Continued)

FOREIGN PATENT DOCUMENTS

| CN | 101014890 A | 8/2007 |
| CN | 107209304 A | 9/2017 |

(Continued)

OTHER PUBLICATIONS

International Search Report issued on Mar. 15, 2022, for corresponding International Patent Application No. PCT/JP2021/048345, along with an English translation (5 pages).

(Continued)

*Primary Examiner* — Peter M Bythrow
(74) *Attorney, Agent, or Firm* — HAUPTMAN HAM, LLP

(57) ABSTRACT

The present invention provides a member which, with a novel configuration, can transmit and attenuate incident radio waves, without the need for mixing a radio wave absorption material for example a dielectric loss material such as carbon particles or a magnetic loss material such as an iron oxide powder, or incorporating a scattering body. Provided is a radio wave scattering body that is characterized by being configured to transmit at least a portion of incident radio waves and to emit the transmitted radio waves (Continued)

in a scattering state, and comprising a resin composition in which a resin is a main component.

20 Claims, 23 Drawing Sheets

(56) References Cited

U.S. PATENT DOCUMENTS

| | | | | |
|---|---|---|---|---|
| 11,353,546 | B2* | 6/2022 | Sakai | H01Q 1/3233 |
| 2005/0134959 | A1* | 6/2005 | Simpson | H05K 9/0096 |
| | | | | 359/359 |
| 2007/0147767 | A1 | 6/2007 | Nonaka et al. | |
| 2011/0273356 | A1* | 11/2011 | Kawaguchi | H01Q 1/44 |
| | | | | 204/192.27 |
| 2014/0062114 | A1* | 3/2014 | Gaboury | B60R 13/005 |
| | | | | 296/1.08 |
| 2014/0070982 | A1* | 3/2014 | Inada | B60R 19/483 |
| | | | | 342/385 |
| 2015/0027771 | A1* | 1/2015 | Kagawa | H01Q 17/00 |
| | | | | 174/350 |
| 2016/0031568 | A1* | 2/2016 | Yokoi | H01Q 1/50 |
| | | | | 244/1 A |
| 2016/0268693 | A1* | 9/2016 | Ding | H01Q 1/526 |
| 2016/0344095 | A1* | 11/2016 | Tagi | H01Q 1/3233 |
| 2017/0057424 | A1* | 3/2017 | Yamada | G01S 13/931 |
| 2017/0168137 | A1* | 6/2017 | Cho | G01S 13/931 |
| 2017/0318239 | A1 | 11/2017 | Miyasaka | |
| 2019/0165462 | A1* | 5/2019 | Shiozaki | H01Q 15/14 |
| 2019/0280372 | A1* | 9/2019 | Terashita | H01Q 1/22 |
| 2019/0288383 | A1* | 9/2019 | Shiozaki | H01Q 1/42 |
| 2019/0356046 | A1* | 11/2019 | Mayer Pujadas | B60Q 1/0011 |
| 2020/0116332 | A1* | 4/2020 | Ukei | H01Q 1/22 |
| 2020/0124701 | A1* | 4/2020 | Takahashi | G01S 17/931 |
| 2020/0295452 | A1 | 9/2020 | Yamada et al. | |
| 2020/0371203 | A1* | 11/2020 | Hirotani | B60R 13/005 |
| 2021/0120709 | A1* | 4/2021 | Watanabe | H05K 1/0218 |
| 2022/0163632 | A1* | 5/2022 | Kobayashi | G01S 7/4047 |
| 2022/0404539 | A1* | 12/2022 | Bajec Strle | G02B 6/0035 |
| 2023/0042017 | A1* | 2/2023 | Fujita | B32B 7/025 |
| 2023/0243961 | A1* | 8/2023 | Renaud | H01Q 1/3233 |
| | | | | 342/455 |
| 2023/0413499 | A1* | 12/2023 | Matsuzaki | H01Q 1/526 |
| 2024/0098951 | A1* | 3/2024 | Ui | H01Q 1/3233 |
| 2024/0164073 | A1* | 5/2024 | Matsuzaki | H01Q 17/008 |
| 2024/0373607 | A1* | 11/2024 | Matsuzaki | H05K 9/00 |
| 2024/0380106 | A1* | 11/2024 | Ui | H05K 9/0081 |
| 2025/0046990 | A1* | 2/2025 | Ui | H01Q 15/0013 |
| 2025/0105525 | A1* | 3/2025 | Nomoto | H01Q 15/0013 |

FOREIGN PATENT DOCUMENTS

| | | |
|---|---|---|
| CN | 111344902 A | 6/2020 |
| JP | 2001-230587 A | 8/2001 |
| JP | 2002-164688 A | 6/2002 |
| JP | 2004-153135 A | 5/2004 |
| JP | 2009-124485 A | 6/2009 |
| JP | 2010-188987 A | 9/2010 |
| JP | 4872886 B2 | 2/2012 |
| JP | 5696781 B2 | 4/2015 |
| JP | 2015-200512 A | 11/2015 |
| JP | 2020-60506 A | 4/2020 |

OTHER PUBLICATIONS

Written Opinion issued on Mar. 15, 2022, for corresponding International Patent Application No. PCT/JP2021/048345 (4 pages).
Office Action issued on Feb. 7, 2022, for corresponding Japanese Patent Application No. 2021-209526, along with an English translation (15 pages).
Office Action issued on Apr. 4, 2022, for corresponding Japanese Patent Application No. 2021-209526, along with an English translation (7 pages).
Office Action issued on Aug. 21, 2025, for corresponding Korean Patent Application No. 10-2023-7021055, along with an English machine translation (14 pages).
The Extended European Search Report issued on May 15, 2024 for corresponding European Patent Application No. 21911084.8 (10 pages).
Search Report issued on Dec. 25, 2025 for corresponding Chinese Patent Application No. 202180087367X (3 pages).

* cited by examiner

RADIO WAVE SCATTERING BODY, AND MEMBER FOR ATTENUATING RADIO WAVES COMPRISING RADIO WAVE SCATTERING BODY

CROSS REFERENCE TO RELATED APPLICATION

This application is a National Stage of International Application No. PCT/JP2021/048345, filed on Dec. 24, 2021, which designates the United States and was published in Japan, and which is based upon and claims priority to Japanese Patent Application No. 2020-217603, filed on Dec. 25, 2020 and Japanese Patent Application No. 2021-209526, filed on Dec. 23, 2021 in the Japan Patent Office. All of the aforementioned applications are hereby incorporated by reference in their entireties.

TECHNICAL FIELD

The present invention relates to a radio wave scattering body for attenuating incident radio waves and a member for attenuating radio waves including the radio wave scattering body.

BACKGROUND ART

Recently, information detection means using radio waves (especially millimeter waves) as information communication media have been studied in the fields including automobiles, home appliances, and life sciences. For example, in the automotive technology field, there are collision prevention systems that detect obstacles by a radar using radio waves at a frequency of from 24 to 81 GHz to automatically apply the brakes or measure the speed and distance between vehicles of surrounding vehicles to control the speed of the own vehicle and distance between vehicles, for example. For the appropriate operation of systems such as the collision prevention systems, it is important to minimize the reception of unnecessary radio waves (noise) to prevent misidentification.

FIG. 1 shows an installation example of a radar used in such a collision prevention system, in which a radar 36 and a cover member 31 for the radar 36 are arranged in a bumper 38 of a vehicle. The radar 36 is attached so as to be surrounded by a side peripheral wall 34 of the cover member 31. Radio waves 61 emitted from the radar 36 are ordinarily transmitted through the bumper 38, but are sometimes reflected on the bumper 38 (including multiple reflection) to reach the radar 36 or the vicinity of the radar 36 (radio wave 62). This sometimes causes malfunctions of the radar.

To prevent such malfunctions, a technique for preventing malfunctions of the radar 36 is proposed in which a radio wave absorber is provided on a surface of the cover member 31 to absorb and eliminate unnecessary radio waves, suppressing the amount of radio waves 62 reaching the radar 36. As the radio wave absorber, a radio wave absorber in which carbon particles absorbing radio waves are mixed is proposed for example, as shown in Patent Literature 1 described below. In addition, a radio wave absorber in which a scattering body for scattering radio waves is incorporated is proposed for example, as shown in Patent Literature 2 described below. Patent literature 2 also describes many recess portions formed on a radio wave incident surface, but this is on the assumption that a scattering body is contained in the scattering body.

In addition, a technique in which a member having a surface in a shape of irregularly reflecting incident radio waves is provided on a reflection point and/or in a necessary portion of a shield plate of the bumper 38 to disperse the energy of reflection waves is also proposed in order to suppress radio waves reflected on the bumper 38 from strengthening in a specific direction. (See Patent Literature 3 described below.)

CITATION LIST

Patent Literature

Patent Literature 1: JP 2001230587 A
Patent Literature 2: JP 2004153135 A
Patent Literature 3: JP 5696781 B2

SUMMARY OF INVENTION

Technical Problem

However, the radio wave absorber shown in Patent Literature 1 is expensive due to carbon particles mixed therein, and due to the large weight of carbon particles to be mixed, the weight of a radio wave absorber increases.

The radio wave absorber shown in Patent Literature 2 is expensive due to a scattering body (i.e., a second dielectric material) incorporated therein, and it is also necessary to devise the distribution of the scattering body in a dispersed manner in the radio wave absorber.

The present inventors found that a member made solely of a resin composition that transmits incident radio waves can scatter radio waves emitted from the member by devising the shape of the member, and thereby the strength of emitted radio waves per unit area can be attenuated. In other words, the inventors found that incident radio waves can be attenuated without the necessity of mixing dielectric loss materials such as carbon particles or magnetic loss materials such as iron oxide powders, or incorporating scattering bodies in a resin composition which transmits incident radio waves and that incident radio waves can be attenuated by a configuration differing from that of irregularly reflecting incident radio waves. FIG. 2 is a schematic view showing the scattering of emitted radio waves by such a novel configuration.

One of the objects of the present invention is to provide a member that can transmit and attenuate incident radio waves by a novel configuration, without the necessity of mixing dielectric loss materials such as carbon particles or magnetic loss materials such as iron oxide powders, or incorporating scattering bodies in the member.

Solution to Problem

According to an embodiment of the present invention, a radio wave scattering body is provided, the radio wave scattering body configured to transmit at least a portion of incident radio waves and to emit the transmitted radio waves in a scattering state and made of a resin composition in which a resin is a main component.

The resin composition can transmit at least 20% of incident radio waves being perpendicular to a flat plate with a thickness of 3 mm made of the resin composition.

The radio wave scattering body may have at least two surfaces, one of the surfaces constituting a radio wave incident surface and the other constituting an emission surface, in which a structure section causing radio wave scattering is formed on at least one of the two surfaces.

The structure section may be constituted of at least one projection and/or a hole.

The radio wave scattering body may be the one in which when the wavelength of an incident radio wave is λ, the height of the projection is 0.26λ or greater, the width of the projection is 0.12λ or greater, and the interval between the projections is 5.1λ or less, and/or the depth of the hole is 0.26λ or greater, the width of the hole is 5.1λ or less, and the interval between the holes is 0.12λ or greater.

The resin composition may have a complex relative dielectric constant and the imaginary part ε" of the relative dielectric constant is 0.1 or less at any one of frequencies of from 10 to 300 GHz.

The resin composition may have a relative dielectric constant with a real part ε' of 2 or greater and 4 or less at any one of frequencies of from 10 to 300 GHz.

According to an embodiment of the present invention, a member for attenuating radio waves including the radio wave scattering body is provided.

The member for attenuating radio waves may be a molded body and the radio wave scattering body may be formed on at least a portion of the molded body.

The member for attenuating radio waves may be a cover member for a radar.

According to an embodiment of the present invention, a radar assembly in which a radar is attached to the cover member for a radar is provided.

According to an embodiment of the present invention, a bumper including the member for attenuating radio waves is provided.

According to an embodiment of the present invention, a vehicle having the member, the radar assembly, and/or the bumper is provided.

As described above, a technique for absorbing (attenuating) unnecessary radio waves has conventionally existed. According to the technique described in Patent Literature 1, a radio wave loss material is positively incorporated into a resin layer where radio waves are incident, to absorb (attenuate) unnecessary radio waves with the radio wave loss material. According to the technique described in Patent Literature 2, a scattering body (such as air) for scattering radio waves is included in a resin layer where radio waves are incident to cause internal scattering in the resin layer, and thereby unnecessary radio waves are absorbed (attenuated). According to the technique described in Patent Literature 3, the irregular reflection of incident radio waves is positively caused to attenuate radio waves, or an angle of a reflected wave relative to an incident wave is changed by reflection, and thereby unnecessary radio waves are suppressed.

In view of the above, the technique of scattering radio waves transmitted through a resin layer to attenuate the radio waves according to the present invention is deemed to be different from the conventionally known techniques described in Patent Literature 1 to Patent Literature 3.

Advantageous Effects of Invention

According to the present invention, a member that can attenuate incident radio waves by a novel configuration, without the necessity of mixing dielectric loss materials such as carbon particles or magnetic loss materials such as iron oxide powders, or incorporating scattering bodies can be provided.

Embodiments of radio wave scattering bodies according to the present invention are described in detail by referring to drawings below.

DESCRIPTION OF EMBODIMENTS

Radio Wave Scattering Body

A radio wave scattering body according to the present invention is configured to transmit at least a portion of incident radio waves and to emit the transmitted radio waves in a scattering state, and made of a resin composition in which a resin is a main component.

With respect to the radio wave scattering body according to the present invention, the resin composition transmits at least 50% of incident radio waves perpendicular to a flat plate with a thickness of 3 mm made of the resin composition. The transmittance is preferably 65% or greater, more preferably 85% or greater. At least employing such a preferred transmittance eliminates the necessity for the addition of materials such as dielectric loss materials, allowing for weight reduction or low-cost production. The transmittance of the radio wave scattering body is defined by a transmittance of an incident radio wave perpendicular to a flat plate with a thickness of 3 mm made of the resin composition constituting the radio wave scattering body, for the following reasons. One of the reasons is that the ratio of the total incident electric power to the total emitted electric power varies in accordance with the shape of the radio wave scattering body. The other reason is the difficulty in measuring the total emitted electric power. According to the present invention, radio waves emitted from a member are scattered by devising the shape thereof, even though it is composed solely of a resin composition transmitting incident radio waves, as described above. Thus, it is reasonable to define the property by a transmittance of the member made of the resin composition in a flat-plate shape that is a representative shape which does not cause the scattering of emitted radio waves.

Figure 3:
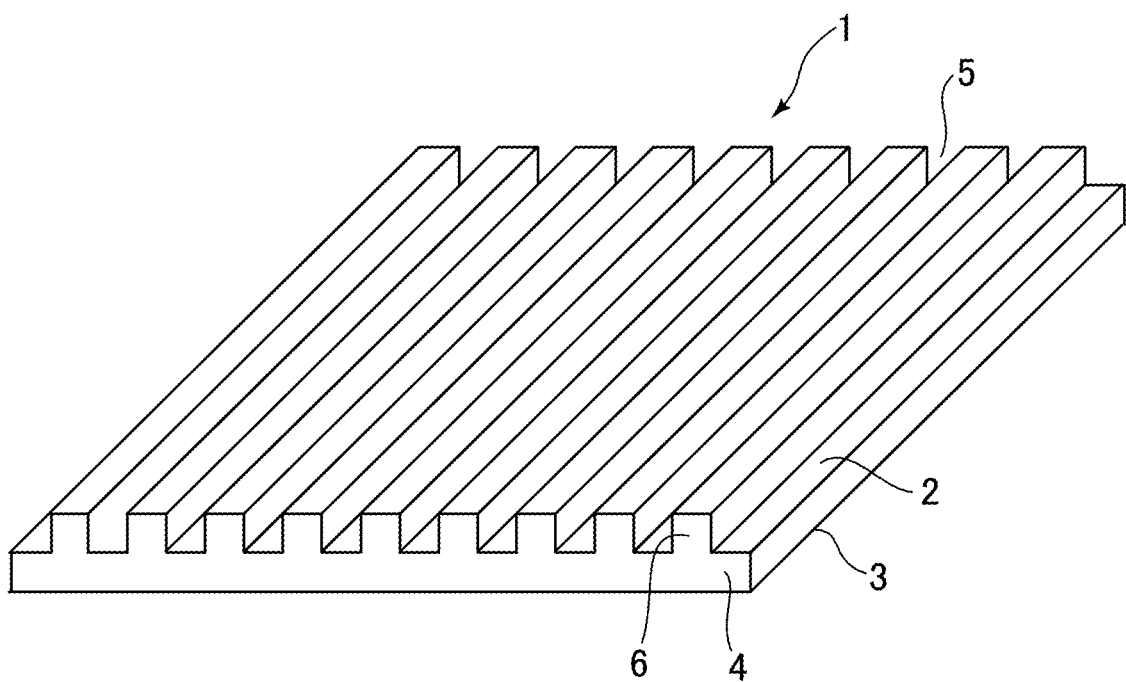
FIG. 3 is a perspective view showing an embodiment of a radio wave scattering body according to the present invention.
Figure 4:
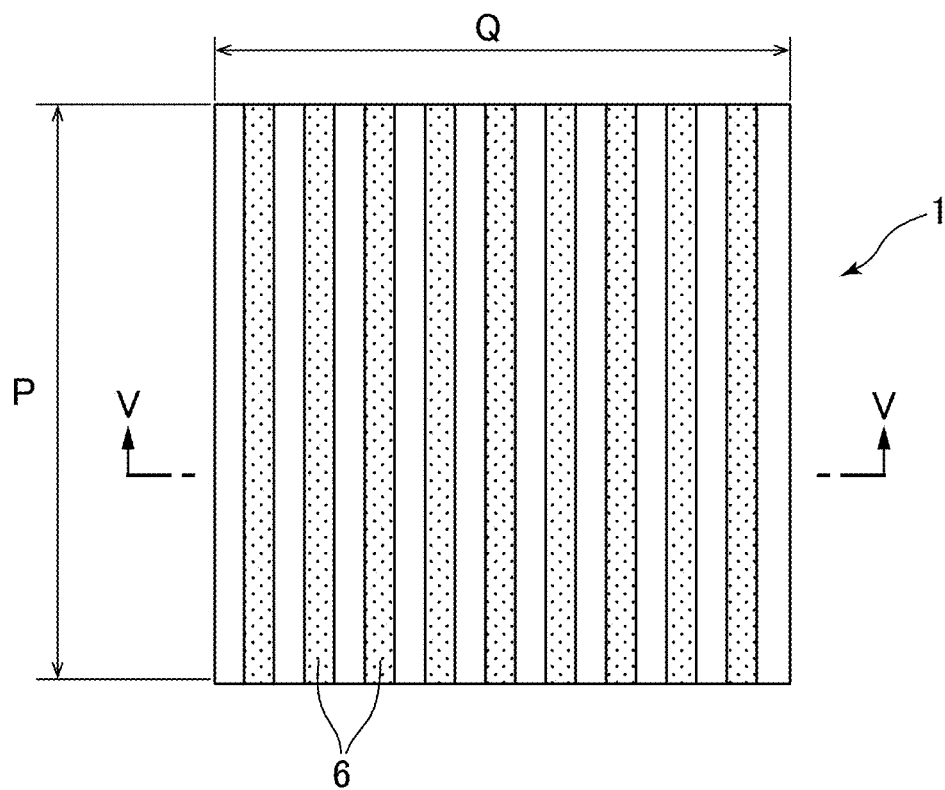
FIG. 4 is a plane view showing an embodiment of a radio wave scattering body according to the present invention.
Figure 5:
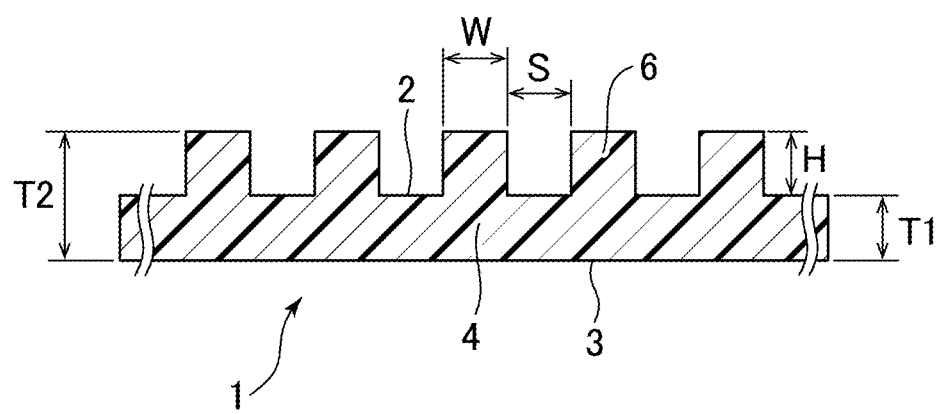
FIG. 5 is a V-V cross-sectional view of FIG. 4.

FIG. 3 is a perspective view showing an embodiment of a radio wave scattering body according to the present invention. FIG. 4 is a plane view showing an embodiment of a radio wave scattering body according to the present invention. FIG. 5 is a V-V cross-sectional view of FIG. 4.

The radio wave scattering body 1 has a support section 4 having a first principal surface 2 and a second principal surface 3. On the first principal surface 2, a structure section 5 causing radio wave scattering is formed. The structure section 5 is constituted of multiple projections 6. According to the present embodiment, the projections 6 are projection streaks extending in the same direction and are formed in parallel with each other.

The radio wave scattering body 1 is formed, depending on the size for example of an object to which it is attached, so as to have a width Q and a length P (see FIG. 4) ordinarily of from 1 to 50 cm, more preferably from 1.5 to 40 cm, and still more preferably from 3 to 30 cm. The support section 4 shown in FIG. 5 has a thickness T1 that is ordinarily designed to be within a range of preferably from 0.5 to 10 mm, more preferably from 0.7 to 5 mm, and still more preferably from 1 to 3 mm, from the viewpoint of strength and weight balance. In addition, the radio wave scattering body 1 has a thickness T2 including the height H of the projection 6 and the thickness T2 is ordinarily designed to be within a range of preferably from 0.5 to 20 mm, more preferably from 1 to 15 mm, and still more preferably from 2 to 10 mm from the viewpoint of being capable of achieving sufficient radio wave scattering effects.

When the wavelength of an incident radio wave is $\lambda$, the height H of the projection 6 is preferably designed in a range of $0.26\lambda$ or greater, more preferably from $0.51\lambda$ or greater and $1.5\lambda$ or less, and still more preferably from $0.77\lambda$ or greater and $1.3\lambda$ or less.

When the wavelength of an incident radio wave is $\lambda$, the width dimension W of a part of the projection 6 rising from the first principal surface 2 is preferably designed in a range of $0.26\lambda$ or greater, more preferably from 0.26 or greater and $3.1\lambda$ or less, and when the projection 6 has a dot shape, it is still more preferably designed in a range of $0.51\lambda$ or greater and $3.1\lambda$ or less.

When the wavelength of an incident radio wave is $\lambda$, the interval S between adjacent projections 6 is preferably designed in a range of $5.1\lambda$ or less, more preferably from $0.26\lambda$ or greater and $3.1\lambda$ or less, and still more preferably from $0.51\lambda$ or greater and $2.6\lambda$ or less. Here, when the projection 6 is a projection streak, the interval S is still more preferably in a range of from $0.26\lambda$ or greater and $2.8\lambda$ or less, and when the projection 6 has a dot shape, the interval S is still more preferably in a range of from $0.51\lambda$ or greater and $2.6\lambda$ or less. The interval S is a value measured between the facing parts of the projections 6 rising from the first principal surface 2.

When the wavelength of an incident radio wave is $\lambda$, the height H, width W, and interval S of the projection 6 are preferably designed to be in ranges of $0.26\lambda$ or greater, $0.12\lambda$ or greater, and $5.1\lambda$ or less, respectively; more preferably from $0.51\lambda$ or greater and $1.5\lambda$ or less, from $0.26\lambda$ or greater and $3.1\lambda$ or less, and from $0.26\lambda$ or greater and $3.1\lambda$ or less; and still more preferably from $0.51\lambda$ or greater and $1.5\lambda$ or less, $0.26\lambda$ or greater and $3.1\lambda$ or less, and $0.51\lambda$ or greater and $2.6\lambda$ or less. Here, when the projection 6 is a projection streak, the height H, width W, and interval S are still more preferably in ranges of from 0.51λ or greater and 1.5λ or less, 0.26λ or greater and 3.1λ or less, and 0.26λ or greater and 2.8λ or less, and when the projection 6 has a dot shape, the height H, width W, and interval S are still more preferably in ranges of from 0.51λ or greater and 1.5λ or less, 0.51λ or greater and 3.1λ or less, and 0.51λ or greater and 2.6λ or less.

The performance of a radio wave scattering body in relation to the height H, width W, and interval S of the projection 6 may be verified by evaluating a sample prepared by a method described in the examples of the present invention or by an electromagnetic field analysis simulation.

As described above, a radio wave scattering body according to the present invention is configured to transmit at least a portion of incident radio waves and to emit the transmitted radio waves in a scattering state. The description "emit transmitted radio waves in a scattering state" means that a predetermined scattering ratio is achieved (i.e., "scattering ratio III" described below being 1.0% or greater) based on measurement values obtained by measurement described below. With respect to the scattering ratio, "scattering ratio I" that is a ratio of scattered waves to transmitted straight waves included in radio waves entering a radio wave scattering body, and "scattering ratio II" or "scattering ratio III" that is a ratio of scattered waves to the total transmitted waves are considered.

Figure 6:
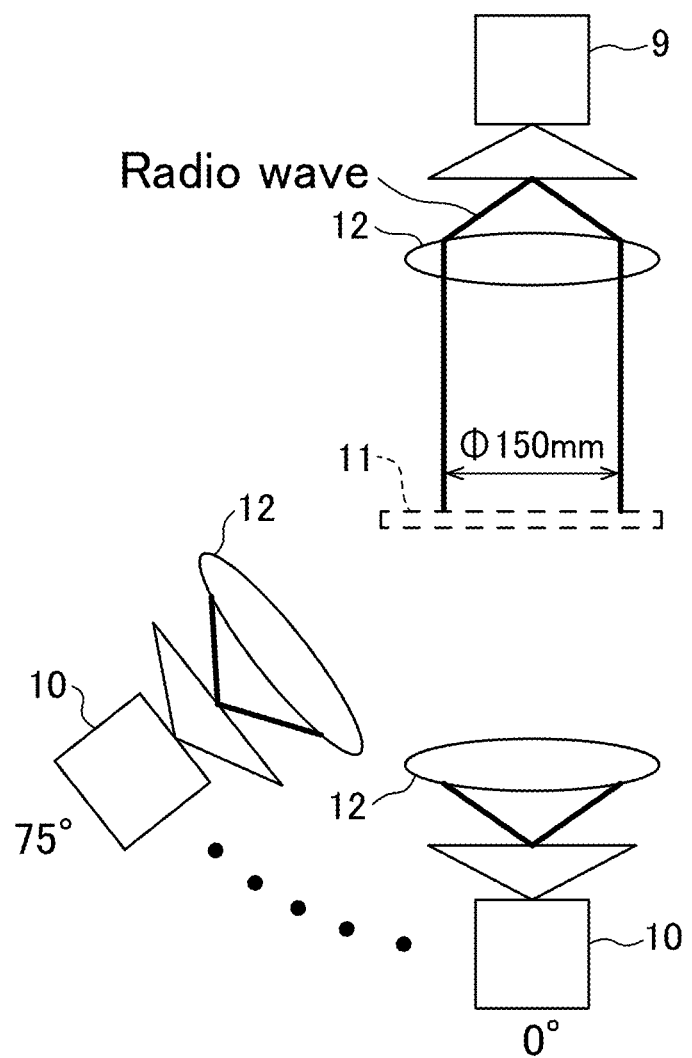
FIG. 6 shows the outline of a method for measuring a scattering ratio.
Figure 7:
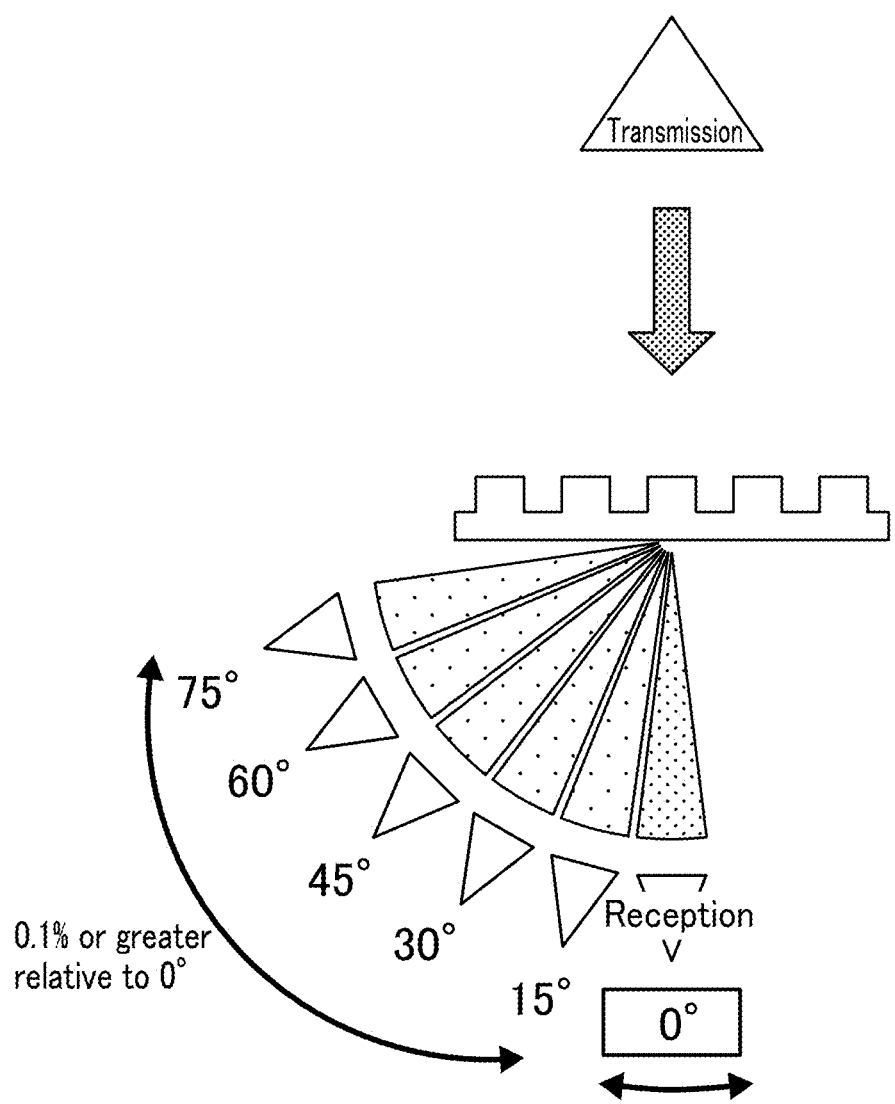
FIG. 7 is a schematic view showing a relationship between a scattering state and the method for measuring a scattering ratio.

A method for measuring a scattering ratio is described. FIG. 6 shows the outline of a method for measuring a scattering ratio. FIG. 7 is a schematic view showing a relationship between a scattering state and the method for measuring a scattering ratio. With reference to JIS R 1679, a transmission attenuation amount is measured at a frequency of from 60 to 90 GHz in accordance with the procedures described below using a radio wave transmitter/receiver (EAS03, produced by KEYCOM). The transmission attenuation amount is represented by an absolute value of a value calculated by the following formula (1):

$$10 \text{ Log}|P_f/P_0| \tag{1}$$

($P_f$: received power, $P_0$: transmitted power)

As shown in the outline in FIG. 6, a sample holder 11, a millimeter wave lens 12, a transmitter 9 and a receiver 10 are arranged. The transmitter 9 transmits radio waves with a diameter of 150 mm. Radio waves are transmitted and received in a state in which no sample is set on the sample holder 11, and a state in which the transmission attenuation amount is 0 dB (in other words, total amount of radio waves were transmitted) is determined to be a reference for the measurement of a transmission attenuation amount of an incident radio wave perpendicular to a surface direction of each sample. Subsequently, a sample is set on the sample holder 11, and as shown in FIG. 7, the receiver is arranged at angles of 0°, 15°, 30°, 45°, 60°, and 75°, respectively, relative to a direction from the transmitter 9 to the receiver 10 that is perpendicular to a surface direction of each sample, and radio waves are transmitted and received to measure a transmission attenuation amount at a frequency of 76.5 GHz. When the structural body of the radio wave scattering body is a projection streak, the measurement is performed in a state in which a longitudinal direction of the projection streak formed on a first principle surface is perpendicular to an amplitude direction of the electric field of an incident wave. Based on the measured values of the transmission attenuation amount at the angles of 0°, 15°, 30°, 45°, 60°, and 75°, $P_f/P_0$ (ratio of received power/transmitted power) at each angle is calculated from the above formula (1), and based on each calculated value of $P_f/P_0$ (ratio of received power/transmitted power), the scattering ratios I and II are calculated from the formulae (2.1) and (2.2) below.

(Scattering ratio I)=($P_f/P_0$(ratio of received power/transmitted power) at angles of 15°,30°,45°,60°, and 75° in total)/($P_f/P_0$(ratio of received power/transmitted power) at an angle of 0°)×100 (2.1)

(Scattering ratio II)=($P_f/P_0$(ratio of received power/transmitted power) at angles of 15°,30°,45°,60°, and 75° in total)/($P_f/P_0$(ratio of received power/transmitted power) at angles of 0°,15°,30°,45°, 60°, and 75° in total)×100 (2.2)

Here, when the scattering ratio I is d1 and the scattering ratio II is d2, d2 can be converted by the following formula (2.3).

$$d2=(100d1/(100+100d1))\times 100 \tag{2.3}$$

Further, in the above method for measuring a scattering ratio, the reception angle of a transmitted wave is determined at an interval of 5° and the scattering ratio III is calculated from the formula (2.4) below.

(Scattering ratio III)=(ratio of received power/transmitted power) at angles of 15°,20°,25°,30°,35°, 40°,45°,50°,55°,60°,65°,70°, and 75° in total)/($P_f/P_0$(ratio of received power/transmitted power) at angles of 0°,5°,10°,15°,20°,25°,30°, 35°,40°,45°,50°,55°,60°,65°,70°, and 75° in total)×100 (2.4)

Due to the scattering ratio II of from 0.1% to 0.2% achieved by the flat-plate members of later described Comparative Examples 1 to 5 that are examples of a member in which no structure section 5 for scattering radio waves is formed on the first principle surface 2, the description "emit the transmitted radio waves in a scattering state" is determined to mean that the scattering ratio III is 1.0% or greater as described above.

It is ideal that the scattering ratio should be based on a ratio of, relative to the power of radio waves in a direction at an angle of 0°, the total of all the power of radio waves three dimensionally scattered in directions at angles other than said power of radio waves in a direction at an angle of 0°. However, since measuring such power is technically difficult at the present time, the scattering ratios are defined by the above formulae (2.1), (2.2), and (2.4). Based on the scattering ratios defined as such, the above description "emit the transmitted radio waves in a scattering state" is determined to mean that the scattering ratio III is 1.0% or greater.

Since the sample of Comparative Example 1 has no projection, a scattering ratio, which is a ratio of the total amount of the power received with the receiver arranged in directions at angles of 15°, 30°, 45°, 60°, and 75° relative to the power received with the receiver arranged in a direction at an angle of 0°, is 0.06%, showing that transmitted radio waves are hardly scattered. In contrast, the sample of later described Example 3 in which a projection is formed has a scattered radio wave ratio of 385.38%, showing that transmitted radio waves are in a scattering state.

The mechanism for emitting transmitted radio waves in a scattering state by forming a projection appears to be associated with multiple mechanisms. One main mechanism is assumed to be projections which serve as a diffraction grating.

Figure 8:
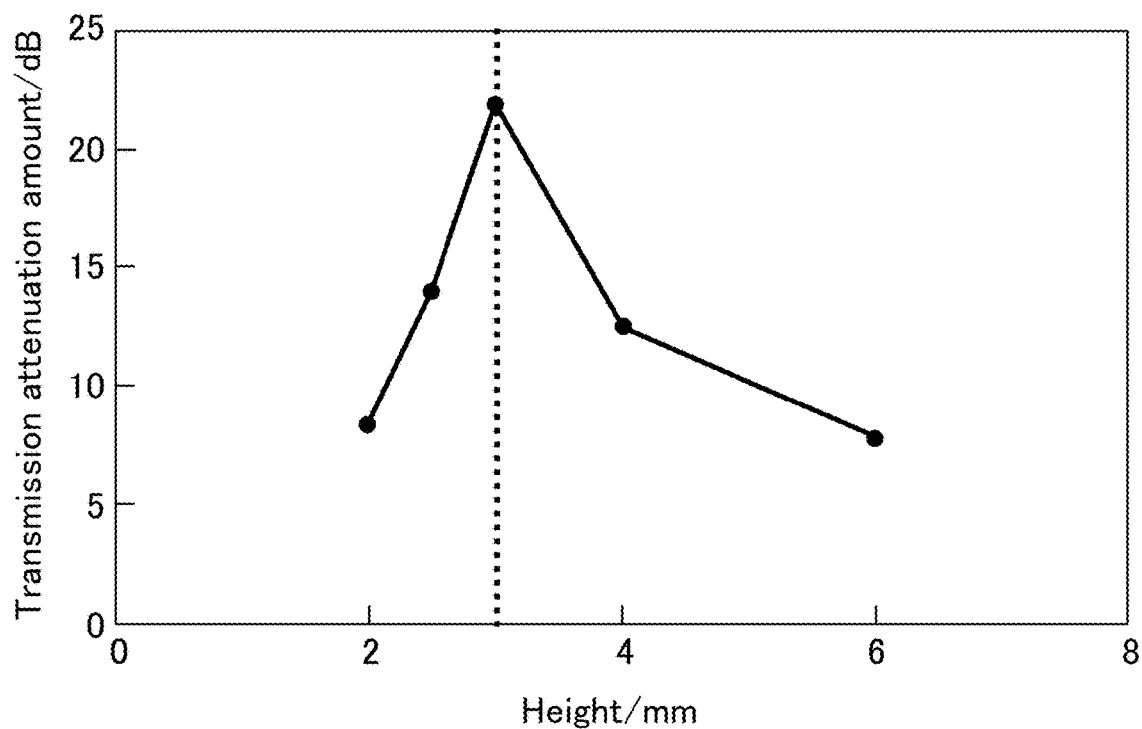
FIG. 8 shows a relationship between a transmission attenuation amount based on actual values and the height of a projection.

Then, an example in which a projection has a rectangular cross section is examined based on the diffraction theory. With respect to the samples of Examples 4, 4.1, 4.2, 4.3, and 4.4 described later, FIG. 8 shows a relationship between the transmission attenuation amount and the height of a projection, as calculated by the above measuring method. FIG. 8 shows that the transmission attenuation amount is highest when a projection has a height of 3 mm, showing a tendency that the transmission attenuation amount decreases as the height of the projection deviates from 3 mm.

With respect to light diffraction, it is known that the following relational expression is established for a diffraction grating having a rectangular cross section when a transmittance of 0 order light is $I_0$, a dielectric constant real part is $\varepsilon_r$, a height of a projection is h, and a wavelength is $\lambda$ (Scalar diffraction theory).

[Formula 1]

$$I_0 = \cos^2\left(\pi \cdot |\sqrt{\varepsilon_r} - 1| \cdot \frac{h}{\lambda}\right) \quad (3)$$

Figure 9:
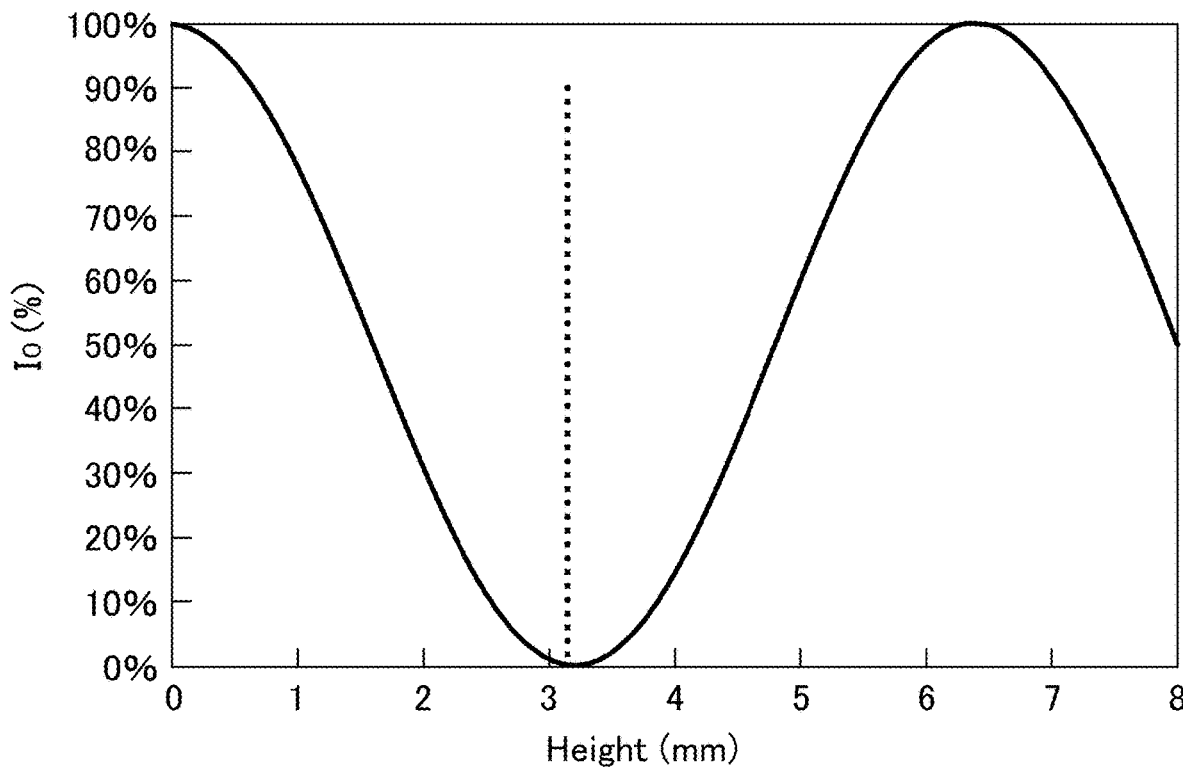
FIG. 9 shows a relationship between a transmittance based on Scalar diffraction theory and the height of a projection.

When $\lambda$ is fixed to be a wavelength of 3.92 mm at a frequency of 76.5 GHz, $I_0$ is a function of $\varepsilon_r$ and h, and when $\varepsilon_r$ is 2.6 as in the Examples, the relationship between the height of a projection and $I_0$ is shown in FIG. 9. As can be seen from FIG. 9, there is a tendency in which $I_0$ is the lowest when the height of a projection is 3 mm, and $I_0$ increases as the height of the projection deviates from 3 mm. Here, the transmittance of 0 order light $I_0$ shows a ratio of the intensity of transmitted straight light in the total of transmitted light, which can be understood to correspond to the transmission attenuation amount of a transmitted straight wave according to the present invention. Thus, since the behavior obtained by the actual measurement shown in FIG. 8 is nearly approximate to the behavior based the theory shown in FIG. 9, the radio wave scattering body according to the present invention is assumed to relate to the Scalar diffraction theory of light. Accordingly, a radio wave scattering body that is appropriate to a frequency of a target radio wave can be obtained by controlling the dielectric constant real part $\varepsilon_r$ and the height h of a projection.

In addition, according to Bragg's law, the direction (angle) of a scattered wave by diffraction is determined by a period of projections (namely a length corresponding to the total of a width and an interval). Diffraction waves traveling between projections strengthen and weaken each other, forming interference fringes, in which portions strengthening each other are observed as scattered waves. Respective angles at which traveling radio waves strengthen or weaken each other are represented by the following formula (4) or (5) (d: period, m: integer).

Strengthening angle: $d \sin \theta = m\lambda$ (4)

Weakening angle: $d \sin \theta = (m+\frac{1}{2})\lambda$ (5)

When $\lambda$ is fixed, the variables are limited to the strengthening angle $\theta$ and the period d. Thus, the scattered wave angle varies in accordance with the period. Table 1 shows the variation of an angle at which diffraction waves strengthen each other, namely an angle of a scattered wave, when the period d is changed.

TABLE 1

| | | Interference | Grating space (unit period)[mm] | | | | |
|---|---|---|---|---|---|---|---|
| | | | d = 4 | d = 5 | d = 6 | d = 7 | d = 8 |
| Diffraction order m | 0 | Strong | 0 | 0 | 0 | 0 | 0 |
| | 0 | Weak | 29 | 23 | 19 | 16 | 14 |
| | 1 | Strong | 79 | 52 | 41 | 34 | 29 |
| | 1 | Weak | — | — | 79 | 57 | 47 |
| | 2 | Strong | — | — | — | — | 79 |

In contrast, Table 2 corresponds to later-described Example 3, showing results obtained by the measurement of a transmission attenuation amount in which a sample with a length P of 150 mm and a width Q of 150 mm was prepared and a transmission attenuation amount was measured with a device used for measuring a scattering ratio with a receiver arranged at angles of 0°, 15°, 30°, 45°, 60°, and 75°, respectively.

TABLE 2

| Angle [°] | 0 | 15 | 30 | 45 | 60 | 75 |
|---|---|---|---|---|---|---|
| Transmission attenuation amount [dB] | 14 | 37 | 8 | 34 | 26 | 24 |

In view of Table 2, the angle at which the transmission attenuation amount is minimum, namely the angle at which a scattered wave is observed, is assumed to be 30°. Since the sample of Example 3 has a projection with a width of 4 mm and also an interval of 4 mm, the period d is 8, and it can be confirmed that the above angle is nearly the same as the direction at an angle of 29° of a scattered wave when d=8 in Table 1. Thus, the radio wave scattering body according to the present invention can also be assumed to relate to Bragg's law. Accordingly, projections can be arranged at an appropriate interval based on the formulae (4) and (5).

Since the projections in the radio wave scattering body can be assumed to serve as a diffraction grating based on the above examination, the strong emission of radio waves in a specific direction can be suppressed by employing the following configuration. According to Bragg's law, when a single width and a single interval (period) are repeated, diffraction waves strengthen each other in a specific direction as described above. Then, it can be assumed that if a different width is mixed in the repeating structure of a width and an interval, it is possible to suppress the strengthening each other in a specific direction, to achieve a directionally uniform transmission attenuation amount, and to suppress the strong emission of radio waves in a specific direction.

The above examination was performed by referring to the diffraction theory of light, which is, however, difficult to apply to millimeter waves. This is because it must be taken into account that radio waves, particularly millimeter waves or submillimeter waves, have a wavelength that is three orders of magnitude larger than the wavelength of a visible light. For example, since a millimeter wave has properties such as a straightness being lower than that of a visible light (in other words, diffraction tends to occur) and a high tendency to penetrate objects such as a plastic wall or paper compared with a visible light, such properties must be taken into account in design.

For example, a radio wave scattering body of later described Example 14 shown in FIG. 10, having a shape in which a unit where projection streaks with widths of 2 mm, 4 mm, and 8 mm are arranged at an interval of 4 mm in this order are repeated, is compared with a radio wave scattering body of Example 3, having a shape in which projection streaks with a width of 4 mm are arranged at an interval of 4 mm. Table 3 and FIG. 11 show the results for the samples of Examples 14 and 3 obtained from the above measurement in which a transmission attenuation amount was measured with a receiver arranged at angles of 0°, 15°, 30°, 45°, 60°, and 75°, respectively.

TABLE 3

| | Shape | Height [mm] | Interval [mm] | Width [mm] | Transmission attenuation amount [dB] | | | | | |
|---|---|---|---|---|---|---|---|---|---|---|
| | | | | | 0° | 15° | 30° | 45° | 60° | 75° |
| Example 3 | Rectangle | 4 | 4 | 4 | 14 | 37 | 8 | 34 | 26 | 24 |
| Example 14 | Rectangle | 4 | 4 | 2, 4, 8 | 16 | 17 | 18 | 22 | 27 | 30 |

It was confirmed that the radio wave scattering body of Example 14 in which projection streaks with different widths were mixedly present exhibited a directionally uniform transmission attenuation amount without strengthening each other in a specific direction, whereas the radio wave scattering body of Example 3 exhibited diffraction waves strengthening each other at an angle of around 30° as per Bragg's law.

Accordingly, when diffraction acts as a main factor, the radio wave scattering body according to the present invention can exhibit a directionally uniform transmission attenuation amount and suppress the strong emission of radio waves in a specific direction by employing the configuration in which different widths or intervals are mixedly present.

Figure 12:
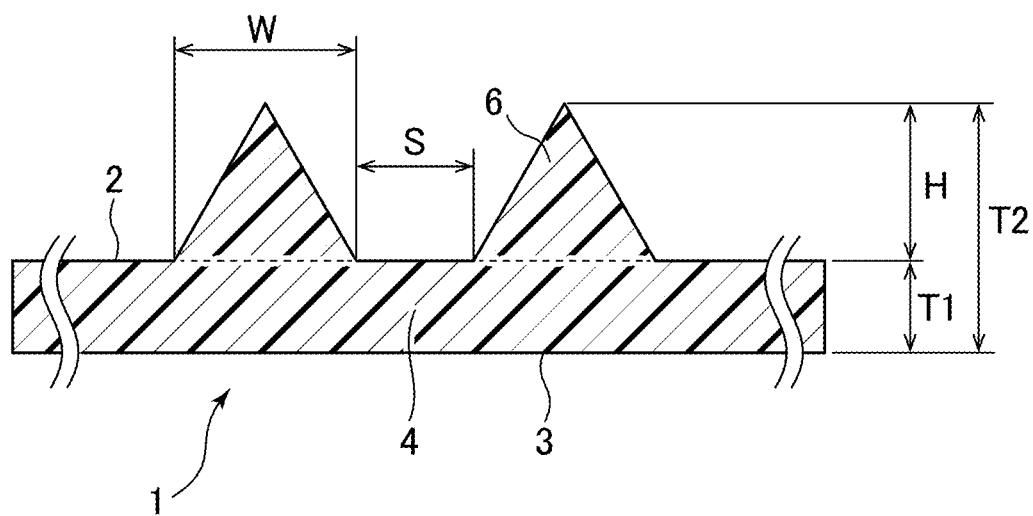
FIG. 12 is a cross-sectional view of another embodiment of a radio wave scattering body according to the present invention.
Figure 13:
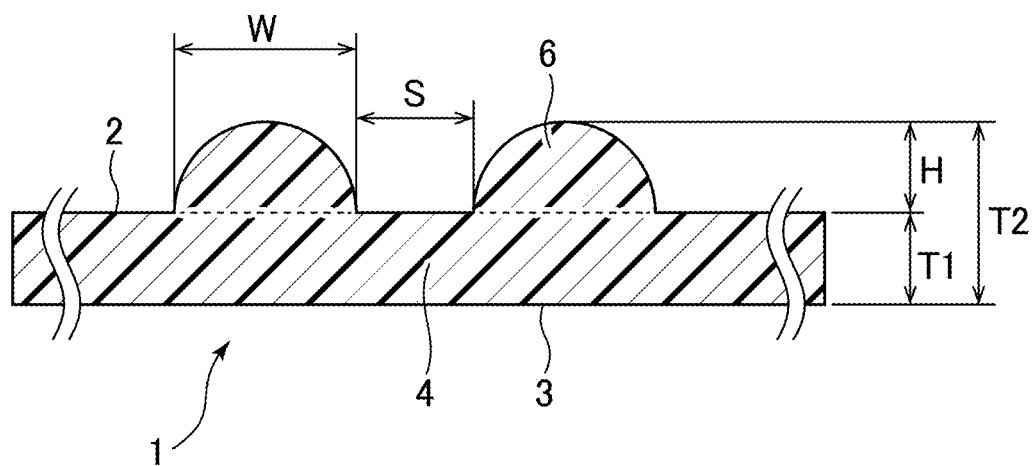
FIG. 13 is a cross-sectional view of another embodiment of a radio wave scattering body according to the present invention.

In the above embodiment, a projection 6 is a projection streak with a cross section crossing the longitudinal direction being formed into a rectangular shape, but the shape of the projection 6 is not limited thereto and any other appropriate shape may be employed. For example, the cross-sectional shape may be a triangle as shown in FIG. 12 or a circle as shown in FIG. 13. Cross-sectional shapes other than a rectangle (such as a triangle or a circle) are assumed to exhibit a higher degree of scattering due to scattering by refraction in addition to the above scattering by diffraction.

Figure 14:
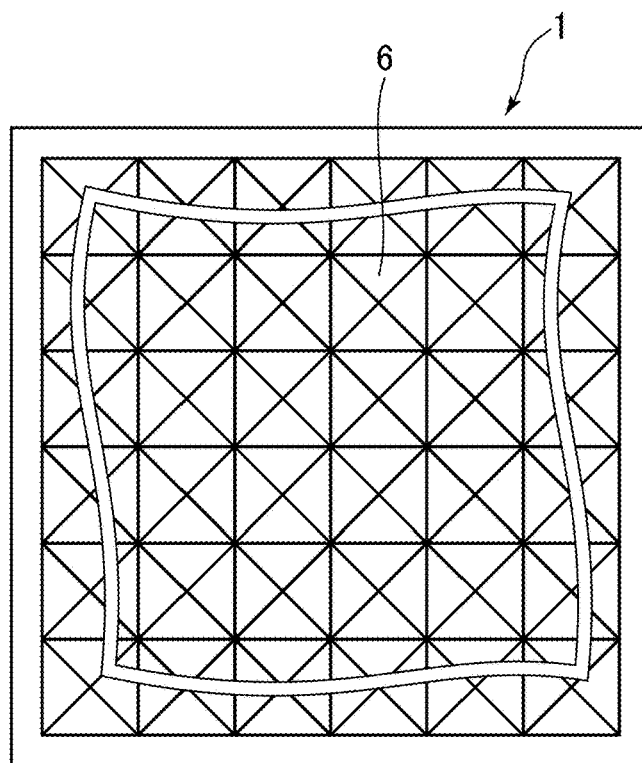
FIG. 14 is a plane view of another embodiment of a radio wave scattering body according to the present invention.
Figure 15:
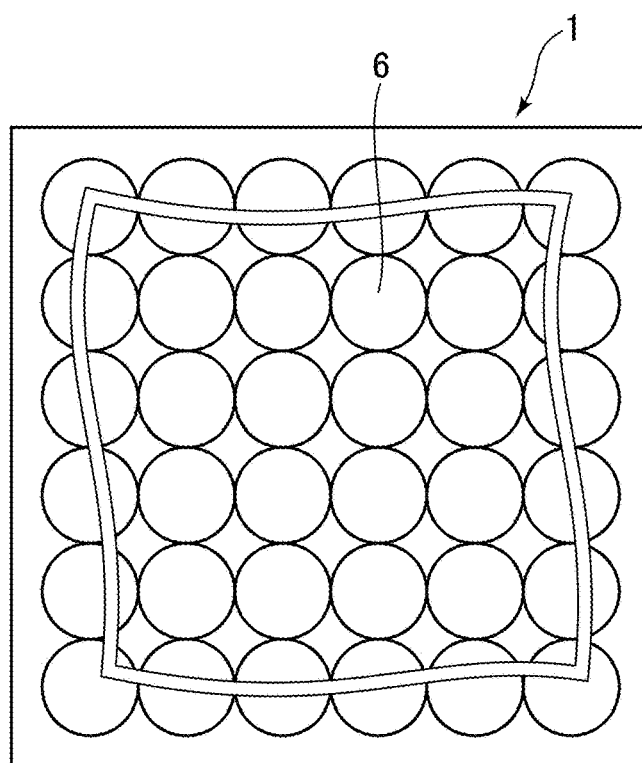
FIG. 15 is a plane view of another embodiment of a radio wave scattering body according to the present invention.

In the above embodiment, the projection 6 is a longitudinally continuous projection streak, but it may be a longitudinally intermittent projection streak. Further, the projection 6 may be formed into a dot shape. FIG. 14 is a plane view showing an example of a radio wave scattering body in which projections 6 having a regular quadrangular pyramid shape (having an isosceles triangular cross-sectional shape) are arranged in a matrix with an interval S of 0. In addition, FIG. 15 is a plane view showing an example of a radio wave scattering body in which projections 6 having a hemispherical shape (having a semicircular cross-sectional shape) are arranged in a matrix with an interval S of 0. The projections 6 are arranged in a matrix in the above examples, but the arrangement of the projections 6 is not limited thereto and any other appropriate arrangements such as an arrangement in a zigzag may also be employed.

Figure 16:
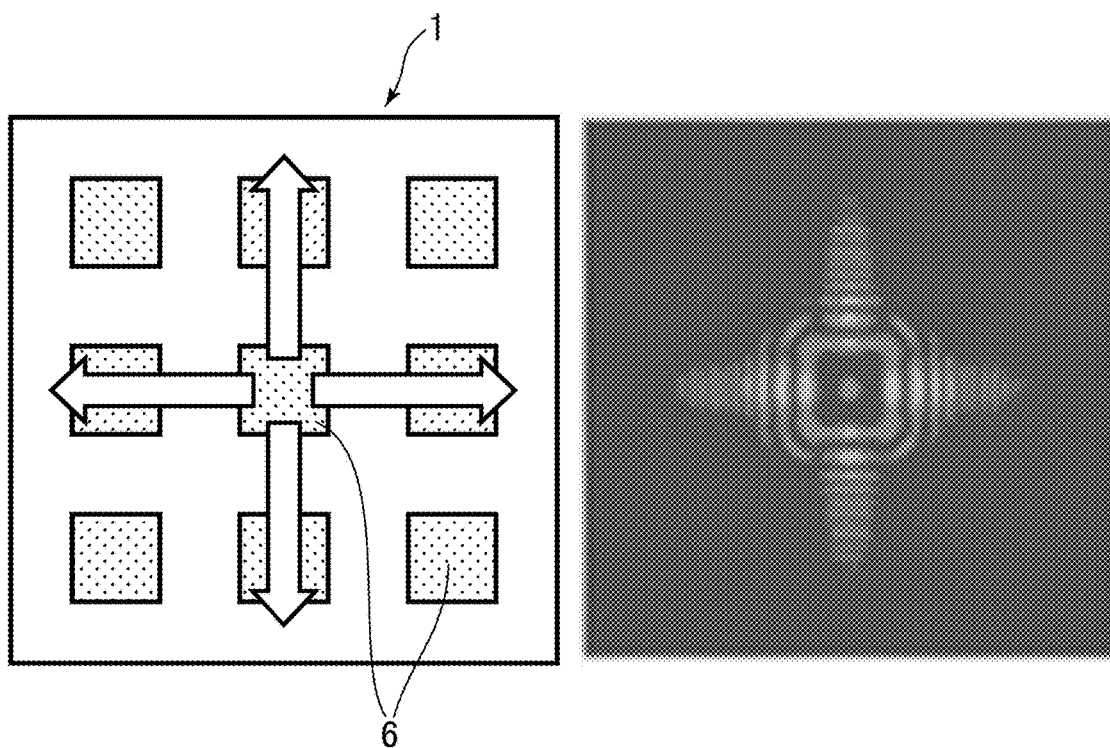
FIG. 16 is a plane view of another embodiment of a radio wave scattering body according to the present invention.
Figure 17:
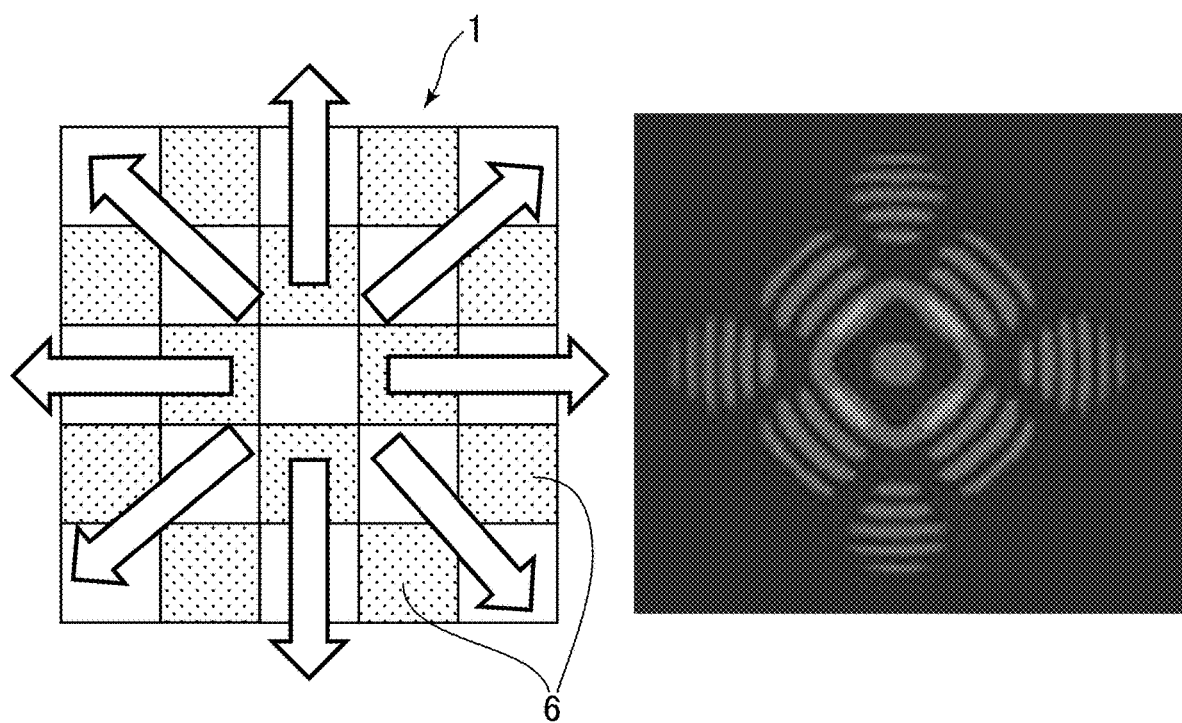
FIG. 17 is a plane view of another embodiment of a radio wave scattering body according to the present invention.
Figure 18:
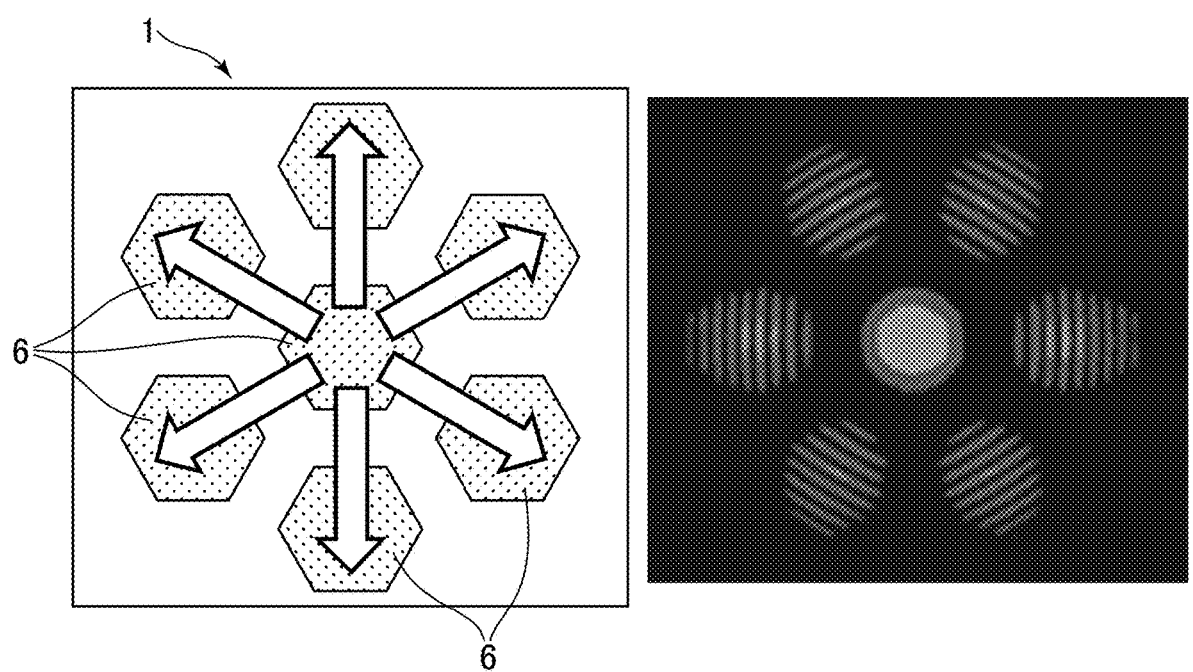
FIG. 18 is a plane view of another embodiment of a radio wave scattering body according to the present invention.

In addition, the projections 6 that are dot-like quadrangular prisms (having a rectangular cross section) may be arranged in a matrix or in a zigzag. FIG. 16 is a plane view showing an example of a radio wave scattering body in which projections 6 having a regular quadrangular prism shape (having a rectangular cross section) are arranged in a matrix with a given interval S. FIG. 17 is a plane view showing an example of a radio wave scattering body in which projections 6 having a regular quadrangular prism shape (having a rectangular cross section) are arranged in a zigzag with a given interval S. FIG. 18 is a plane view showing an example of a radio wave scattering body in which projections 6 having a regular hexagonal prism shape (having a rectangular cross section) are arranged in a honeycomb with a given interval S.

When a projection 6 is a projection streak, radio waves are scattered mainly in a direction perpendicular to a longitudinal direction of the projection streak, and hardly scattered particularly in a longitudinal direction of the projection streak due to the properties similar to those of a diffraction grating. In contrast, when a projection 6 has a dot shape, particularly a point symmetrical shape in a plane view, radio waves are scattered in every direction in a plane view and thus can be scattered more uniformly compared with a case where the projection 6 is a projection streak. Moreover, the projection 6 having a dot shape can manipulate the scattering direction of radio waves by adjusting the arrangement thereof. The above FIGS. 16, 17, and 18 show the scattering directions of radio waves when the projections 6 having the above forms are placed in the above arrangements. The figures on the right sides of the figures show results from an electromagnetic field simulation of transmitted waves by the finite element method with respect to the projections 6 having the forms and placed in the arrangements shown in the figures on the left sides of the figures. In an arrayed arrangement, a radio wave is scattered in four directions to adjacent projections 6, and the number of radio wave scattering directions can be increased by changing the arrangement to a honeycomb arrangement or a zigzag arrangement. As the number of scattering directions of radio waves increases, the radio wave density per unit area decreases, which can further suppress the strong emission of radio waves in a specific direction.

In the above embodiment, the projections 6 are formed into projection streaks being parallel to each other, but the projection streaks need not necessarily be formed to be parallel to each other. For example, as a radio wave scattering body of later described Example 84 shown in FIG. 19, projection streaks may be formed so as to be arranged in a zigzag, and as a radio wave scattering body of later described Example 85 shown in FIG. 20, projection streaks may be formed so as to be radially arranged. However, projection streaks formed to be parallel to each other are preferred in terms of easy design.

Figure 21:
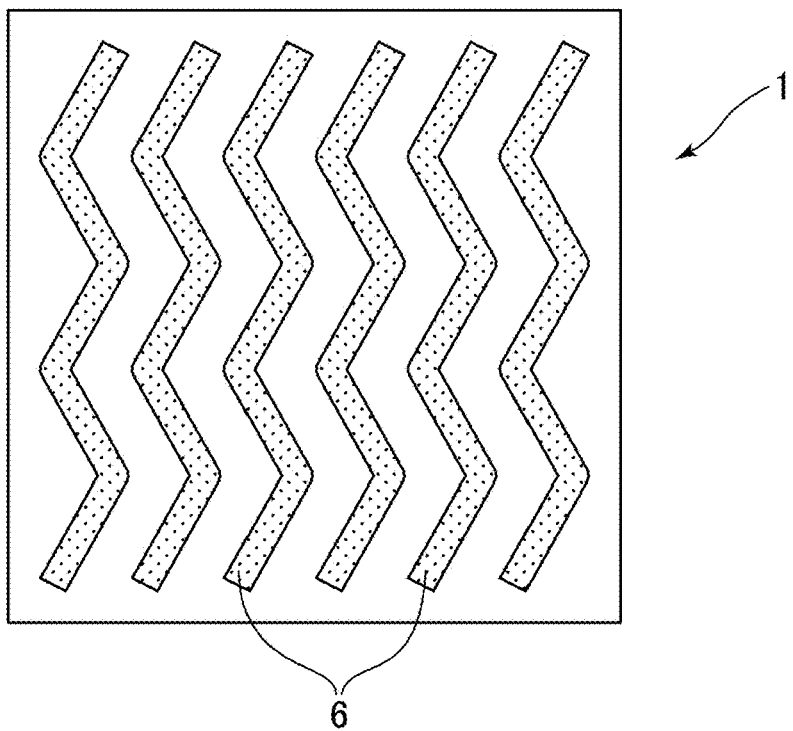
FIG. 21 is a plane view of another embodiment of a radio wave scattering body according to the present invention.
Figure 22:
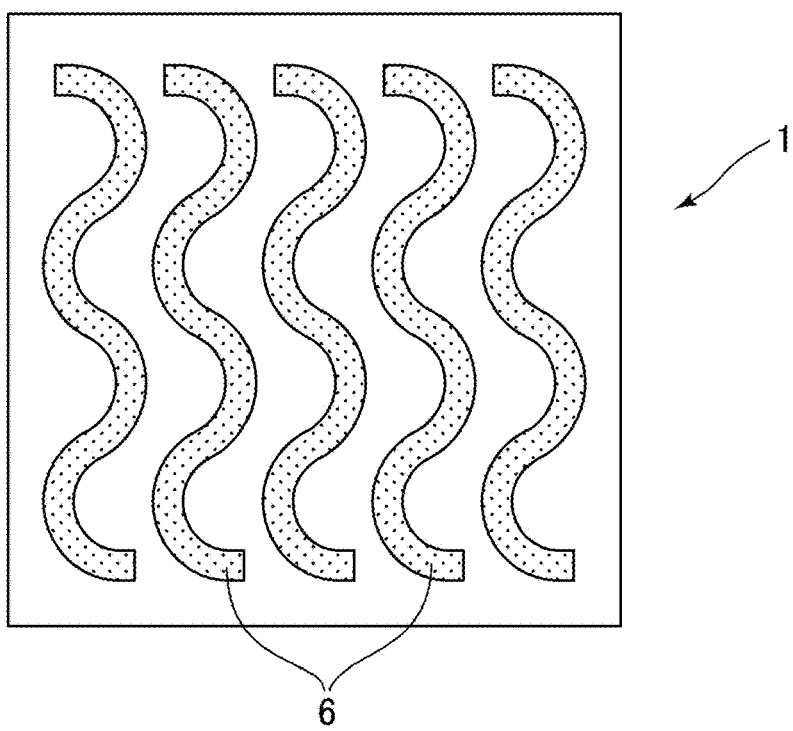
FIG. 22 is a plane view of another embodiment of a radio wave scattering body according to the present invention.

In the above embodiment, the projection 6 is formed as a straight-line projection streak, but the shape of the projection streak is not limited thereto, and any other appropriate shape may be employed. For example, the projection streak may be formed in a zigzag winding shape as shown in FIG. 21, or in a wavy shape as shown in FIG. 22.

In addition, when projection streaks are formed in a position being prone to mud and dirt, the projection streaks are preferably arranged such that a longitudinal direction of the projection streak is perpendicular to the ground to prevent dirt from accumulating.

In the above embodiment, the structure section is composed of a projection, but it may be composed of a hole or of a projection and a hole. Here, the "hole" is a concept including both a concave section, namely a bottomed hole and a through hole.

Figure 23:
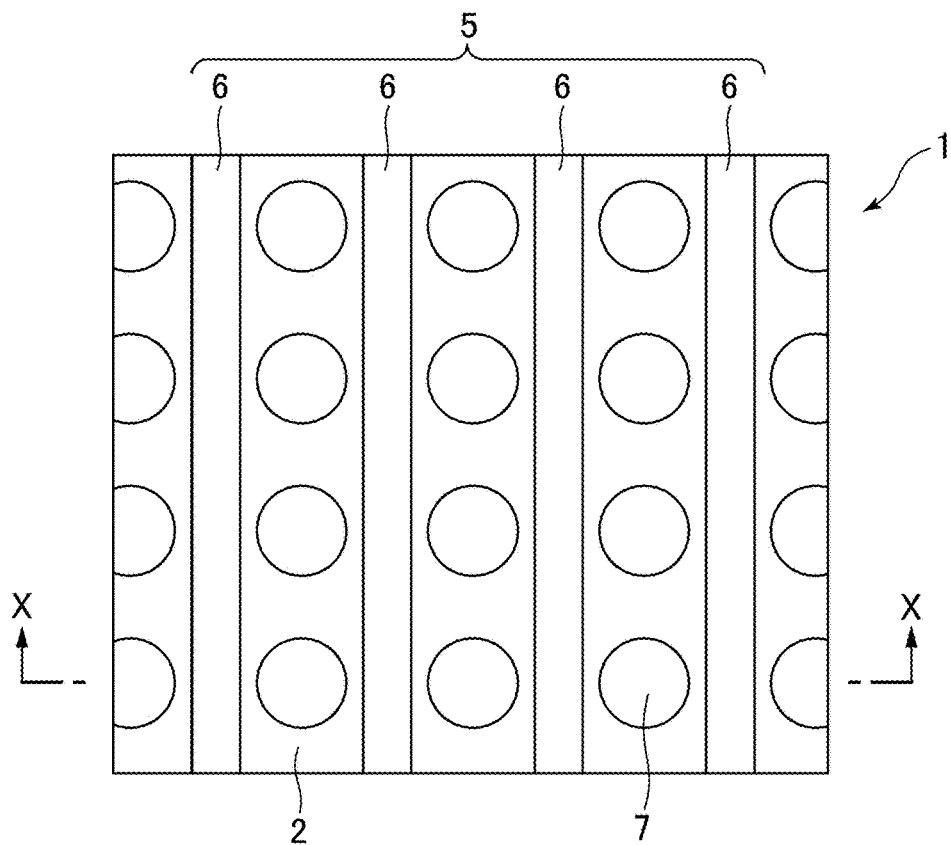
FIG. 23 shows a plane view and a cross-sectional view of an example of a configuration of a radio wave scattering body having a support section provided with holes.
Figure 23:
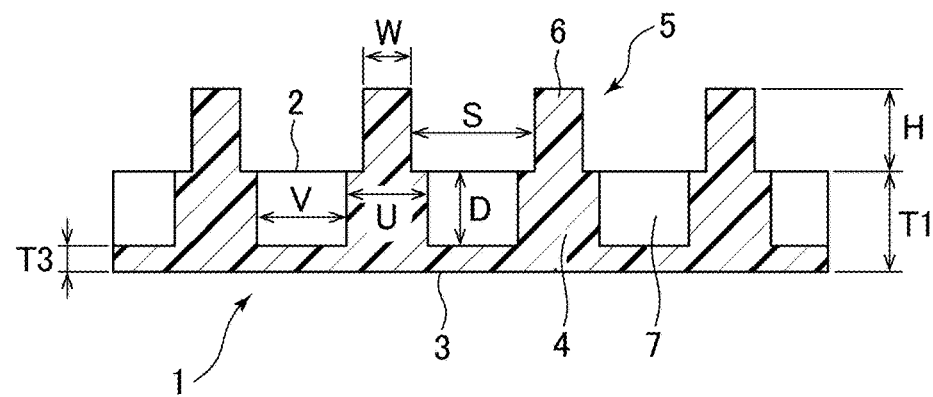

Projections provided as described in the above embodiments increase the amount of materials used for the production of a radio wave scattering body by the amount of the projections, causing the weight of the radio wave scattering body to increase. Then, the weight of the radio wave scattering body can be suppressed from increasing by providing a hole to a support section. FIG. 23 is a plane view showing an example of a configuration in which holes are provided on a support section of a radio wave scattering body and a X-X cross-sectional view thereof. As with the radio wave scattering body in the above embodiment, a radio wave scattering body 1 has a support section 4 having a first principal surface 2 and a second principal surface 3, in which a structure section 5 causing radio wave scattering is formed on the first principal surface 2. The structure section 5 is composed of multiple projections 6. According to the present embodiment, the projections 6 are projection streaks extending in the same direction and formed in parallel with each other. In addition to the above, a cylindrical hole 7 is provided between the adjacent projections 6. The hole 7 has a width (diameter) V and a depth D and the holes 7 are arranged in a matrix with an interval U between the adjacent holes 7. The hole 7 has a bottom portion with a thickness T3. The above configuration is assumed not only to suppress the increase in weight of the radio wave scattering body as described above, but also to allow the remaining portions adjacent to the holes 7 of the support section 4, in addition to the projections 6, to contribute to the scattering of incident radio waves. In addition, the holes in FIG. 23 have a cylindrical shape, but the shape is not necessarily a cylinder and any other appropriate shape such as a triangular prism or a quadrangular prism may be employed.

The hole 7 may be a through hole. However, when the radio wave scattering body of the present embodiment is applied to a cover member provided in a bumper of a vehicle as described in the above "Background art" for example, a bottomed hole, not a through hole, is preferred to prevent the deterioration of a dirt-preventing function (preventing a radar surface soiling due to mud for example) that is a function of a cover member.

Figure 24:
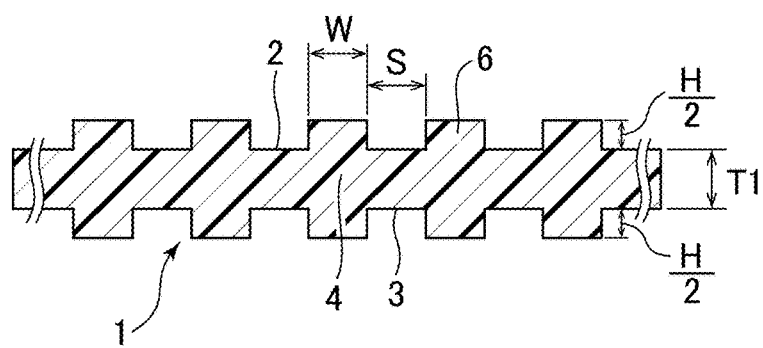
FIG. 24 is a cross-sectional view showing another embodiment of a radio wave scattering body according to the present invention.

In the above embodiments, the structure section causing radio wave scattering formed on the radio wave scattering body is formed on the first principal surface, namely a radio wave incident surface. However, since the structure formed on the second principal surface can also cause a radio wave-scattering state, the structure section may also be formed on the second principal surface, namely a radio wave emission surface or may be formed on both the radio wave incident surface and the radio wave emission surface. When projections are provided on both the radio wave incident surface and the radio wave emission surface, the total of the heights of the projections on both surfaces may be within the above preferred range. When projections and/or holes are provided on both the radio wave incident surface and the radio wave emission surface, a more excellent transmission attenuation amount tends to be obtained by the formation of projections and/or holes in positions on the radio wave emission surface opposite the projections and/or holes formed on the radio wave incident surface. FIG. 24 is a cross-sectional view of an example in which, on a radio wave scattering body having the structure shown in FIG. 5, projections are formed on the radio wave emission surface in positions opposite projections formed on the radio wave incident surface such that the total of the heights of both projections is H being equal to the H of a projection 6 in FIG. 5.

Figure 25:
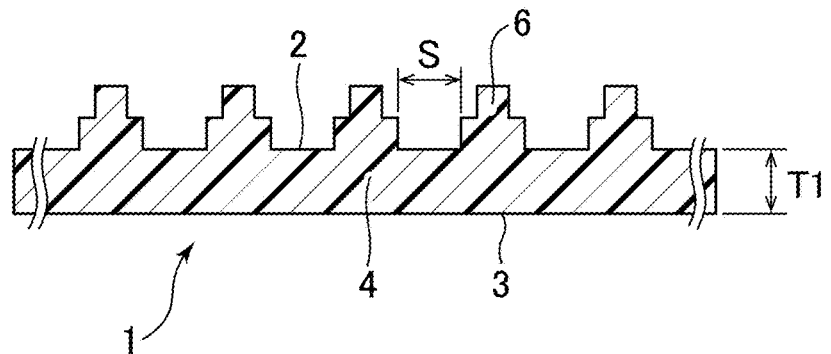
FIG. 25 is a cross-sectional view showing another embodiment of a radio wave scattering body according to the present invention.

The projection may also have a stair-like shape. FIG. 25 is a cross-sectional view showing an example of a radio wave scattering body having a projection in a two-step stair shape. Such a configuration is considered to allow not only the lower step section but also the upper step section to contribute incident radio wave scattering.

As described above, when the wavelength of an incident radio wave is $\lambda$, the height of a projection is preferably $0.26\lambda$ or greater, the width of a projection is preferably $0.26\lambda$ or greater, and the interval between projections is preferably $5.1\lambda$ or less. Considering that the height, width, and interval of the projections correspond to the depth, interval, and width of a hole, respectively, it is preferred that when the wavelength of an incident radio wave is $\lambda$, the height of a projection is $0.26\lambda$ or greater, the width of a projection is $0.26\lambda$ or greater, and the interval between projections is $5.1\lambda$ or less, and/or that the depth of a hole is $0.26\lambda$ or greater, the interval between holes is $0.26\lambda$ or greater, and the width of a hole is $5.1\lambda$ or less.

The height of a projection and the depth of a hole are preferably designed in a range of $0.51\lambda$ or greater, more preferably $0.77\lambda$ or greater.

The width of a portion of a projection rising from the first principal surface and the interval between portions of a hole falling from the adjacent first principal surface are preferably designed in a range of $0.26\lambda$ or greater, more preferably $0.51\lambda$ or greater.

The interval between adjacent projections and the width of a hole are preferably designed in a range of $3.10\lambda$ or less, and more preferably $2.04\lambda$ or less. As described above, the interval between adjacent projections is equivalent to the value measured between portions of projections that face each other and rise from the first principal surface, and the width of a hole is equivalent to a value measured between portions of a hole that face each other and fall from the first principal surface.

The projection volume ratio described later is preferably designed in a range of 3% or greater, more preferably 3.8% or greater, still more preferably 15% or greater, still more preferably 16.7% or greater, and still more preferably 25% or greater. In addition, the projection volume ratio is preferably designed in a range of 90% or less, more preferably 85.2% or less, still more preferably 65% or less, still more preferably 60.9% or less, still more preferably 55% or less, and still more preferably 50.0% or less.

Figure 26:
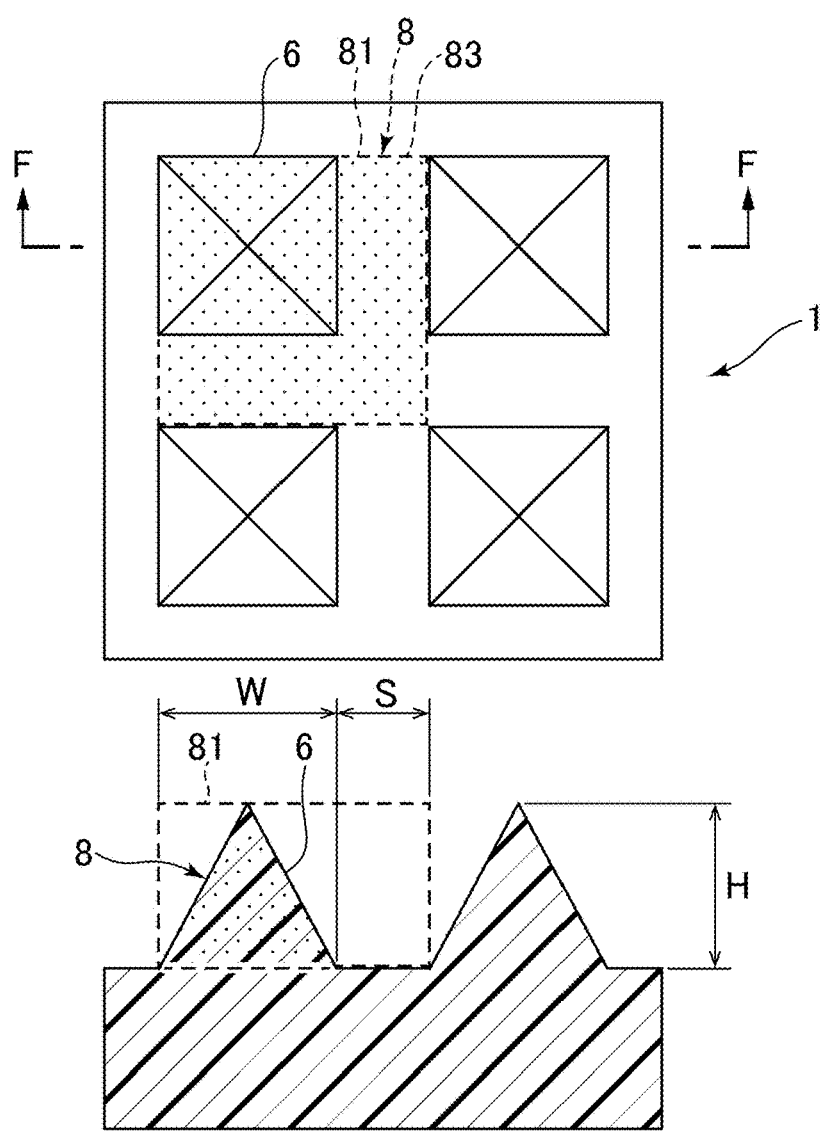
FIG. 26 describes a concept of a projection volume ratio.

Here, a projection volume ratio is a ratio of a volume of projections in a unit structure to a volume of a unit structural space in the structure section. The unit structure is a structure corresponding to a single projection in the structure section. The unit structural space is a space surrounded by a bottom face, an upper surface, and a side surface in which the bottom face is a bottom face of the unit structure, the upper surface is a surface that is separated from the bottom face by a distance corresponding to the maximum height of a projection in the unit structure and is parallel to the bottom face, and the side surface is a surface along the boundary line of the bottom face of the unit structure and is perpendicular to the bottom face of the unit structure. For example, in the case of a radio wave scattering body 1 as shown in the plane view and the F-F cross-sectional view of FIG. 26, in which a support section 4 has a flat-plate shape, projections 6 are each a dot and have a regular quadrangular pyramid shape with a length of one side of the bottom face W, arranged in a matrix with an interval S, a unit structure 8 in FIG. 26 is represented by the shaded part and a unit structural space 81 is a rectangular solid space defined by a bottom face 83 of the unit structure 8 (square with a length of (W+S) on each side) and a height H of the projection 6.

The performance of a radio wave scattering body in relation to the height, width and interval of a projection, the depth, interval and width of a hole, and a projection volume ratio may be verified by evaluating samples prepared by methods described in Examples or by an electromagnetic field analysis simulation.

In the above embodiment, a case of incident radio waves perpendicular to a principal surface of a radio wave scattering body was described, but incident radio waves being incident obliquely to a principal surface of a radio wave scattering body can also cause the scattering state of emitted radio waves. Table 4, corresponding to Example 2, shows an example of a transmission attenuation amount changing in accordance with incident angles, using a sample with a length P of 150 mm and a width Q of 150 mm, and measured with a device used for measuring a scattering ratio.

TABLE 4

| Resin composition Real part ∈' of relative dielectric constant | Projection | | | | | | |
|---|---|---|---|---|---|---|---|
| | Height [mm] | Width [mm] | Length [mm] | Interval between adjacent projections [mm] | Cross-sectional shape | Incident angle [°] | Transmission attenuation amount [dB] |
| 2.7 | 4 | 4 | 150 | 4 | Rectangle | 0 | 22.7 |
| 2.7 | 4 | 4 | 150 | 4 | Rectangle | 15 | 16.8 |
| 2.7 | 4 | 4 | 150 | 4 | Rectangle | 30 | 16.3 |
| 2.7 | 4 | 4 | 150 | 4 | Rectangle | 45 | 14.9 |

Table 4 shows that incident radio waves being incident obliquely to the principal surface of a radio wave scattering body can also cause the scattering state of emitted radio waves.

In the above embodiment, the support section was a flat plate, but it may also be bent.

In addition, the above embodiment was described by referring to incident radio waves which are millimeter waves, but the wavelength of an incident radio wave is not limited to a millimeter wave, and any other appropriate wavelength may be employed.

[Member for Attenuating Radio Wave]

A member for attenuating radio waves according to the present invention comprises the above radio wave scattering body.

Figure 1:
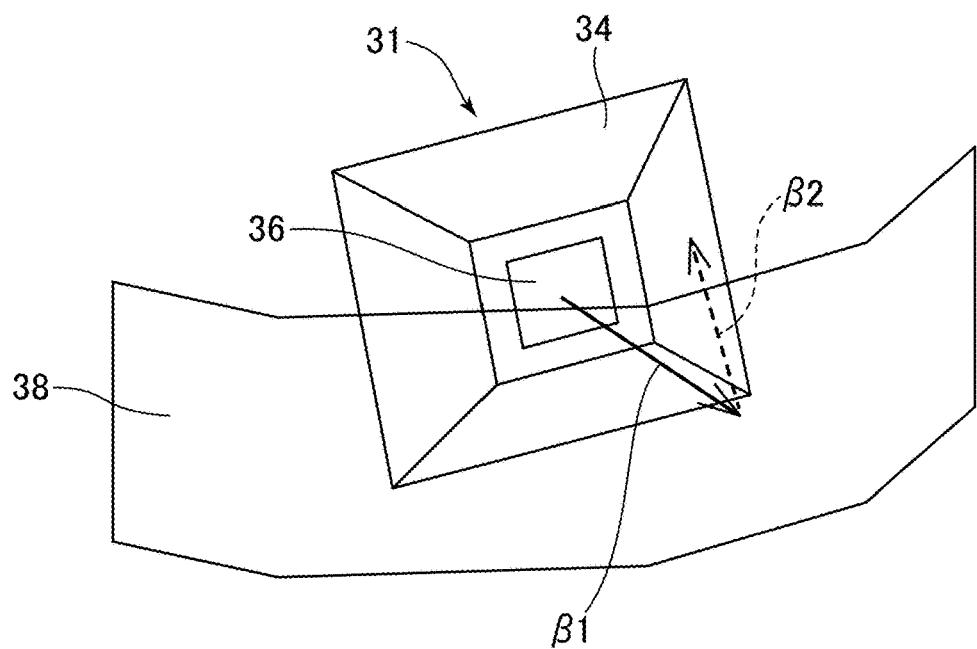
FIG. 1 shows an installation example of a radar used in a collision prevention system.
Figure 2:
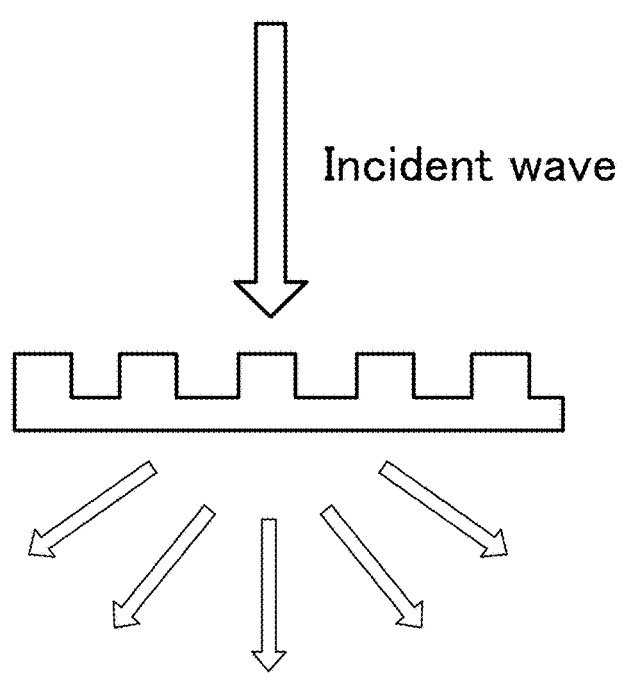
FIG. 2 is a schematic view showing the scattering of emitted radio waves according to a novel configuration.
Figure 27:
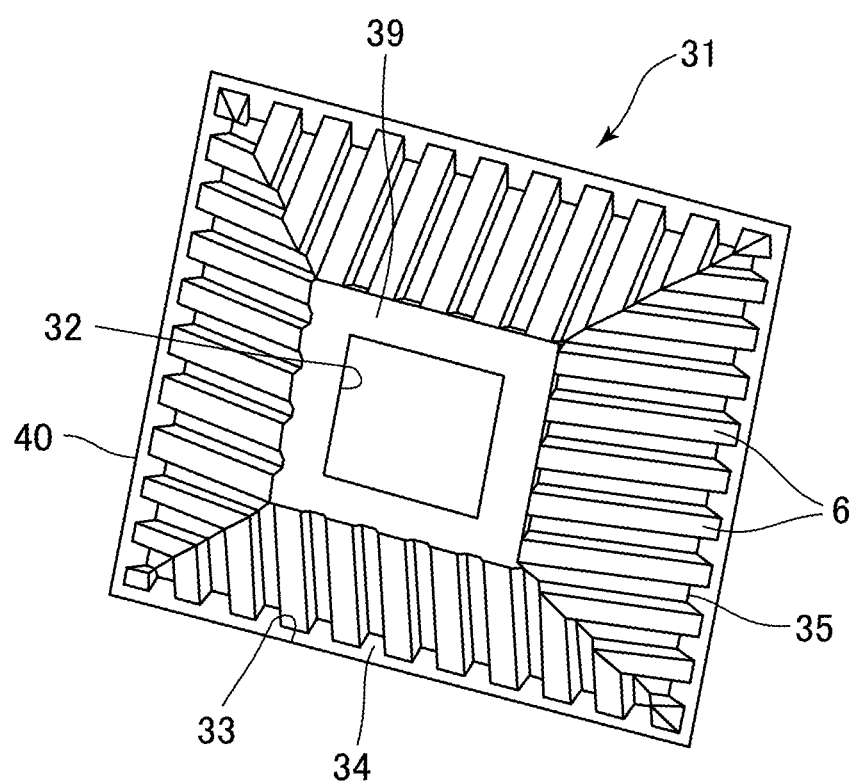
FIG. 27 is a perspective view of an embodiment of a member for attenuating radio waves according to the present invention.

FIG. 27 is a perspective view of an embodiment of a member for attenuating radio waves according to the present invention, which is a cover member 31 in the example shown in FIG. 1 in the section [Background art].

The cover member 31 that is a member for attenuating radio waves is a molded body made of a resin composition as with the radio wave scattering body 1, having a basic configuration being the same as that of the radio wave scattering body 1. Thus, the elements included in the configuration that are the same as those of the radio wave scattering body 1 are represented by the same referential numerals and the descriptions thereof are omitted.

As shown in FIG. 27, the cover member 31 is formed so as to be a hollow truncated pyramid as a whole, having a first opening 32 on an upper surface 39 and a second opening 33 on a lower surface 40. Multiple projection streaks 6 extending up and down are formed on an inner surface 35 of a side peripheral wall 34. The cover member 31 is ordinarily attached in such a way that the upper surface 39 is in contact with the object to which it is attached.

Figure 28A:
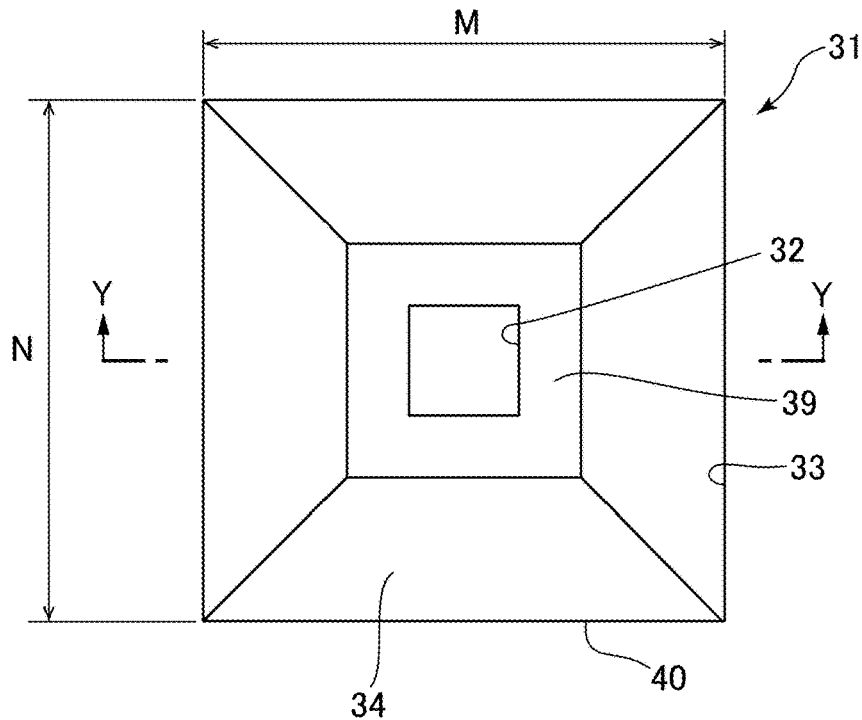
FIG. 28A is a plane view of an embodiment of a member for attenuating radio waves according to the present invention.
Figure 28B:
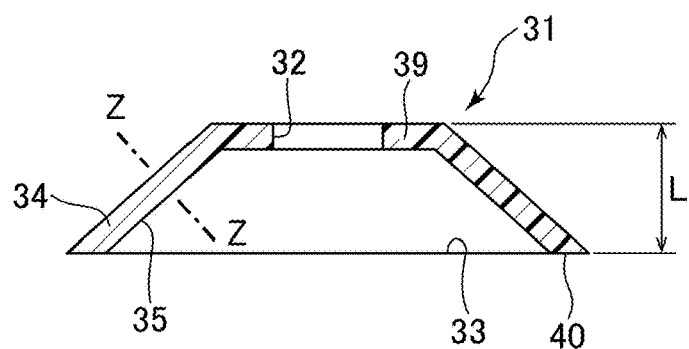
FIG. 28B is a Y-Y cross-sectional view of FIG. 28A.
Figure 28C:
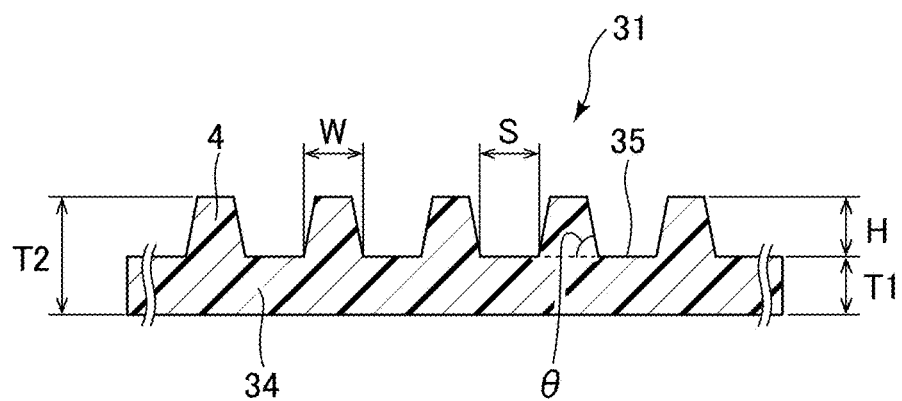
FIG. 28C is a Z-Z cross-sectional view of FIG. 28B.

As shown in the plane view of FIG. 28A, the Y-Y cross-sectional view of FIG. 28B, and the Z-Z cross-sectional view of FIG. 28C, the cover member 31, though depending on the dimensions of an object to which it is attached and a radar 36, is ordinarily formed so as to have a height L of from 0.5 to 25 cm, more preferably from 1 to 20 cm, still more preferably from 2 to 15 cm. The length M and the depth N are ordinarily formed so as to be from 1 to 50 cm, more preferably from 1.5 to 40 cm, and still more preferably from 3 to 30 cm.

In the cover member 31, multiple projection streaks 6 are formed on the inner surface 35 of the side peripheral wall 34, the projection streaks extending up and down (namely a direction in which the upper surface 39 is connected to the lower surface 40) and formed in parallel with each other. The width of the projection streak 6 decreases as it deviates from the inner surface 35, and an angle θ at which the projection streak 6 rises relative to the inner surface 35 of the side peripheral wall 34 is formed acutely.

Due to the above configuration in which multiple projection streaks 6 are formed in a special shape on the inner surface 35 of the side peripheral wall 34 in the cover member 31, sufficient radio wave absorption capability can be exhibited without laminating multiple layers using multiple materials having different dielectric constants. Thus, after forming a member in a specific shape, the cover member 31 can be provided as a molded body without necessity of laminating layers made of materials such as a metal. In addition, an acute angle θ at which the projection streak 6 rises relative to the inner surface 35 of the side peripheral wall 34 and the projection streaks 6 extending up and down make it easier to release a molded cover member 31 from a mold, improving production efficiency.

Figure 29A:
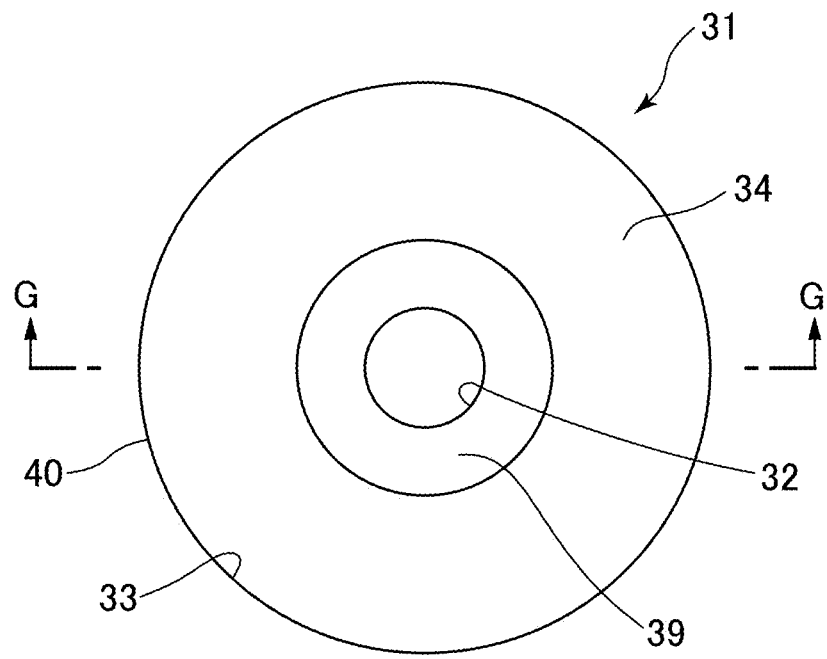
FIG. 29A is a plane view of another embodiment of a member for attenuating radio waves according to the present invention.
Figure 29B:
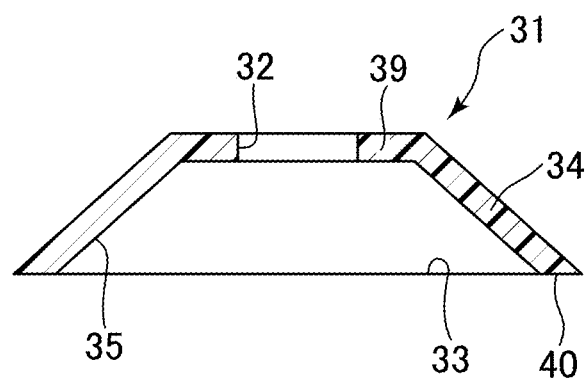
FIG. 29B is a G-G cross-sectional view of FIG. 29A.

In the above embodiment, the whole of the cover member 31 is formed into a truncated pyramid, but the whole shape is not limited thereto and may be a truncated cone, as shown for example, in FIGS. 29A and 29B. However, when the whole shape is formed into a truncated cone, as well as a truncated pyramid, the multiple projection streaks 6 formed on the inner surface 35 must be designed in respect of their shape and arrangement by taking into account the ease of release from a mold.

In the above embodiment, the whole of the cover member 31 is formed into a truncated pyramid (truncated quadrangular pyramid), but it may also be an n-angular pyramid (with the proviso that n is a positive integer). In addition, the shape of the cover member 31 is not limited to a truncated pyramid, and any appropriate shape such as a plate or a truncated pyramid expanding to a direction opposite the emission direction of radar waves may be flexibly employed in accordance with the properties such as the shape of an object to which the cover member 31 is attached or the radar 36.

Figure 30A:
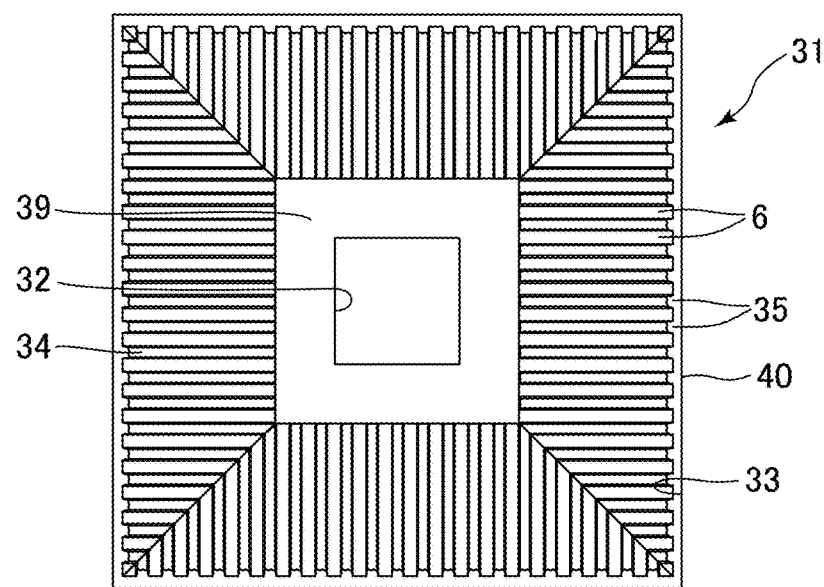
FIG. 30A describes projection streaks formed on an inner surface of the side peripheral wall in an embodiment of a member for attenuating radio waves according to the present invention.

In the above embodiment, as shown in FIG. 30A, the multiple projection streaks 6 formed on the inner surface 35 of the side peripheral wall 34 are each formed on the inner surface 35 of the side peripheral wall 34 in an up and down direction (in a direction in which the upper surface 39 is connected to the lower surface 40) uninterruptedly (continuously), but the multiple projection streaks 6 each may be formed intermittently. However, release from a mold tends to be easy when the multiple projection streaks 6 are formed uninterruptedly (continuously).

Figure 30B:
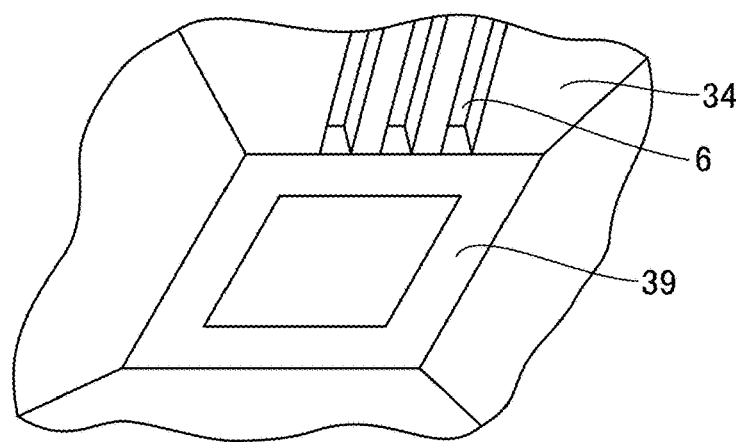
FIG. 30B describes a variation of projection streaks formed on an inner surface of the side peripheral wall in an embodiment of a member for attenuating radio waves according to the present invention.
Figure 30C:
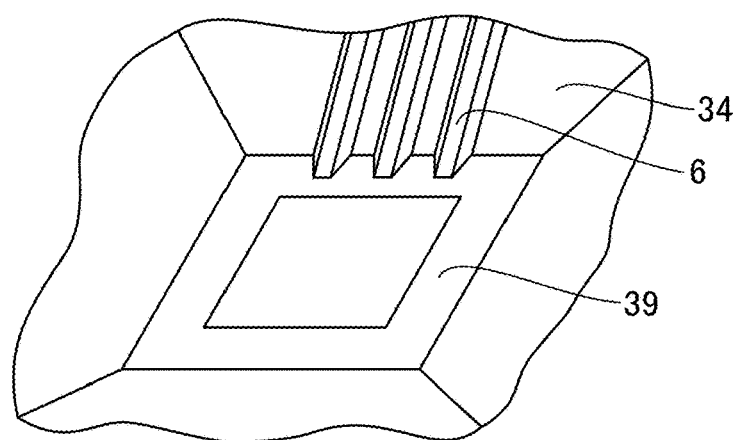
FIG. 30C describes a variation of projection streaks formed on an inner surface of the side peripheral wall in an embodiment of a member for attenuating radio waves according to the present invention.

In the above embodiment, the multiple projection streaks 6 formed on the inner surface 35 of the side peripheral wall 34 rise at a boundary portion between the upper surface 39 and the side peripheral wall 34 and are formed uninterruptedly (continuously) toward the lower surface 40 as shown in FIG. 30B. However, as shown in 30C, the multiple projection streaks 6 may gradually rise from the peripheral portion of the upper surface 39, and may rise gradually while curving such that the above upper surface 39 is continuously connected to the upper surfaces of the above projection streaks 6. Release from a mold tends to be easier when the multiple projection streaks 6 are formed such that the upper surface 39 is continuously connected to the upper surfaces of the projection streaks 6.

In the above embodiment, the multiple projection streaks 6 formed on the inner surface 35 of the side peripheral wall 34 are formed in parallel with each other on the same surface of the truncated pyramid as shown in FIG. 30A, but the above multiple projection streaks 6 need not be necessarily formed in parallel with each other. For example, on each surface of the side peripheral wall 34, the multiple projection streaks 6 may be arranged so as to broaden from the upper surface 39 to the lower surface 40, and on the inside in viewing from the lower surface 40 of the cover member 31, multiple projection streaks 6 may be formed so as to extend radially from the upper surface 39 as with the arrangement shown in FIG. 20. Moreover, as with the arrangement shown in the above FIG. 19, multiple streaks 6 may be formed so as to be arranged in a zigzag. From the viewpoint of easy release from a mold, however, multiple projection streaks 6 are preferably formed in parallel with each other on the same surface of a truncated pyramid, as shown in FIG. 30A.

In the above embodiment, the first opening 32 is provided on the upper surface 39 and the second opening 33 is provided on the lower surface 40, but the upper surface 39 does not necessarily need to have the first opening 32. When the upper surface 39 does not have the first opening 32, the radar 36 may be arranged inside the upper surface 39. The arrangement of the radar 36 in the cover member 31 has an advantage in which the radar 36 and the cover member 31 can be simultaneously attached to an object to which both are attached.

In the above embodiment, the radio wave scattering body is formed integrally with the cover member to constitute a member for attenuating radio waves, but a radio wave scattering body that is separate from a cover member may be attached to the cover member to constitute a member for attenuating radio waves.

The above embodiment was described by referring to a cover member for a radar as a member for attenuating radio waves, but the member for attenuating radio waves may be used for any other appropriate applications, not for the cover member for a radar alone.

[Radar Assembly]

A radar assembly according to the present invention is such that a radar is attached to the above cover member for a radar.

Figure 31:
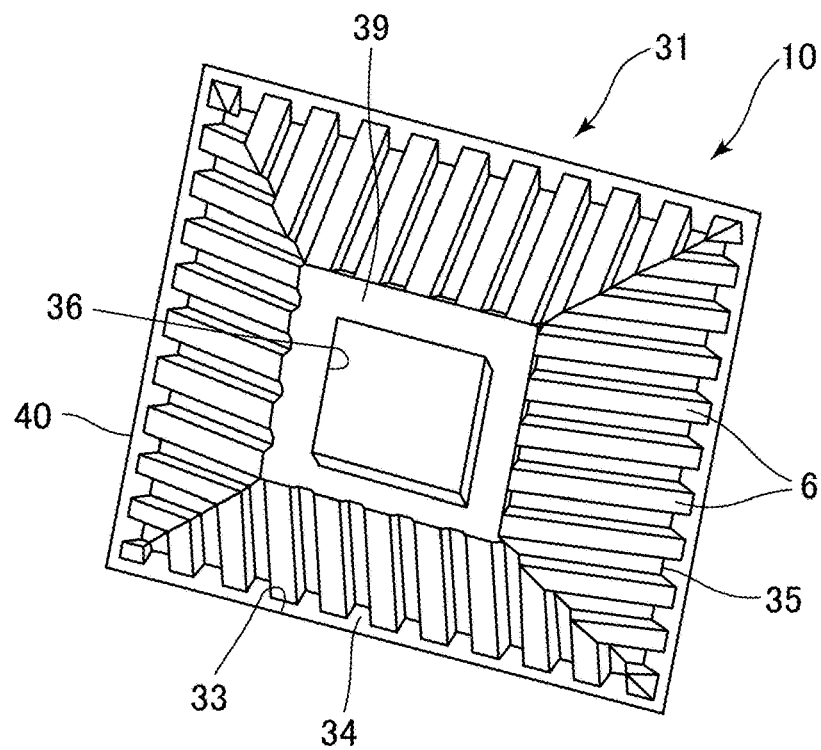
FIG. 31 is a perspective view of an embodiment of a radar assembly according to the present invention.

FIG. 31 is a perspective view of an embodiment of a radar assembly according to the present invention. The basic configuration of a radar assembly 10 is the same as those of the cover member 31 for a radar and the radar 36 described above. Thus, the elements included in the configuration that are the same as those of the cover member 31 and the radar 36 are represented by the same referential numerals and the descriptions thereof are omitted. As shown in FIG. 31, the radar 36 is attached to the upper surface 39 of the cover member 31, constituting the radar assembly 10.

[Bumper]

Figure 32:
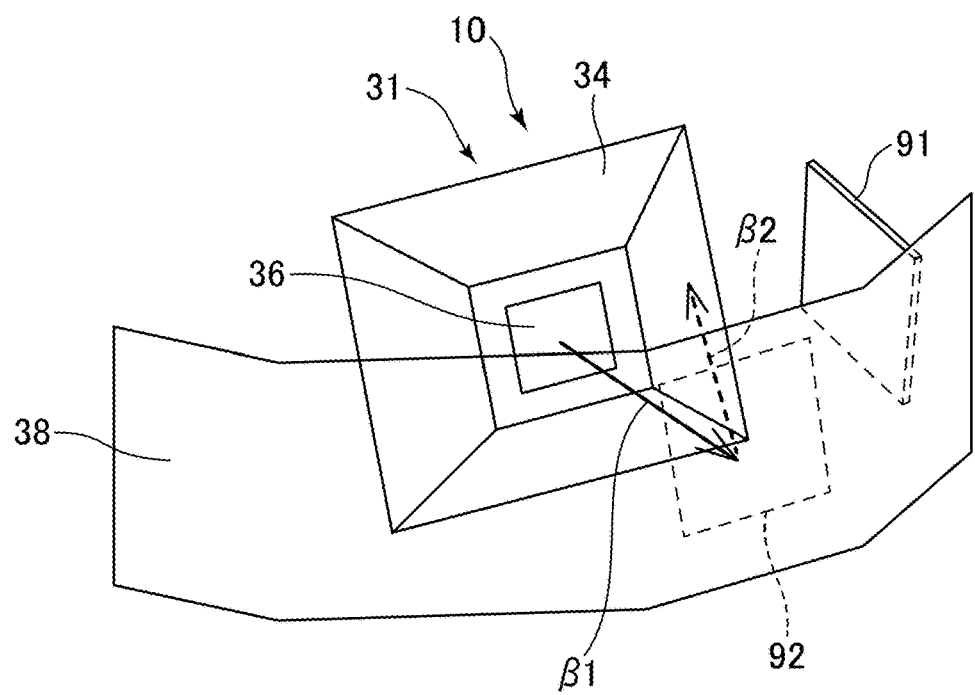
FIG. 32 shows the outline of an embodiment of a bumper according to the present invention.

A bumper according to the present invention includes the above member for attenuating radio waves. FIG. 32 shows the outline of an embodiment of a bumper according to the present invention. The elements of the configuration that are the same as those of the collision prevention system shown in FIG. 1 in the section [Background art] and the radar assembly shown in FIG. 31 are represented by the same referential numerals and the descriptions thereof are omitted. As shown in FIG. 32, a radar assembly 10 is provided on a chassis (unshown in the figure) inside a bumper 38 on a vehicle 11, and a radio wave attenuation plate 91 that is a member for attenuating radio waves is provided on the side of the radar assembly 10. On the bumper 38, a radio wave attenuation area 92 that is a radio wave scattering body is formed. When a radio wave scattering body is formed on a cover member, the radio wave attenuation plate 91 and the radio wave attenuation area 92 may be omitted. When a radio wave scattering body is not formed on a cover member, the radio wave attenuation plate 91 and/or the radio wave attenuation area 92 may be provided. The radar assembly 10 may be attached to the bumper 38.

[Vehicle]

A vehicle according to the present invention has the above member for attenuating radio waves, radar assembly, and/or bumper.

Figure 33:
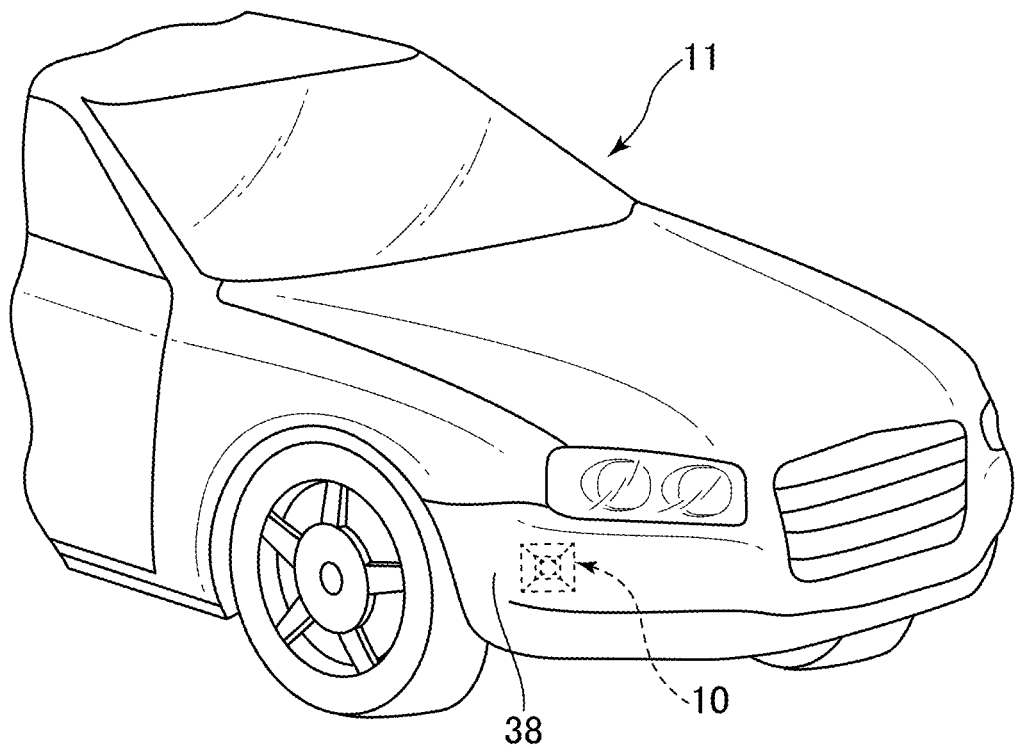
FIG. 33 shows the outline of an embodiment of a vehicle according to the present invention.

FIG. 33 shows the outline of an embodiment of a vehicle according to the present invention. The basic configuration of the radar assembly 10 is the same as those of the above cover member 31 for a radar and the radar 36. Thus, the elements included in the configuration that are the same as those of the cover member 31 and the radar 36 are represented by the same referential numerals and the descriptions thereof are omitted. As shown in FIG. 33, the radar assembly 10 including a cover member for a radar that is a member for attenuating radio waves is provided inside a bumper 38 of a vehicle 11. The member for attenuating radio waves and the radar assembly may be provided in any combination in any appropriate location.

<Resin Composition>

A resin composition includes a resin as a main component. "Main component" means a component included in an amount defined by a lower limit of 50% by weight or greater, 60% by weight or greater, or 70% by weight or greater, and an upper limit of 99% by weight or less, 90% by weight or less, or 80% by weight or less, relative to the entirety of the weight of the resin composition.

Resin as a main component of the resin composition is not particularly limited and preference is given to thermoplastic resin exemplified by polyethylene, polypropylene, polyvinyl alcohol, polyethylene terephthalate, polybutylene terephthalate, ethylene-vinyl acetate copolymer resin, polystyrene, acrylonitrile styrene resin, acrylonitrile-butadiene-styrene copolymer synthetic resin, ASA resin, AES resin, acrylic resin such as PMMA, MS resin, MBS resin, cycloolefin resin, polyacetal resin, polyamide resin, polyester resin, polycarbonate resin, polyurethane resin, liquid crystal polymer, EPDM, PPS, PEEK, PPE, polysulfone-based resin, polyimide-based resin, fluorine-based resin, thermoplastic elastomer, and acrylic elastomer. Among the above, polypropylene, polyethylene, and polyamide resin are preferably used. Photocurable resin such as epoxy resin and acrylic resin and heat-curable resin such as silicone resin may also be used though a curing step is required.

A resin constituting the resin composition may be used alone or multiple types thereof may be used simultaneously. When a resin is used alone, excellent mechanical properties of a radio wave scattering body made of the resin composition are achieved and when multiple types of resins are used simultaneously, an excellent balance between strength and toughness is achieved. When multiple types of resins are used simultaneously, a combination of polypropylene and EPDM (ethylene propylene diene rubber) may be used for example.

A filler may be mixed in the resin composition. Fillers to be mixed are exemplified by carbon black for coloring, inorganic materials such as talc, glass fiber, and minerals for increasing strength, and a softening agent for improving flexibility.

The above talc mixed for increasing strength preferably has a smaller particle diameter D50, and the range thereof is from 0.8 to 50 µm, preferably from 2 to 30 µm, more preferably from 5 to 20 µm from the viewpoint of reinforcing properties and moldability (such as for injection molding).

The above glass fiber used for increasing strength preferably has a longer length, but a length of from 1 to 5 mm is enough to avoid the break of glass fiber during processing. To further increase strength, there is a method in which a glass fiber roving is introduced into an impregnation die, a molten thermoplastic resin is uniformly impregnated between filaments, and the obtained product is thereafter cut into a necessary length (ordinarily from 5 to 20 mm). A glass fiber generally has a columnar shape but a glass fiber having a flat cross-sectional shape may also be used to reduce distortion during molding.

The above minerals used for increasing strength are exemplified by calcium carbonate, silica, clay, mica, silica balloon, aluminum hydroxide, magnesium hydroxide, and titanium oxide. From the viewpoint of price, calcium carbonate or silica is preferred.

The above carbon black used for coloring has a DBP absorption amount measured in accordance with JIS K 6217 or JIS K6221 of 100 mL/100 g or less, for example. From the viewpoint of coloring power, carbon black having a small particle diameter and a large specific surface area is preferred. However, inexpensive and general-purpose carbon black may also be used. The above softening agent is exemplified by paraffin-based oil, naphthene-based oil, and aromatic oil, and one having compatibility with a resin to be used is preferably selected.

A particularly preferred example of a combination of a resin and a filler constituting the resin composition used in the present invention is a combination of polypropylene or polyethylene as a resin and a talc as a reinforcing filler, or a combination of a polyamide resin as a resin and glass fiber as a reinforcing filler.

The resin composition used in the present invention may include a resin and a reinforcing material, and additives other than a softening agent. Such additives are exemplified by a fire retardant, an impact modifier, a reinforcing agent, a compatibilizer, a weatherability improver, an antioxidant, a pigment, and a dye.

The resin composition in which the above filler is mixed can be obtained for example by mixing (or kneading) components in a predetermined blending proportion with a single or multi screw kneader, a batch type mixer such as Labo Plastomill, or a roll kneader, or by mixing components dissolved or suspended in a solvent. In terms of productivity, particularly a method of mixing components with a kneader or a batch type mixer is preferably used.

Methods for molding a cover member using the above resin composition, where the cover member is provided in a bumper of a vehicle are exemplified by injection molding, press molding, blow molding, vacuum molding, cutting, modelling using photocurable resin, and modelling using a 3D printer.

Among the above molding methods, injection molding with excellent productivity is preferred. A resin composition used in injection molding is generally mixed with a twin-screw kneader, and the obtained mixed resin is pelletized. The obtained resin pellets are fed into an injection molder, melted, injected into a molding having a predetermined shape, cooled and solidified, and is thereafter removed to obtain a molded body.

The resin composition can transmit at least 20% of incident radio waves perpendicular to a flat plate with a thickness of 3 mm made of the resin composition.

The resin composition has a complex relative dielectric constant and is designed so as to have the imaginary part $\varepsilon''$ of the relative dielectric constant being preferably 0.1 or less, more preferably 0.07 or less, still more preferably 0.05 or less at any one of frequencies of from 10 to 300 GHz. When the imaginary part $\varepsilon''$ of the relative dielectric constant is in the above range, materials such as dielectric loss materials or magnetic loss materials do not need to be included in the resin composition, and weight reduction or low-cost production are achieved. In addition, it is generally known that the resin composition absorbs no radio waves at a corresponding frequency when the imaginary part $\varepsilon''$ of the relative dielectric constant is in the above range.

The resin composition preferably has a relative dielectric constant with a real part $\varepsilon'$ of 2 or greater and 4 or less, more preferably 2.1 or greater and 3.5 or less, and still more preferably 2.2 or greater and 3.0 or less at any one of frequencies of from 10 to 300 GHz.

EXAMPLES

Radio wave scattering bodies according to the present invention are further described with reference to, but not limited to, examples below.

Example 1

Pelletized acrylic elastomer (LA2330, produced by Kuraray Co., Ltd.) was press-molded into a flat plate with a thickness of 3.0 mm using a 50-t vacuum press machine (MS-VPF-50, produced by Meisho-Press Co., Ltd.) under the conditions of a heating plate temperature being 160° C. and a pressing time being 20 seconds. The obtained flat-plate resin molding was cut into a flat-plate support section having a width Q of 50 mm, a length P of 50 mm, and a thickness T1 of 3.0 mm. Subsequently, a flat-plate acrylic elastomer with a thickness of 2.0 mm was obtained in the same way, and the obtained flat-plate acrylic elastomer was cut into a predetermined number of rectangular solids as projections (projection streaks), having a rectangular cross section being perpendicular to a longitudinal direction, a height H of 2.0 mm, a width W of 4.0 mm, and a length of 50 mm. The obtained projection streaks were adhered onto one surface of the support section with a double-sided tape (No. 5000NS, produced by Nitto Denko Corporation) such that an interval S between adjacent projection streaks is 4.0 mm, to prepare a radio wave scattering body. The properties of the obtained radio wave scattering body are summarized in Table 5-1.

Example 2

A radio wave scattering body was prepared by the same method as that described in Example 1 except for the height H of a projection streak being 4.0 mm. The properties of the obtained radio wave scattering body are summarized in Table 5-1.

Example 3

A radio wave scattering body was prepared by the same method as that described in Example 2 except for using a polypropylene plate (dielectric constant real part: 2.3, imaginary part: 0.0) as a resin composition. The properties of the obtained radio wave scattering body are summarized in Table 5-1.

Example 4

One hundred parts by weight of polypropylene (EA9HD, produced by Japan Polypropylene Corporation) and 7.3 parts by weight of carbon black for coloring (#50 (absorbed amount of iodine: 23 mg/g, absorbed amount of DBP: 63 mL/100 g), produced by Asahi Carbon Co., Ltd.) were fed through a feeding port in the order of polypropylene and carbon black and were melted and kneaded at a temperature of 200° C. in a Labo Plastomill (produced by Toyo Seiki Seisaku-sho, Ltd.) to prepare a resin composition.

The resin composition was removed from the Labo Plastomill and was press-molded into a flat plate with a thickness of 3.0 mm using a 50-t vacuum press machine (MS-VPF-50, produced by Meisho-Press Co., Ltd.) under the conditions of a heating plate temperature being 200° C. and a pressing time being 20 seconds. The press-molded flat-plate resin composition was cut into a support section having a width Q of 50 mm, a length P of 50 mm, and a thickness T1 of 3.0 mm.

A resin composition press-molded into a flat plate with a thickness of 2.0 mm was obtained in the same way, and the obtained flat-plate resin composition was cut into a predetermined number of rectangular solids as projections (projection streaks), having a rectangular cross section being perpendicular to a longitudinal direction, a height H of 3.0 mm, a width W of 4.0 mm, and a length of 50 mm. The obtained projection streaks were adhered onto one surface of the support section with a double-sided tape (No. 5000NS, produced by Nitto Denko Corporation) such that an interval S between adjacent projection streaks was 4.0 mm, to prepare a radio wave scattering body. The properties of the obtained radio wave scattering body are summarized in Table 5-1.

Example 4.1

A radio wave scattering body was prepared by the same method as that described in Example 4 except for employing the height H of a projection streak being 2.0 mm. The properties of the obtained radio wave scattering body are summarized in Table 5-1.

Example 4.2

A radio wave scattering body was prepared by the same method as that described in Example 4 except for employing the height H of a projection streak being 2.5 mm. The properties of the obtained radio wave scattering body are summarized in Table 5-1.

Example 4.3

A radio wave scattering body was prepared by the same method as that described in Example 4 except for employing the height H of a projection streak being 4.0 mm. The properties of the obtained radio wave scattering body are summarized in Table 5-1.

Example 4.4

A radio wave scattering body was prepared by the same method as that described in Example 4 except for employing the height H of a projection streak being 6.0 mm. The properties of the obtained radio wave scattering body are summarized in Table 5-1.

Example 5

A resin composition prepared in the same way as that described in Example 4 was press-molded into a flat plate with a thickness of 3 mm using a 50-t vacuum press machine (MS-VPF-50, produced by Meisho-Press Co., Ltd.) under the conditions of a heating plate temperature being 200° C. and a pressing time being 20 seconds. The press-molded flat-plate resin composition was cut into a support section having a width Q of 50 mm, a length P of 50 mm, and a thickness T1 of 3 mm.

A resin composition prepared in the same way as that described in Example 4 was press-molded into a flat plate with a thickness of 5.0 mm using a 50-t vacuum press machine (MS-VPF-50, produced by Meisho-Press Co., Ltd.) under the conditions of a heating plate temperature being 200° C. and a pressing time being 20 seconds. As projections (projection streaks), two sheets of the resin composition that was press-molded into a flat plate with a thickness of 5.0 mm were adhered to each other and was cut such that regular quadrangular pyramids each having a height H of 9.0 mm and a length W of one side of the bottom face of 9.0 mm were arranged in a matrix in which an interval S between adjacent regular quadrangular pyramids was 0.0 mm. This was adhered onto one surface of the support section with a double-sided tape (No. 5000NS, produced by Nitto Denko Corporation) to prepare a radio wave scattering body. The properties of the obtained radio wave scattering body are summarized in Table 5-1.

Example 6

A radio wave scattering body was prepared by the same method as that described in Example 1 except for employing the height H of a projection streak being 1.0 mm. The properties of the obtained radio wave scattering body are summarized in Table 5-1.

Example 7

A radio wave scattering body was prepared by the same method as that described in Example 1 except for employing the height H of a projection streak being 3.0 mm, the width W of a projection streak being 1.0 mm, and the interval S between adjacent projection streaks being 2.0 mm. The properties of the obtained radio wave scattering body are summarized in Table 5-1.

Example 8

A radio wave scattering body was prepared by the same method as that described in Example 1 except for employing the height H of a projection streak being 3.0 mm, the width W of a projection streak being 16 mm, and the interval S between adjacent projection streaks being 12 mm. The properties of the obtained radio wave scattering body are summarized in
Table 5-2.

Example 9

A radio wave scattering body was prepared by the same method as that described in Example 1 except for employing the height H of a projection streak being 3.0 mm and the interval S between adjacent projection streaks being 20 mm. The properties of the obtained radio wave scattering body are summarized in Table 5-2.

Example 10

As a projection, a polypropylene sphere (1-6602-06, sold by AS ONE Corporation) with a diameter (φ) of 12.7 mm was cut in half to prepare a hemi-sphere having an arc cross-section with a height of 6.4 mm and a width of 12.7 mm. The obtained hemi-spheres were arranged on one surface of the flat-plate polypropylene support section with a width Q of 50 mm, a length P of 50 mm, and a thickness T1 of 3.0 mm that was prepared in Example 3 in a matrix in which an interval S between adjacent hemi-spheres was 0.0 mm, and was adhered with a double-sided tape (No. 5000NS, produced by Nitto Denko Corporation) to prepare a radio wave scattering body. The properties of the obtained radio wave scattering body are summarized in Table 5-2.

Example 11

The present example corresponds to the embodiment shown in FIG. 23. A flat-plate polypropylene (dielectric constant real part: 2.3, imaginary part 0.0) with a thickness of 2.4 mm was cut into a strip to prepare a flat-plate support section with a width Q of 50 mm, a length P of 50 mm, and a thickness D of 2.4 mm. Over the whole surface of the support section, through holes with φ 8 were provided with a puncher at an interval U of 3.0 mm in a matrix. Subsequently, a polypropylene plate (dielectric constant real part: 2.3, imaginary part 0.0) with a thickness of 2.0 mm was cut into a predetermined number of rectangular solids having a rectangular cross section being perpendicular to a longitudinal direction, a height H of 2.0 mm, a width W of 2.0 mm, and a length of 50 mm. The obtained rectangular solids were adhered onto one surface of the support section with a double-sided tape (No. 5000NS, produced by Nitto Denko Corporation) such that an interval S between adjacent projection streaks was 9.0 mm and the projection streaks did not overlap with the through holes. Further, a polypropylene plate (dielectric constant real part: 2.3, imaginary part 0.0) was cut into a flat-plate member having a width Q of 50 mm, a length P of 50 mm, and a thickness T3 of 1.0 mm, which was adhered onto the other surface of the support section with a double-sided tape (No. 5000NS, produced by Nitto Denko Corporation) to prepare a radio wave scattering body. The properties of the obtained radio wave scattering body are summarized in Table 5-2.

Example 12

A plate of nylon 6 (dielectric constant real part: 3.5, imaginary part 0.065) with a thickness of 1.0 mm was cut into a strip to prepare a flat-plate support section with a width Q of 50 mm, a length P of 50 mm, and a thickness T1 of 1.0 mm. Subsequently, as projections (projection streaks), a plate of nylon 6 (dielectric constant real part: 3.5, imaginary part 0.0) with a thickness of 1.0 mm was cut into a predetermined number of rectangular solids having a rectangular cross section being perpendicular to a longitudinal direction, a height H of 1.0 mm, a width W of 4.0 mm, and a length of 50 mm. The obtained projection streaks were adhered onto one surface of the support section with a double-sided tape (No. 5000NS, produced by Nitto Denko Corporation) such that an interval S between adjacent projection streaks was 4.0 mm, to prepare a radio wave scattering body. The properties of the obtained radio wave scattering body are summarized in Table 5-2.

Example 13

A radio wave scattering body was prepared by the same method as that described in Example 12 except for employing the height H of a projection streak being 2.0 mm. The properties of the obtained radio wave scattering body are summarized in Table 5-2.

Example 14

A flat-plate support section having a width Q of 50 mm, a length P of 50 mm, and a thickness T1 of 3.0 mm was prepared in the same way as that described in Example 2. Subsequently, as projections (projection streaks), a polypropylene plate (dielectric constant real part: 2.3, imaginary part: 0.0) with a thickness of 4.0 mm was cut into a predetermined number of rectangular solids having a height H of 4.0 mm, a width W of 2.0 mm, and a length of 50 mm; a height H of 4.0 mm, a width W of 4.0 mm, and a length of 50 mm; and a height H of 4.0 mm, a width W of 8.0 mm, and a length of 50 mm, each rectangular solid having a rectangular cross section being perpendicular to a longitudinal direction. The obtained rectangular solids were adhered onto one surface of the support section with a double-sided tape (No. 5000NS, produced by Nitto Denko Corporation) such that a unit in which the projection streaks with widths of 2.0 mm, 4.0 mm, and 8.0 mm were arranged in this order with an interval of 4.0 mm was repeated to prepare a radio wave scattering body. The properties of the obtained radio wave scattering body are summarized in Table 5-2.

Example 15

A radio wave scattering body was prepared by the same method as that described in Example 3 except for employing the width W of a projection streak being 2.0 mm. The properties of the obtained radio wave scattering body are summarized in Table 6-1.

Example 16

A radio wave scattering body was prepared by the same method as that described in Example 3 except for employing the height H of a projection streak being 2.0 mm. The properties of the obtained radio wave scattering body are summarized in Table 6-1.

Example 17

A radio wave scattering body was prepared by the same method as that described in Example 3 except for employing the height H of a projection streak being 3.0 mm. The properties of the obtained radio wave scattering body are summarized in Table 6-1.

Example 18

A radio wave scattering body was prepared by the same method as that described in Example 3 except for employing the height H of a projection streak being 5.0 mm. The properties of the obtained radio wave scattering body are summarized in Table 6-1.

Example 19

A radio wave scattering body was prepared by the same method as that described in Example 3 except for employing the height H of the projection streak being 7.0 mm. The properties of the obtained radio wave scattering body are summarized in Table 6-1.

Example 20

A radio wave scattering body was prepared by the same method as that described in Example 12 except for employing the height H of a projection streak being 3.0 mm. The properties of the obtained radio wave scattering body are summarized in Table 6-1.

Example 21

A radio wave scattering body was prepared by the same method as that described in Example 3 except for employing the height H of a projection streak being 9.0 mm. The properties of the obtained radio wave scattering body are summarized in Table 6-1.

Example 22

A radio wave scattering body was prepared by the same method as that described in Example 3 except for employing the height H of a projection streak being 12 mm. The properties of the obtained radio wave scattering body are summarized in Table 6-1.

Example 23

A radio wave scattering body was prepared by the same method as that described in Example 3 except for employing the width W of a projection streak being 1.0 mm. The properties of the obtained radio wave scattering body are summarized in Table 6-1.

Example 24

A radio wave scattering body was prepared by the same method as that described in Example 2 except for employing the height H of a projection streak being 3.0 mm and the width W of a projection streak being 16 mm. The properties of the obtained radio wave scattering body are summarized in Table 6-1.

Example 25

A radio wave scattering body was prepared by the same method as that described in Example 3 except for employing the width W of a projection streak being 16 mm. The properties of the obtained radio wave scattering body are summarized in Table 6-1.

Example 26

A radio wave scattering body was prepared by the same method as that described in Example 4 except for employing the interval S between adjacent projection streaks being 20 mm. The properties of the obtained radio wave scattering body are summarized in Table 6-2.

Example 27

A radio wave scattering body was prepared by the same method as that described in Example 3 except for employing the interval S between adjacent projection streaks being 20 mm. The properties of the obtained radio wave scattering body are summarized in Table 6-2.

Example 28

A radio wave scattering body was prepared by the same method as that described in Example 12 except for employing the height H of a projection being 2.0 mm, the width W of a projection streak being 1.0 mm, and the interval S between adjacent projection streaks being 1.0 mm. The properties of the obtained radio wave scattering body are summarized in Table 6-2.

Example 29

A radio wave scattering body was prepared by the same method as that described in Example 28 except for employing the interval S between adjacent projection streaks being 12 mm. The properties of the obtained radio wave scattering body are summarized in Table 6-2.

Example 30

A radio wave scattering body was prepared by the same method as that described in Example 28 except for employing the width W of the projection streak being 12 mm. The properties of the obtained radio wave scattering body are summarized in Table 6-2.

Example 31

A radio wave scattering body was prepared by the same method as that described in Example 28 except for employing the width W of a projection streak being 12 mm and the interval S between adjacent projection streaks being 12 mm. The properties of the obtained radio wave scattering body are summarized in Table 6-2.

Example 32

A radio wave scattering body was prepared by the same method as that described in Example 3 except for employing the height H of a projection being 6.0 mm, the width W of a projection streak being 1.0 mm and the interval S between adjacent projection streaks being 1.0 mm. The properties of the obtained radio wave scattering body are summarized in Table 6-2.

Example 33

A radio wave scattering body was prepared by the same method as that described in Example 32 except for employing the interval S between adjacent projection streaks being 12 mm. The properties of the obtained radio wave scattering body are summarized in Table 6-2.

Example 34

A radio wave scattering body was prepared by the same method as that described in Example 32 except for employing the width W of a projection streak being 12 mm. The properties of the obtained radio wave scattering body are summarized in Table 6-2.

Example 35

A radio wave scattering body was prepared by the same method as that described in Example 32 except for employing the width W of the projection streak being 12 mm and the interval S between adjacent projection streaks being 12 mm. The properties of the obtained radio wave scattering body are summarized in Table 6-2.

Example 36

A flat-plate support section having a width Q of 50 mm, a length P of 50 mm, and a thickness T1 of 3.0 mm was prepared in the same way as that described in Example 12. Subsequently, a plate of nylon 6 (dielectric constant real part: 3.5, imaginary part 0.065) with a thickness of 2.0 mm was cut into a regular quadrangular prism with a height H being 2.0 mm, and a length W of one side of the bottom face being 1.0 mm. On one surface of the support section, the obtained regular quadrangular prisms were arranged in a matrix such that an interval S between adjacent regular quadrangular prisms was 1.0 mm and were adhered onto the support section with a double-sided tape (No. 5000NS, produced by Nitto Denko Corporation) to prepare a radio wave scattering body. The properties of the obtained radio wave scattering body are summarized in Table 6-3.

Example 37

A radio wave scattering body was prepared by the same method as that described in Example 36 except for employing the interval S between adjacent regular quadrangular prisms being 12 mm. The properties of the obtained radio wave scattering body are summarized in Table 6-3.

Example 38

A radio wave scattering body was prepared by the same method as that described in Example 36 except for employing the width W of a regular quadrangular prism being 12 mm. The properties of the obtained radio wave scattering body are summarized in Table 6-3.

Example 39

A radio wave scattering body was prepared by the same method as that described in Example 36 except for employing the width W of a regular quadrangular prism being 12 mm and the interval S between adjacent regular quadrangular prisms being 12 mm. The properties of the obtained radio wave scattering body are summarized in Table 6-3.

Example 40

A radio wave scattering body was prepared by the same method as that described in Example 36 except for using as a support section a flat-plate polypropylene (dielectric constant real part: 2.3, imaginary part: 0.0) with a width Q of 50 mm, a length P of 50 mm, and a thickness T1 of 3.0 mm as described in Example 3, and using a plate of polypropylene (dielectric constant real part: 2.3, imaginary part: 0.0) with a thickness of 6.0 mm in the preparation of a regular quadrangular prism with a height H of 6.0 mm. The properties of the obtained radio wave scattering body are summarized in Table 6-3.

Example 41

A radio wave scattering body was prepared by the same method as that described in Example 40 except for employing the interval S between adjacent regular quadrangular prisms being 12 mm. The properties of the obtained radio wave scattering body are summarized in Table 6-3.

Example 42

A radio wave scattering body was prepared by the same method as that described in Example 40 except for employing the width W of a regular quadrangular prism being 12 mm. The properties of the obtained radio wave scattering body are summarized in Table 6-3.

Example 43

A radio wave scattering body was prepared by the same method as that described in Example 40 except for employing the width W of a regular quadrangular prism being 12 mm and the interval S between adjacent regular quadrangular prisms being 12 mm. The properties of the obtained radio wave scattering body are summarized in Table 6-3.

Example 44

A flat-plate support section having a width Q of 50 mm, a length P of 50 mm, and a thickness T1 of 3.0 mm was prepared in the same way as that described in Example 12. Subsequently, a plate of nylon 6 (dielectric constant real part: 3.5, imaginary part 0.065) with a thickness of 2.0 mm was cut into a predetermined number of triangular prisms as projections (projection streaks) each having an isosceles triangular cross section being perpendicular to a longitudinal direction, a height H of 2.0 mm, a length (width) W of the bottom line of the cross-sectional isosceles triangle of 1.0 mm, and a length of 50 mm. The obtained projection streaks were adhered with a double-sided tape (No. 5000NS, produced by Nitto Denko Corporation) onto one surface of the support section such that an interval S between adjacent projection streaks was 1.0 mm, to prepare a radio wave scattering body. The properties of the obtained radio wave scattering body are summarized in Table 6-4.

Example 45

A radio wave scattering body was prepared by the same method as that described in Example 44 except for employing the interval S between adjacent projection streaks being 12 mm. The properties of the obtained radio wave scattering body are summarized in Table 6-4.

Example 46

A radio wave scattering body was prepared by the same method as that described in Example 44 except for employing the width W of a projection streak being 12 mm. The properties of the obtained radio wave scattering body are summarized in Table 6-4.

Example 47

A radio wave scattering body was prepared by the same method as that described in Example 44 except for employing the width W of a projection streak being 12 mm and the interval S between adjacent projection streaks being 12 mm. The properties of the obtained radio wave scattering body are summarized in Table 6-4.

Example 48

A radio wave scattering body was prepared by the same method as that described in Example 44 except for using as the support section a flat-plate polypropylene (dielectric constant real part: 2.3, imaginary part: 0.0) with a width Q of 50 mm, a length P of 50 mm, and a thickness T1 of 3.0 mm as described in Example 3, and using a plate of polypropylene (dielectric constant real part: 2.3, imaginary part: 0.0) with a thickness of 6.0 mm in the preparation of a triangular prism, and employing a projection streak with a height H of 6.0 mm. The properties of the obtained radio wave scattering body are summarized in Table 6-4.

Example 49

A radio wave scattering body was prepared by the same method as that described in Example 48 except for employing the interval S between adjacent projection streaks being 12 mm. The properties of the obtained radio wave scattering body are summarized in Table 6-4.

Example 50

A radio wave scattering body was prepared by the same method as that described in Example 48 except for employing the width W of a projection streak being 12 mm. The properties of the obtained radio wave scattering body are summarized in Table 6-4.

Example 51

A radio wave scattering body was prepared by the same method as that described in Example 48 except for employing the width W of a projection streak being 12 mm and the interval S between adjacent projection streaks being 12 mm. The properties of the obtained radio wave scattering body are summarized in Table 6-4.

Example 52

A radio wave scattering body was prepared by the same method as that described in Example 28 except for employing the interval S between adjacent projection streaks being 2.0 mm. The properties of the obtained radio wave scattering body are summarized in Table 6-5.

Example 53

A radio wave scattering body was prepared by the same method as that described in Example 19 except for employing the interval S between adjacent projection streaks being 11 mm. The properties of the obtained radio wave scattering body are summarized in Table 6-5.

Example 54

A radio wave scattering body was prepared by the same method as that described in Example 30 except for employing the interval S between adjacent projection streaks being 2.0 mm. The properties of the obtained radio wave scattering body are summarized in Table 6-5.

Example 53

A radio wave scattering body was prepared by the same method as that described in Example 31 except for employing the interval S between adjacent projection streaks being 11 mm. The properties of the obtained radio wave scattering body are summarized in Table 6-5.

Example 56

A radio wave scattering body was prepared by the same method as that described in Example 32 except for employing the interval S between adjacent projection streaks being 2.0 mm. The properties of the obtained radio wave scattering body are summarized in Table 6-5.

Example 57

A radio wave scattering body was prepared by the same method as that described in Example 34 except for employing the interval S between adjacent projection streaks being 2.0 mm. The properties of the obtained radio wave scattering body are summarized in Table 6-5.

Example 58

A radio wave scattering body was prepared by the same method as that described in Example 35 except for employing the interval S between adjacent projection streaks being 11 mm. The properties of the obtained radio wave scattering body are summarized in Table 6-5.

Example 59

A radio wave scattering body was prepared by the same method as that described in Example 36 except for employing the width W of a regular quadrangular prism being 2.0 mm. The properties of the obtained radio wave scattering body are summarized in Table 6-5.

Example 60

A radio wave scattering body was prepared by the same method as that described in Example 37 except for employing the width W of a regular quadrangular prism being 2.0 mm and the interval S between adjacent regular quadrangular prisms being 10 mm. The properties of the obtained radio wave scattering body are summarized in Table 6-5.

Example 61

A radio wave scattering body was prepared by the same method as that described in Example 39 except for employing the interval S between adjacent regular quadrangular prisms being 11 mm. The properties of the obtained radio wave scattering body are summarized in Table 6-5.

Example 62

A radio wave scattering body was prepared by the same method as that described in Example 40 except for employing the width W of a regular quadrangular prism being 2.0 mm. The properties of the obtained radio wave scattering body are summarized in Table 6-5.

Example 63

A radio wave scattering body was prepared by the same method as that described in Example 41 except for employing the width W of a regular quadrangular prism being 2.0 mm. The properties of the obtained radio wave scattering body are summarized in Table 6-5.

Example 64

A radio wave scattering body was prepared by the same method as that described in Example 43 except for employing the interval S between adjacent regular quadrangular prisms being 11 mm. The properties of the obtained radio wave scattering body are summarized in Table 6-5.

Example 65

A radio wave scattering body was prepared by the same method as that described in Example 44 except for employing the interval S between adjacent projection streaks being 2.0 mm. The properties of the obtained radio wave scattering body are summarized in Table 6-6.

Example 66

A radio wave scattering body was prepared by the same method as that described in Example 45 except for employing the interval S between adjacent projection streaks being 11 mm. The properties of the obtained radio wave scattering body are summarized in Table 6-6.

Example 67

A radio wave scattering body was prepared by the same method as that described in Example 48 except for employing the interval S between adjacent projection streaks being 2.0 mm. The properties of the obtained radio wave scattering body are summarized in Table 6-6.

Example 68

A radio wave scattering body was prepared by the same method as that described in Example 51 except for employing the interval S between adjacent projection streaks being 11 mm. The properties of the obtained radio wave scattering body are summarized in Table 6-6.

Example 69

A radio wave scattering body was prepared by the same method as that described in Example 40 except for employing the height H of a projection being 4.0 mm, the width W of a regular quadrangular prism being 4.0 mm, and the interval S between adjacent regular quadrangular prisms being 4.0 mm. The properties of the obtained radio wave scattering body are summarized in Table 6-6.

Example 70

A radio wave scattering body was prepared by the same method as that described in Example 69 except for employing a zigzag arrangement in which obliquely adjacent regular quadrangular prisms were in contact with each other at their lateral edges and an interval S between the regular quadrangular prisms being adjacent in longitudinal direction and in transverse direction was 4.0 mm. The properties of the obtained radio wave scattering body are summarized in Table 6-6.

Example 71

A radio wave scattering body was prepared by the same method as that described in Example 48 except for employing the height H of a projection being 4.0 mm and the width W of a projection streak being 4.0 mm. The properties of the obtained radio wave scattering body are summarized in Table 6-6.

Example 72

A radio wave scattering body was prepared by the same method as that described in Example 48 except for employing the height H of a projection being 4.0 mm, the width W of a projection streak being 4.0 mm, and the interval S between adjacent projection streaks being 2.0 mm. The properties of the obtained radio wave scattering body are summarized in Table 6-6.

Example 73

A radio wave scattering body was prepared by the same method as that described in Example 48 except for employing the height H of a projection being 4.0 mm, the width W of a projection streak being 4.0 mm, and the interval S between adjacent projection streaks being 3.0 mm. The properties of the obtained radio wave scattering body are summarized in Table 6-6.

Example 74

A radio wave scattering body was prepared by the same method as that described in Example 48 except for employing the height H of a projection being 4.0 mm, the width W of a projection streak being 4.0 mm, and the interval S between adjacent projection streaks being 4.0 mm. The properties of the obtained radio wave scattering body are summarized in Table 6-6.

Example 75

A UV-curable acrylic resin (dielectric constant real part: 2.5, imaginary part: 0.050) was formed into a flat-plate member with a width Q of 50 mm, a length P of 50 mm, and a thickness T1 of 3.0 mm using a 3D printer (AGILISTA, produced by KEYENCE Corporation) to prepare a support section. Similarly, a UV-curable acrylic resin was formed into regular quadrangular pyramids each having a height H of 4.0 mm and a length W of one side of the bottom face of 4.0 mm using a 3D printer (AGILISTA, produced by KEYENCE Corporation). The obtained regular quadrangular pyramids were adhered onto one surface of the support section with a double-sided tape (No. 5000NS, produced by Nitto Denko Corporation) such that an interval S between adjacent regular quadrangular pyramids was 2.0 mm, to prepare a radio wave scattering body. The properties of the obtained radio wave scattering body are summarized in Table 6-6.

Example 76

A radio wave scattering body was prepared by the same method as that described in Example 75 except for employing the interval S between adjacent regular quadrangular pyramids being 4.0 mm. The properties of the obtained radio wave scattering body are summarized in Table 6-6.

Example 77

A flat-plate support section having a width Q of 50 mm, a length P of 50 mm, and a thickness T1 of 3.0 mm was prepared in the same way as that described in Example 3. Subsequently, a cylinder of polypropylene (dielectric constant real part: 2.3, imaginary part: 0.0) with φ 8.0 mm, and a length of 50 mm was cut in half and a predetermined number of semicylinders as projections (projection streaks) each having a semicircular cross section being perpendicular to a longitudinal direction, a height H of 4.0 mm, a diameter (width) W of the cross-sectional semicircle of 8.0 mm, and a length of 50 mm were prepared. The obtained semicylinders were adhered onto one surface of the support section with a double-sided tape (No. 5000NS, produced by Nitto Denko Corporation) such that an interval S between adjacent projection streaks was 1.0 mm, to prepare a radio wave scattering body. The properties of the obtained radio wave scattering body are summarized in Table 6-7.

Example 78

A radio wave scattering body was prepared by the same method as that described in Example 77 except for employing the interval S between adjacent projection streaks being 2.0 mm. The properties of the obtained radio wave scattering body are summarized in Table 6-7.

Example 79

A radio wave scattering body was prepared by the same method as that described in Example 77 except for employing the interval S between adjacent projection streaks being 3.0 mm. The properties of the obtained radio wave scattering body are summarized in Table 6-7.

Example 80

A radio wave scattering body was prepared by the same method as that described in Example 77 except for employing the interval S between adjacent projection streaks being 4.0 mm. The properties of the obtained radio wave scattering body are summarized in Table 6-7.

Example 81

A radio wave scattering body was prepared by the same method as that described in Example 10, except for using a polypropylene sphere with φ12.7 mm (1-6602-05, sold by AS ONE Corporation) in the preparation of hemi-spheres and employing a tight arrangement of hemi-spheres in which all the intervals S between a hemi-sphere and six hemi-spheres around the hemi-sphere were 2.0 mm. The properties of the obtained radio wave scattering body are summarized in Table 6-7.

Example 82

A radio wave scattering body was prepared by the same method as that described in Example 81 except for employing the interval S between adjacent hemi-spheres being 4.0 mm. The properties of the obtained radio wave scattering body are summarized in Table 6-7.

Example 83

A flat-plate support section having a width Q of 50 mm, a length P of 50 mm, and a thickness T1 of 3.0 mm was prepared in the same way as that described in Example 75. Subsequently, a UV-curable acrylic resin (dielectric constant real part: 2.5, imaginary part: 0.050) was formed into regular hexagonal prisms each having a height H of 5.0 mm and a length of one side of the bottom face of 2.0 mm (i.e., a width W of 4.0 mm) using a 3D printer (AGILISTA, produced by KEYENCE Corporation). The obtained regular hexagonal prisms were arranged in a honeycomb in which all the intervals S between a regular hexagonal prism and six regular hexagonal prisms around the regular hexagonal prism were 2.0 mm, and were adhered onto one surface of the support section with a double-sided tape (No. 5000NS, produced by Nitto Denko Corporation) to prepare a radio wave scattering body. The properties of the obtained radio wave scattering body are summarized in Table 6-7.

Example 84

Figure 19:
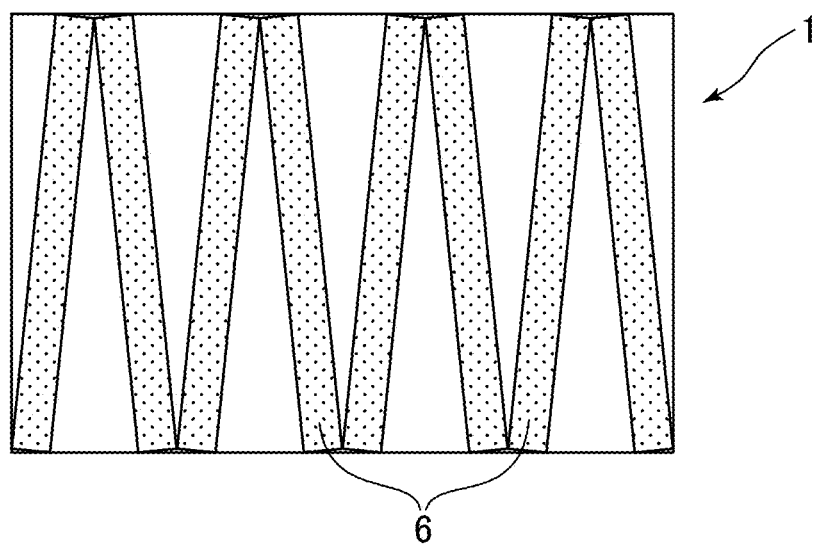
FIG. 19 is a plane view of another embodiment of a radio wave scattering body according to the present invention.

The present example corresponds to the embodiment shown in FIG. 19. A radio wave scattering body was prepared in which the width W of a projection 6 was 2.0 mm and projection streaks were arranged in a zigzag as shown in FIG. 19. The specific arrangement of projection streaks are as follows: each projection streak had a height H of 4.0 mm, a width W of 2.0 mm, and a length of 50 mm. Eight projection streaks were arranged such that one end of a left-most projection streak was arranged nearly approximately with a corner of a support section, an interval between ends on one side of adjacent projection streaks (namely a value measured between portions where facing projections 6 rise from a first principal surface 2) was 8 mm, and ends on the other side of the adjacent projection streaks were in contact with each other. In such an arrangement, an interval between middle points of the adjacent projection streaks in longitudinal directions thereof was 4 mm. The properties of the obtained radio wave scattering body are shown in Table 6-8.

Example 85

Figure 20:
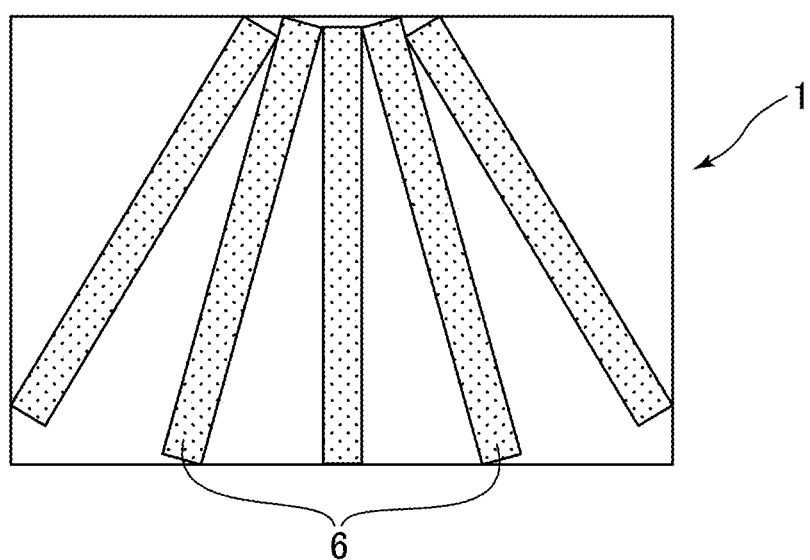
FIG. 20 is a plane view of another embodiment of a radio wave scattering body according to the present invention.

The present example corresponds to the embodiment shown in FIG. 20. A radio wave scattering body was prepared in which the width W of a projection 6 was 2.0 mm and projection streaks were radially arranged as shown in FIG. 20. The specific arrangement of projection streaks are as follows: each projection streak had a height H of 4.0 mm, a width W of 2.0 mm, and a length of 50 mm. A projection streak was arranged on a line connecting the middle points on the upper and lower sides of a support section. On both sides of the projection streak, projection streaks were subsequently arranged such that the upper ends of the adjacent projection streaks were in contact with each other and an interval between the lower ends of the adjacent projection streaks was 8 mm. Further, on each outer side of the projection streaks, a projection streak was arranged such that the upper ends of the adjacent projection streaks were in contact with each other and an interval between the lower ends of the adjacent projection streaks was 8 mm. The properties of the obtained radio wave scattering body are summarized in Table 6-8.

Example 86

The present example corresponds to the embodiment shown in FIG. 25. A flat-plate support section having a width Q of 50 mm, a length P of 50 mm, and a thickness T1 of 3.0 mm was prepared in the same way as that described in Example 3. Subsequently, a polypropylene plate with a thickness of 2.0 mm was cut into a predetermined number of rectangular solids as projections (projection streaks), having a rectangular cross section being perpendicular to a longitudinal direction, a height of 2.0 mm, a width of 4.0 mm, and a length of 50 mm. The obtained projection streaks were adhered onto one surface of the support section with a double-sided tape (No. 5000NS, produced by Nitto Denko Corporation) such that an interval S between adjacent projection streaks was 4.0 mm. Subsequently, a polypropylene plate with a thickness of 2.0 mm was cut into a predetermined number of rectangular solids as projections (projection streaks), having a rectangular cross section being perpendicular to a longitudinal direction, a height of 2.0 mm, a width of 2.0 mm, and a length of 50 mm, and each of them was adhered onto a surface of each of the above projection streaks with a width of 4.0 mm using a double-sided tape (No. 5000NS, produced by Nitto Denko Corporation) such that the centers of the projection streaks in a width direction match with each other, and thereby a radio wave scattering body was prepared. The properties of the obtained radio wave scattering body are summarized in Table 6-8.

Example 87

The present example corresponds to the embodiment shown in FIG. 24. A radio wave scattering body was prepared by the same method as that described in Example 16 except for also adhering projection streaks with a height H of 2.0 mm onto the other surface of the support section in the positions opposite the projection streaks adhered onto one surface of the support section. The properties of the obtained radio wave scattering body are summarized in Table 6-8.

Example 88

A flat-plate support section having a width Q of 50 mm, a length P of 50 mm, and a thickness T1 of 3.0 mm was prepared in the same way as that described in Example 3. Subsequently, a polypropylene plate with a thickness of 4.0 mm was cut into a predetermined number of rectangular solids having a rectangular cross section being perpendicular to a longitudinal direction, a height H of 4.0 mm, a width W of 12 mm, and a length of 50 mm, and thereafter three of the obtained rectangular solids were adhered to each other with a double-sided tape (No. 5000NS, produced by Nitto Denko Corporation) to prepare a predetermined number of rectangular solids as projections (projection streaks) having a height H of 12 mm, a width W of 12 mm, and a length 50 mm. The obtained projection streaks were adhered onto one surface of the support section with a double-sided tape (No. 5000NS, produced by Nitto Denko Corporation) such that an interval S between adjacent projection streaks was 12 mm, to prepare a radio wave scattering body. The properties of the obtained radio wave scattering body are summarized in Table 6-8.

Comparative Example 1

A plate of polypropylene (dielectric constant real part: 2.3, imaginary part: 0.0) with a thickness of 3.0 mm was cut into a flat-plate member with a width Q of 50 mm, a length P of 50 mm, and a thickness T1 of 3.0 mm. The properties of the obtained flat-plate member are summarized in Table 5-2.

Comparative Example 2

A resin composition prepared in the same way as that described in Example 4 was press-molded into a flat plate with a thickness of 3.0 mm using a 50-t vacuum press machine (MS-VPF-50, produced by Meisho-Press Co., Ltd.) under the conditions of a heating plate temperature being 200° C. and a pressing time being 20 seconds. The press-molded resin composition was cut into a flat-plate member having a width Q of 50 mm, a length P of 50 mm, and a thickness T1 of 3 mm. The properties of the obtained flat-plate member are summarized in Table 5-2.

Comparative Example 3

A flat-plate member was prepared in the same way as that described in Comparative Example 1 except for using an acrylic elastomer (LA2330, produced by Kuraray Co., Ltd.) as a resin composition. The properties of the obtained flat-plate member are summarized in Table 5-2.

Comparative Example 4

A plate of polypropylene (dielectric constant real part: 3.5, imaginary part: 0.065) with a thickness of 3.0 mm was cut into a flat-plate member with a width Q of 50 mm, a length P of 50 mm, and a thickness T1 of 3.0 mm. The properties of the obtained flat-plate member are summarized in Table 5-2.

Comparative Example 5

A UV-curable acrylic resin (dielectric constant real part: 2.5, imaginary part: 0.050) was formed into a flat-plate member with a width Q of 50 mm, a length P of 50 mm, and a thickness T1 of 3.0 mm using a 3D printer (AGILISTA, produced by KEYENCE Corporation). The properties of the obtained flat-plate member are summarized in Table 6-8.

TABLE 5-1

| | Resin composition | | Projection | | | | |
|---|---|---|---|---|---|---|---|
| | Real part ε' of relative dielectric constant | Imaginary part ε" of relative dielectric constant | Height [mm] (in terms of wavelength) | Width [mm] (in terms of wavelength) | Length [mm] | Interval between adjacent projections [mm] (in terms of wavelength) | Cross-sectional shape |
| Example 1 | 2.7 | 0.06 | 2.0 (0.51λ) | 4.0 (1.0λ) | 50 (Projection streak) | 4.0 (1.0λ) | Rectangle |
| Example 2 | 2.7 | 0.06 | 4.0 (1.0λ) | 4.0 (1.0λ) | 50 (Projection streak) | 4.0 (1.0λ) | Rectangle |
| Example 3 | 2.3 | 0 | 4.0 (1.0λ) | 4.0 (1.0λ) | 50 (Projection streak) | 4.0 (1.0λ) | Rectangle |
| Example 4 | 2.6 | 0.09 | 3.0 (0.77λ) | 4.0 (1.0λ) | 50 (Projection streak) | 4.0 (1.0λ) | Rectangle |
| Example 4.1 | 2.6 | 0.09 | 2.0 (0.51λ) | 4.0 (1.0λ) | 50 (Projection streak) | 4.0 (1.0λ) | Rectangle |
| Example 4.2 | 2.6 | 0.09 | 2.5 (0.64λ) | 4.0 (1.0λ) | 50 (Projection streak) | 4.0 (1.0λ) | Rectangle |
| Example 4.3 | 2.6 | 0.09 | 4.0 (1.0λ) | 4.0 (1.0λ) | 50 (Projection streak) | 4.0 (1.0λ) | Rectangle |
| Example 4.4 | 2.6 | 0.09 | 6.0 (1.5λ) | 4.0 (1.0λ) | 50 (Projection streak) | 4.0 (1.0λ) | Rectangle |
| Example 5 | 2.6 | 0.09 | 9.0 (2.3λ) | 9.0 (2.3λ) | — (dot) | 0.0 | Triangle |
| Example 6 | 2.7 | 0.06 | 1.0 (0.26λ) | 4.0 (1.0λ) | 50 (Projection streak) | 4.0 (1.0λ) | Rectangle |
| Example 7 | 2.7 | 0.06 | 3.0 (0.77λ) | 1.0 (0.26λ) | 50 (Projection streak) | 2.0 (0.51λ) | Rectangle |

| | Support section Holes | Scattering ratio I [%] | Scattering ratio II [%] | Scattering ratio III [%] | Transmittance [%] | Projection volume ratio [%] | Transmission attenuation amount of transmitted straight wave [dB] |
|---|---|---|---|---|---|---|---|
| Example 1 | None | — | — | — | 67 | 50.0 | 7 |
| Example 2 | None | 2319.9 | 95.9 | — | 67 | 50.0 | 13 |
| Example 3 | None | 385.38 | 79.4 | 91.5 | 90 | 50.0 | 12 |
| Example 4 | None | 1440.1 | 93.5 | 94.2 | 57 | 50.0 | 22 |
| Example 4.1 | None | — | — | — | 57 | 50.0 | 8 |
| Example 4.2 | None | — | — | — | 57 | 50.0 | 14 |
| Example 4.3 | None | — | — | — | 57 | 50.0 | 13 |
| Example 4.4 | None | — | — | — | 57 | 50.0 | 8 |
| Example 5 | None | — | — | — | 57 | 33.3 | 12 |
| Example 6 | None | — | — | — | 67 | 50.0 | 4 |
| Example 7 | None | — | — | — | 67 | 33.3 | 6 |

TABLE 5-2

| | Resin composition | | Projection | | | | |
|---|---|---|---|---|---|---|---|
| | Real part ε' of relative dielectric constant | Imaginary part ε" of relative dielectric constant | Height [mm] (in terms of wavelength) | Width [mm] (in terms of wavelength) | Length [mm] | Interval between adjacent projections [mm] (in terms of wavelength) | Cross-sectional shape |
| Example 8 | 2.7 | 0.06 | 3.0 (0.77λ) | 16 (4.1λ) | 50 (Projection streak) | 12 (3.1λ) | Rectangle |
| Example 9 | 2.7 | 0.06 | 3.0 (0.77λ) | 4.0 (1.0λ) | 50 (Projection streak) | 20 (5.1λ) | Rectangle |

TABLE 5-2-continued

| | | | | | | | |
|---|---|---|---|---|---|---|---|
| Example 10 | 2.3 | 0 | 6.4 (1.6λ) | 12.7 (3.2λ) | — (dot) | 0.0 | Arc cross section |
| Example 11 | 2.3 | 0 | 2.0 (0.51λ) | 2.0 (0.51λ) | 50 (Projection streak + hole) | 9.0 (2.3λ) | Rectangle |
| Example 12 | 3.5 | 0.07 | 1.0 (0.26λ) | 4.0 (1.0λ) | 50 (Projection streak) | 4.0 (1.0λ) | Rectangle |
| Example 13 | 3.5 | 0.07 | 2.0 (0.51λ) | 4.0 (1.0λ) | 50 (Projection streak) | 4.0 (1.0λ) | Rectangle |
| Example 14 | 2.3 | 0 | 4.0 (1.0λ) | 2.0 (0.51λ) 4.0 (1.0λ) 8.0 (2.0λ) | 50 (Projection streak) | 4.0 (1.0λ) | Rectangle |
| Comparative Example 1 | 2.3 | 0 | — | — | — | — | — |
| Comparative Example 2 | 2.6 | 0.09 | — | — | — | — | — |
| Comparative Example 3 | 2.7 | 0.06 | — | — | — | — | — |
| Comparative Example 4 | 3.5 | 0.07 | — | — | — | — | — |

| | Support section Holes | Scattering ratio I [%] | Scattering ratio II [%] | Scattering ratio III [%] | Transmittance [%] | Projection volume ratio [%] | Transmission attenuation amount of transmitted straight wave [dB] |
|---|---|---|---|---|---|---|---|
| Example 8 | None | — | — | — | 67 | 57.1 | 5 |
| Example 9 | None | 6.4 | — | 19.5 | 67 | 33.3 | 4 |
| Example 10 | None | — | — | — | 90 | 53.2 | 8 |
| Example 11 | Provided | — | — | — | 90 | 44.4 | 13 |
| Example 12 | None | 7.9 | 7.3 | 7.6 | 77 | 50.0 | 5 |
| Example 13 | None | — | — | — | 77 | 50.0 | 11 |
| Example 14 | None | 178.37 | 64.1 | 81.8 | 90 | 53.8 | 16 |
| Comparative Example 1 | None | 0.06 | 0.06 | — | 90 | — | 0 |
| Comparative Example 2 | None | — | — | — | 57 | — | 2 |
| Comparative Example 3 | None | — | — | — | 67 | — | 2 |
| Comparative Example 4 | None | — | — | — | 77 | — | 1 |

TABLE 6-1

| | Resin composition | | Projection | | | | |
|---|---|---|---|---|---|---|---|
| | Real part ε' of relative dielectric constant | Imaginary part ε'' of relative dielectric constant | Height [mm] (in terms of wavelength) | Width [mm] (in terms of wavelength) | Length [mm] (in terms of wavelength) | Interval between adjacent projections [mm] (in terms of wavelength) | Cross-sectional shape |
| Example 15 | 2.3 | 0 | 4.0 (1.0λ) | 2.0 (0.5λ) | 50 (Projection streak) | 4.0 (1.0λ) | Rectangle |
| Example 16 | 2.3 | 0 | 2.0 (0.51λ) | 4.0 (1.0λ) | 50 (Projection streak) | 14.0 (1.0λ) | Rectangle |
| Example 17 | 2.3 | 0 | 3.0 (0.77λ) | 4.0 (1.0λ) | 50 (Projection streak) | 4.0 (1.0λ) | Rectangle |
| Example 18 | 2.3 | 0 | 5.0 (1.3λ) | 4.0 (1.0λ) | 50 (Projection streak) | 4.0 (1.0λ) | Rectangle |
| Example 19 | 2.3 | 0 | 7.0 (1.5λ) | 4.0 (1.0λ) | 50 (Projection streak) | 4.0 (1.0λ) | Rectangle |
| Example 20 | 3.5 | 0.065 | 8.0 (0.77λ) | 4.0 (1.0λ) | 50 (Projection streak) | 4.0 (1.0λ) | Rectangle |
| Example 21 | 2.3 | 0 | 9.0 (2.3λ) | 4.0 (1.0λ) | 50 (Projection streak) | 4.0 (1.0λ) | Rectangle |
| Example 22 | 2.3 | 0 | 12 (3.1λ) | 4.0 (1.0λ) | 50 (Projection streak) | 4.0 (1.0λ) | Rectangle |

TABLE 6-1-continued

| | | | | | | | | |
|---|---|---|---|---|---|---|---|---|
| Example 23 | 2.3 | 0 | 4.0 (1.0λ) | 1.0 (0.26λ) | 50 | (Projection streak) | 4.0 (1.0λ) | Rectangle |
| Example 24 | 2.7 | 0.061 | 3.0 (0.77λ) | 16 (4.1λ) | 50 | (Projection streak) | 4.0 (1.0λ) | Rectangle |
| Example 25 | 2.3 | 0 | 4.0 (1.0λ) | 16 (4.1λ) | 50 | (Projection streak) | 4.0 (1.0λ) | Rectangle |

| | Support section Holes | Scattering ratio I [%] | Scattering ratio II [%] | Scattering ratio III [%] | Transmittance [%] | Projection volume ratio [%] | Transmission attenuation amount of transmitted straight wave [dB] |
|---|---|---|---|---|---|---|---|
| Example 15 | None | 9.4 | 8.6 | 69.3 | 90 | 33.3 | 17.5 |
| Example 16 | None | 16.0 | 13.8 | 23.9 | 90 | 50.0 | 2.9 |
| Example 17 | None | 8.8 | 8.1 | 38.9 | 90 | 50.0 | 7.0 |
| Example 18 | None | 807.3 | 89.0 | 96.4 | 90 | 50.0 | 10.1 |
| Example 19 | None | 32.3 | 24.4 | 36.7 | 90 | 50.0 | 4.6 |
| Example 20 | None | 48.7 | 32.7 | 94.3 | 77 | 50.0 | 11.3 |
| Example 21 | None | 1.9 | 1.8 | 5.9 | 90 | 50.0 | 3.8 |
| Example 22 | None | 14.3 | 12.5 | 33.0 | 90 | 50.0 | 5.8 |
| Example 23 | None | 7.7 | 7.1 | 9.7 | 90 | 20.0 | 5.5 |
| Example 24 | None | 6.4 | 6.0 | 19.5 | 67 | 80.0 | 5.1 |
| Example 25 | None | 16.0 | 13.8 | 23.6 | 90 | 80.0 | 3.5 |

TABLE 6-2

| | Resin composition | | Projection | | | | |
|---|---|---|---|---|---|---|---|
| | Real part ε' of relative dielectric constant | Imaginary part ε'' of relative dielectric constant | Height [mm] (in terms of wavelength) | Width [mm] (in terms of wavelength) | Length [mm] (in terms of wavelength) | Interval between adjacent projections [mm] (in terms of wavelength) | Cross-sectional shape |
| Example 26 | 2.6 | 0.091 | 3.0 (1.0λ) | 4.0 (1.0λ) | 50 (Projection streak) | 20 (5.1λ) | Rectangle |
| Example 27 | 2.3 | 0 | 4.0 (1.0λ) | 4.0 (1.0λ) | 50 (Projection streak) | 20 (5.1λ) | Rectangle |
| Example 28 | 3.5 | 0.065 | 2.0 (0.51λ) | 1.0 (0.26λ) | 50 (Projection streak) | 1.0 (0.26λ) | Rectangle |
| Example 29 | 3.5 | 0.065 | 2.0 (0.51λ) | 1.0 (0.26λ) | 50 (Projection streak) | 12 (3.1λ) | Rectangle |
| Example 30 | 3.5 | 0.065 | 2.0 (0.51λ) | 12 (3.1λ) | 50 (Projection streak) | 1.0 (0.26λ) | Rectangle |
| Example 31 | 3.5 | 0.065 | 2.0 (0.51λ) | 12 (3.1λ) | 50 (Projection streak) | 12 (3.1λ) | Rectangle |
| Example 32 | 2.3 | 0 | 6.0 (1.5λ) | 1.0 (0.26λ) | 50 (Projection streak) | 1.0 (0.26λ) | Rectangle |
| Example 33 | 2.3 | 0 | 6.0 (1.5λ) | 1.0 (0.26λ) | 50 (Projection streak) | 12 (3.1λ) | Rectangle |
| Example 34 | 2.3 | 0 | 6.0 (1.5λ) | 12 (3.1λ) | 50 (Projection streak) | 1.0 (0.26λ) | Rectangle |
| Example 35 | 2.3 | 0 | 6.0 (1.5λ) | 12 (3.1λ) | 50 (Projection streak) | 12 (3.1λ) | Rectangle |

| | Support section Holes | Scattering ratio I [%] | Scattering ratio II [%] | Scattering ratio III [%] | Transmittance [%] | Projection volume ratio [%] | Transmission attenuation amount of transmitted straight wave [dB] |
|---|---|---|---|---|---|---|---|
| Example 26 | None | 6.5 | 6.1 | 14.3 | 67 | 16.7 | 3.5 |
| Example 27 | None | 11.7 | 10.5 | 16.6 | 90 | 16.7 | 3.5 |
| Example 28 | None | — | — | — | 72 | 50.0 | 3.8 |
| Example 29 | None | — | — | — | 72 | 7.7 | 3.8 |
| Example 30 | None | — | — | — | 72 | 92.3 | 3.6 |
| Example 31 | None | — | — | — | 72 | 50.0 | 3.3 |
| Example 32 | None | — | — | — | 90 | 50.0 | 3.0 |
| Example 33 | None | — | — | — | 90 | 7.7 | 4.7 |
| Example 34 | None | — | — | — | 90 | 92.3 | 3.3 |
| Example 35 | None | — | — | — | 90 | 50.0 | 3.4 |

TABLE 6-3

| | Resin composition | | Projection | | | | |
|---|---|---|---|---|---|---|---|
| | Real part ε' of relative dielectric constant | Imaginary part ε" of relative dielectric constant | Height [mm] (in terms of wavelength) | Width [mm] (in terms of wavelength) | Length [mm] (in terms of wavelength) | Interval between adjacent projections [mm] (in terms of wavelength) | Cross-sectional shape |
| Example 36 | 3.5 | 0.065 | 2.0 (0.51λ) | 1.0 (0.26λ) | (dot/matrix) | 1.0 (0.26λ) | Rectangle |
| Example 37 | 3.5 | 0.065 | 2.0 (0.51λ) | 1.0 (0.26λ) | (dot/matrix) | 12 (3.1λ) | Rectangle |
| Example 38 | 3.5 | 0.065 | 2.0 (0.51λ) | 12 (3.1λ) | (dot/matrix) | 1.0 (0.26λ) | Rectangle |
| Example 39 | 3.5 | 0.065 | 2.0 (0.51λ) | 12 (3.1λ) | (dot/matrix) | 12 (3.1λ) | Rectangle |
| Example 40 | 2.3 | 0 | 6.0 (1.5λ) | 1.0 (0.26λ) | (dot/matrix) | 1.0 (0.26λ) | Rectangle |
| Example 41 | 2.3 | 0 | 6.0 (1.5λ) | 1.0 (0.26λ) | (dot/matrix) | 12 (3.1λ) | Rectangle |
| Example 42 | 2.3 | 0 | 6.0 (1.5λ) | 12 (3.1λ) | (dot/matrix) | 1.0 (0.26λ) | Rectangle |
| Example 43 | 2.3 | 0 | 6.0 (1.5λ) | 12 (3.1λ) | (dot/matrix) | 12 (3.1λ) | Rectangle |

| | Support section Holes | Scattering ratio I [%] | Scattering ratio II [%] | Scattering ratio III [%] | Transmittance [%] | Projection volume ratio [%] | Transmission attenuation amount of transmitted straight wave [dB] |
|---|---|---|---|---|---|---|---|
| Example 36 | None | — | — | — | 72 | 25.0 | 3.0 |
| Example 37 | None | — | — | — | 72 | 0.6 | 3.0 |
| Example 38 | None | — | — | — | 72 | 85.2 | 7.7 |
| Example 39 | None | — | — | — | 72 | 25.0 | 3.7 |
| Example 40 | None | — | — | — | 90 | 25.0 | 3.4 |
| Example 41 | None | — | — | — | 90 | 0.6 | 3.1 |
| Example 42 | None | — | — | — | 90 | 85.2 | 5.6 |
| Example 43 | None | — | — | — | 90 | 25.0 | 3.0 |

TABLE 6-4

| | Resin composition | | Projection | | | | |
|---|---|---|---|---|---|---|---|
| | Real part ε' of relative dielectric constant | Imaginary part ε" of relative dielectric constant | Height [mm] (in terms of wavelength) | Width [mm] (in terms of wavelength) | Length [mm] (in terms of wavelength) | Interval between adjacent projections [mm] (in terms of wavelength) | Cross-sectional shape |
| Example 44 | 3.5 | 0.065 | 2.0 (0.51λ) | 1.0 (0.26λ) | 50 (Projection streak) | 1.0 (0.26λ) | Triangle |
| Example 45 | 3.5 | 0.065 | 2.0 (0.51λ) | 1.0 (0.26λ) | 50 (Projection streak) | 12 (3.1λ) | Triangle |
| Example 46 | 3.5 | 0.065 | 2.0 (0.51λ) | 12 (3.1λ) | 50 (Projection streak) | 1.0 (0.26λ) | Triangle |
| Example 47 | 3.5 | 0.065 | 2.0 (0.51λ) | 12 (3.1λ) | 50 (Projection streak) | 12 (3.1λ) | Triangle |
| Example 48 | 2.3 | 0 | 6.0 (1.5λ) | 1.0 (0.26λ) | 50 (Projection streak) | 1.0 (0.26λ) | Triangle |
| Example 49 | 2.3 | 0 | 6.0 (1.5λ) | 1.0 (0.26λ) | 50 (Projection streak) | 12 (3.1λ) | Triangle |
| Example 50 | 2.3 | 0 | 6.0 (1.5λ) | 12 (3.1λ) | 50 (Projection streak) | 1.0 (0.26λ) | Triangle |
| Example 51 | 2.3 | 0 | 6.0 (1.5λ) | 12 (3.1λ) | 50 (Projection streak) | 12 (3.1λ) | Triangle |

TABLE 6-4-continued

| | Support section Holes | Scattering ratio I [%] | Scattering ratio II [%] | Scattering ratio III [%] | Transmittance [%] | Projection volume ratio [%] | Transmission attenuation amount of transmitted straight wave [dB] |
|---|---|---|---|---|---|---|---|
| Example 44 | None | — | — | — | 72 | 25.0 | 3.7 |
| Example 45 | None | — | — | — | 72 | 3.8 | 3.6 |
| Example 46 | None | — | — | — | 72 | 46.2 | 4.5 |
| Example 47 | None | — | — | — | 72 | 25.0 | 4.4 |
| Example 48 | None | — | — | — | 90 | 25.0 | 3.5 |
| Example 49 | None | — | — | — | 90 | 3.8 | 5.8 |
| Example 50 | None | — | — | — | 90 | 46.2 | 7.1 |
| Example 51 | None | — | — | — | 90 | 25.0 | 3.3 |

TABLE 6-5

| | Resin composition | | Projection | | | | |
|---|---|---|---|---|---|---|---|
| | Real part $\varepsilon'$ of relative dielectric constant | Imaginary part $\varepsilon''$ of relative dielectric constant | Height [mm] (in terms of wavelength) | Width [mm] (in terms of wavelength) | Length [mm] (in terms of wavelength) | Interval between adjacent projections [mm] (in terms of wavelength) | Cross-sectional shape |
| Example 52 | 3.5 | 0.065 | 2.0 (0.51λ) | 1.0 (0.26λ) | 50 (Projection streak) | 2.0 (0.51λ) | Rectangle |
| Example 53 | 3.5 | 0.066 | 2.0 (0.51λ) | 1.0 (0.26λ) | 50 (Projection streak) | 11 (2.8λ) | Rectangle |
| Example 54 | 3.5 | 0.065 | 2.0 (0.51λ) | 12 (3.1λ) | 50 (Projection streak) | 2.0 (0.51λ) | Rectangle |
| Example 55 | 3.5 | 0.065 | 2.0 (0.51λ) | 12 (3.1λ) | 50 (Projection streak) | 11 (2.8λ) | Rectangle |
| Example 56 | 2.3 | 0 | 6.0 (1.5λ) | 1.0 (0.26λ) | 50 (Projection streak) | 2.0 (0.51λ) | Rectangle |
| Example 57 | 2.3 | 0 | 6.0 (1.5λ) | 12 (3.1λ) | 50 (Projection streak) | 2.0 (0.51λ) | Rectangle |
| Example 58 | 2.3 | 0 | 6.0 (1.5λ) | 12 (3.1λ) | 50 (Projection streak) | 11 (2.8λ) | Rectangle |
| Example 59 | 3.5 | 0.065 | 2.0 (0.51λ) | 2.0 (0.51λ) | (dot/matrix) | 1.0 (0.26λ) | Rectangle |
| Example 60 | 3.5 | 0.065 | 2.0 (0.51λ) | 2.0 (0.51λ) | (dot/matrix) | 10 (2.6λ) | Rectangle |
| Example 61 | 3.5 | 0.065 | 2.0 (0.51λ) | 12 (3.1λ) | (dot/matrix) | 11 (2.8λ) | Rectangle |
| Example 62 | 2.3 | 0 | 6.0 (1.5λ) | 2.0 (0.51λ) | (dot/matrix) | 1.0 (0.26λ) | Rectangle |
| Example 63 | 2.3 | 0 | 6.0 (1.5λ) | 2.0 (0.51λ) | (dot/matrix) | 12 (3.1λ) | Rectangle |
| Example 64 | 2.3 | 0 | 6.0 (1.5λ) | 12 (3.1λ) | (dot/matrix) | 11 (2.8λ) | Rectangle |

| | Support section Holes | Scattering ratio I [%] | Scattering ratio II [%] | Scattering ratio III [%] | Transmittance [%] | Projection volume ratio [%] | Transmission attenuation amount of transmitted straight wave [dB] |
|---|---|---|---|---|---|---|---|
| Example 52 | None | — | — | — | 72 | 33.3 | 9.8 |
| Example 53 | None | — | — | — | 72 | 8.3 | 4.0 |
| Example 54 | None | — | — | — | 72 | 85.7 | 4.6 |
| Example 55 | None | — | — | — | 72 | 52.2 | 5.0 |
| Example 56 | None | — | — | — | 90 | 33.3 | 4.3 |
| Example 57 | None | — | — | — | 90 | 85.7 | 4.1 |
| Example 58 | None | — | — | — | 90 | 52.2 | 4.0 |
| Example 59 | None | — | — | — | 72 | 44.4 | 5.3 |
| Example 60 | None | — | — | — | 72 | 2.8 | 4.1 |
| Example 61 | None | — | — | — | 72 | 27.2 | 4.3 |
| Example 62 | None | — | — | — | 90 | 44.4 | 4.1 |
| Example 63 | None | — | — | — | 90 | 2.0 | 4.2 |
| Example 64 | None | — | — | — | 90 | 27.2 | 4.2 |

TABLE 6-6

| | Resin composition | | Projection | | | | |
|---|---|---|---|---|---|---|---|
| | Real part ε' of relative dielectric constant | Imaginary part ε" of relative dielectric constant | Height [mm] (in terms of wavelength) | Width [mm] (in terms of wavelength) | Length [mm] (in terms of wavelength) | Interval between adjacent projections [mm] (in terms of wavelength) | Cross-sectional shape |
| Example 65 | 3.5 | 0.065 | 2.0 (0.51λ) | 1.0 (0.26λ) | 50 (Projection streak) | 2.0 (0.51λ) | Triangle |
| Example 66 | 3.5 | 0.065 | 2.0 (0.51λ) | 1.0 (0.26λ) | 50 (Projection streak) | 11 (2.8λ) | Triangle |
| Example 67 | 2.3 | 0 | 6.0 (1.5λ) | 1.0 (0.26λ) | 50 (Projection streak) | 2.0 (0.51λ) | Triangle |
| Example 68 | 2.3 | 0 | 6.0 (1.5λ) | 12 (3.1λ) | 50 (Projection streak) | 11 (2.8λ) | Triangle |
| Example 69 | 2.3 | 0 | 4.0 (1.0λ) | 4.0 (1.0λ) | — (dot/matrix) | 4.0 (1.0λ) | Rectangle |
| Example 70 | 2.3 | 0 | 4.0 (1.0λ) | 4.0 (1.0λ) | — (dot/zigzag) | 4.0 (1.0λ) | Rectangle |
| Example 71 | 2.3 | 0 | 4.0 (1.0λ) | 4.0 (1.0λ) | 50 (Projection streak) | 1.0 (0.25λ) | Triangle |
| Example 72 | 2.3 | 0 | 4.0 (1.0λ) | 4.0 (1.0λ) | 50 (Projection streak) | 2.0 (0.5λ) | Triangle |
| Example 73 | 2.3 | 0 | 4.0 (1.0λ) | 4.0 (1.0λ) | 50 (Projection streak) | 3.0 (0.75λ) | Triangle |
| Example 74 | 2.3 | 0 | 4.0 (1.0λ) | 4.0 (1.0λ) | 50 (Projection streak) | 4.0 (1.0λ) | Triangle |
| Example 75 | 2.5 | 0.050 | 4.0 (1.0λ) | 4.0 (1.0λ) | — (dot/matrix) | 2.0 (0.5λ) | Triangle |
| Example 76 | 2.5 | 0.050 | 4.0 (1.0λ) | 4.0 (1.0λ) | — (dot/matrix) | 4.0 (1.0λ) | Triangle |

| | Support section Holes | Scattering ratio I [%] | Scattering ratio II [%] | Scattering ratio III [%] | Transmittance [%] | Projection volume ratio [%] | Transmission attenuation amount of transmitted straight wave [dB] |
|---|---|---|---|---|---|---|---|
| Example 65 | None | — | — | — | 72 | 16.7 | 6.8 |
| Example 66 | None | — | — | — | 72 | 4.2 | 4.1 |
| Example 67 | None | — | — | — | 90 | 16.7 | 4.9 |
| Example 68 | None | — | — | — | 90 | 26.1 | 6.1 |
| Example 69 | None | 14.1 | 12.4 | — | 90 | 25.0 | 8.9 |
| Example 70 | None | — | — | — | 90 | 50.0 | 9.2 |
| Example 71 | None | — | — | — | 90 | 40.0 | 5.3 |
| Example 72 | None | — | — | — | 90 | 33.3 | 9.1 |
| Example 73 | None | — | — | — | 90 | 28.6 | 14.8 |
| Example 74 | None | — | — | — | 90 | 25.0 | 13.8 |
| Example 75 | None | 1.5 | 1.5 | 2.6 | 72 | 44.4 | 4.7 |
| Example 76 | None | — | — | — | 72 | 25.0 | 4.7 |

TABLE 6-7

| | Resin composition | | Projection | | | | |
|---|---|---|---|---|---|---|---|
| | Real part ε' of relative dielectric constant | Imaginary part ε" of relative dielectric constant | Height [mm] (in terms of wavelength) | Width [mm] (in terms of wavelength) | Length [mm] (in terms of wavelength) | Interval between adjacent projections [mm] (in terms of wavelength) | Cross-sectional shape |
| Example 77 | 2.3 | 0 | 4.0 (1.0λ) | 8.0 (2.0λ) | 50 (Projection streak) | 1.0 (0.25λ) | Arc cross section |
| Example 78 | 2.3 | 0 | 4.0 (1.0λ) | 8.0 (2.0λ) | 50 (Projection streak) | 2.0 (0.5λ) | Arc cross section |
| Example 79 | 2.3 | 0 | 4.0 (1.0λ) | 8.0 (2.0λ) | 50 (Projection streak) | 3.0 (0.75λ) | Arc cross section |
| Example 80 | 2.3 | 0 | 4.0 (1.0λ) | 8.0 (2.0λ) | 50 (Projection streak) | 4.0 (1.0λ) | Arc cross section |
| Example 81 | 2.3 | 0 | 4.75 (1.6λ) | 9.5 (3.2λ) | — (dot/tight arrangement) | 2.0 (0.5λ) | Arc cross section |

TABLE 6-7-continued

| | | | | | | | |
|---|---|---|---|---|---|---|---|
| Example 82 | 2.3 | 0 | 4.75 (1.7λ) | 9.5 (3.3λ) | — (dot/tight arrangement) | 4.0 (1.0λ) | Arc cross section |
| Example 83 | 2.5 | 0.050 | 5.0 (1.3λ) | 4.0 (1.0λ) | — (dot/ honeycomb) | 2.0 (0.51λ) | Prism cross section |

| | Support section Holes | Scattering ratio I [%] | Scattering ratio II [%] | Scattering ratio III [%] | Transmittance [%] | Projection volume ratio [%] | Transmission attenuation amount of transmitted straight wave [dB] |
|---|---|---|---|---|---|---|---|
| Example 77 | None | — | — | — | 90 | 69.8 | 4.7 |
| Example 78 | None | — | — | — | 90 | 62.8 | 7.0 |
| Example 79 | None | — | — | — | 90 | 57.1 | 8.2 |
| Example 80 | None | 15.3 | 13.3 | 53.4 | 90 | 52.4 | 8.8 |
| Example 81 | None | — | — | — | 90 | 60.9 | 9.8 |
| Example 82 | None | 6.9 | 6.5 | 38.0 | 90 | 40.0 | 10.6 |
| Example 83 | None | 34.2 | 25.5 | 53.4 | 72 | 43.3 | 14.4 |

[Evaluation]

TABLE 6-8

| | Resin composition | | Projection | | | | |
|---|---|---|---|---|---|---|---|
| | Real part ε' of relative dielectric constant | Imaginary part ε" of relative dielectric constant | Height [mm] (in terms of wavelength) | Width [mm] (in terms of wavelength) | Length [mm] (in terms of wavelength) | Interval between adjacent projections [mm] (in terms of wavelength) | Cross-sectional shape |
| Example 84 | 2.3 | 0 | 4.0 (1.0λ) | 2.0 (0.51λ) | 50 (Projection streak) | 1-8 (Between middle points: 4) | Rectangle |
| Example 85 | 2.3 | 0 | 4.0 (1.0λ) | 2.0 (0.51λ) | 50 (Projection streak) | 1-8 (Between middle points: 4) | Rectangle |
| Example 86 | 2.3 | 0 | Upper layer 2.0 (0.51λ) Lower layer 2.0 (0.51λ) | Upper layer 2.0 (0.51λ) Lower layer 4.0 (1.0λ) | 50 (Projection streak) | 4.0 (1.0λ) | Rectangle |
| Example 87 | 2.3 | 0 | Front 2.0 (0.51λ) Back 2.0 (0.51λ) | 4.0 (1.0λ) | 50 (Projection streak) | 4.0 (1.0λ) | Rectangle |
| Example 88 | 2.3 | 0 | 12 (1.0λ) | 12 (1.0λ) | 50 (Projection streak) | 12 (1.0λ) | Rectangle |
| Comparative Example 5 | 2.5 | 0.050 | — | — | — | — | — |

| | Support section Holes | Scattering ratio I [%] | Scattering ratio II [%] | Scattering ratio III [%] | Transmittance [%] | Projection volume ratio [%] | Transmission attenuation amount of transmitted straight wave [dB] |
|---|---|---|---|---|---|---|---|
| Example 84 | None | 394.7 | 79.8 | 82.1 | 90 | 50.0 | 14.9 |
| Example 85 | None | 129.9 | 56.5 | 83.2 | 90 | 50.0 | 13.5 |
| Example 86 | None | 130.1 | 56.5 | 76.5 | 90 | 37.5 | 14.2 |
| Example 87 | None | 88.5 | 46.9 | 72.0 | 90 | 50.0 | 10.8 |
| Example 88 | None | 556.6 | 84.8 | 89.2 | 90 | 50.0 | 12.0 |
| Comparative Example 5 | None | 0.2 | — | 0.1 | 72 | — | 1.4 |

Measurement of Dimensions:

The dimensions of a radio wave scattering body, the height, width, and length of a projection formed on the radio wave scattering body, and an interval between adjacent projections were measured using a vernier caliper.

Measurement of Scattering Ratio:

A scattering ratio was measured by the same measuring method as that described in the above section [Radio wave scattering body]. Referring to JIS R 1679, a transmission attenuation amount was measured in accordance with the procedures below using a radio wave transmitter/receiver (EAS03, produced by KEYCOM Corporation) at a frequency of 60 to 90 GHz. The transmission attenuation amount is represented by an absolute value of a value calculated from the following formula (1):

$$10 \log |P_i/P_0| \quad (1)$$

($P_i$: received power, $P_0$: transmitted power)

As shown in the outline in FIG. 6, a sample holder 11, a millimeter wave lens 12, a transmitter 9 and a receiver 10 were arranged. The transmitter 9 transmitted a radio wave with a diameter of 150 mm. Radio waves were transmitted and received in a state in which the transmitter 9 and receiver 10 were arranged but no sample was set on the sample holder 11, and the state in which the transmission attenuation amount was 0 dB (total amount of radio waves were transmitted) was determined to be a reference for the measurement of the transmission attenuation amount of an incident radio wave perpendicular to a surface direction of each radio wave scattering body. Subsequently, a radio wave scattering body was set on the sample holder 11, the receiver was arranged at angles of 0°, 15°, 30°, 45°, 60°, and 75°, respectively, relative to a direction from the transmitter 9 to the receiver 10 being perpendicular to a surface direction of each sample, and radio waves were transmitted and received to measure a transmission attenuation amount at a frequency of 76.5 GHz. When the structural body of the radio wave scattering body was a projection streak, the measurement was performed in a state in which a longitudinal direction of the projection streak formed on a first principal surface was perpendicular to an amplitude direction of the electric field of an incident wave. Based on the measured values of the transmission attenuation amount at the angles of 0°, 15°, 30°, 45°, 60°, and 75°, $P_i/P_0$ (ratio of received power/transmitted power) at each angle was calculated from the above formula (1), and based on each calculated value of $P_i/P_0$ (ratio of received power/transmitted power), the scattering ratios I and II were calculated from the formulae (2.1) and (2.2) below.

(Scattering ratio I)=($P_i/P_0$(ratio of received power/transmitted power) at angles of 15°,30°,45°,60°, and 75° in total)/($P_i/P_0$(ratio of received power/transmitted power) at an angle of 0°)×100 (2.1)

(Scattering ratio II)=($P_i/P_0$(ratio of received power/transmitted power) at angles of 15°,30°,45°,60°, and 75° in total)/($P_i/P_0$(ratio of received power/transmitted power) at angles of 0°,15°,30°,45°, 60°, and 75° in total)×100 (2.2)

Here, when the scattering ratio I is d1 and the scattering ratio II is d2, d2 can be converted by the following formula (2.3).

$$d2=(100d1/(100+100d1))\times100 \quad (2.3).$$

Further, in the above method for measuring a scattering ratio, the reception angle of a transmitted wave is determined at an interval of 5° and the scattering ratio III was calculated from the formula (2.4) below.

(Scattering ratio III)=($P_i/P_0$(ratio of received power/transmitted power) at angles of 15°,20°,25°,30°, 35°,40°,45°,50°,55°,60°,65°,70°, and 75° in total)/($P_i/P_0$(ratio of received power/transmitted power) at angles of 0°,5°,10°,15°,20°,25°,30°, 35°,40°,45°,50°,55°,60°,65°,70°, and 75° in total)×100 (2.4)

Figure 34:
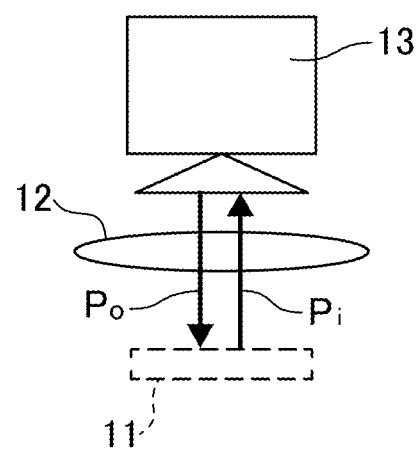
FIG. 34 describes the outline of a method for measuring a reflection attenuation amount.

Measurement of Relative Dielectric Constant and Transmittance:

FIG. 34 describes the outline of a method for measuring a reflection attenuation amount. With respect to the flat-plate members of Comparative Examples 1 to 4, a reflection attenuation amount was first measured with reference to JIS R 1679 in accordance with the procedures below using a radio wave transmitter/receiver (EAS02, produced by KEYCOM Corporation) at a frequency of 70 to 90 GHz. As shown in the outline in FIG. 34, a sample holder 11 and a transmitter/receiver 13 were arranged, a reference metal was set on the sample holder 11, and radio waves were transmitted and received. As the above reference metal, a stainless-steel plate with a size of φ 150 mm and a thickness of 2 mm was used. At that time, a reflection attenuation amount being 0 dB (in other words, the total amount of radio waves were reflected) was used as a standard for measuring a reflection attenuation amount of an incident radio wave perpendicular to a surface direction of each flat-plate member. Then, each flat-plate member was set on the sample holder 11 instead of the above reference metal and radio waves were transmitted and received to measure a reflection attenuation amount.

Next, a transmission attenuation amount was measured for the flat-plate members of Comparative Examples 1 to 4 by the same measurement method as that described in the section (Measurement of transmission attenuation amount) below.

Subsequently, a transmittance was calculated as described below using the values of the reflection attenuation amount and the transmission attenuation amount of transmitted straight waves measured for the flat-plate members of Comparative Examples 1 to 4.

When an air impedance is $Z_0$, a relative magnetic permeability is $\mu_r$ ($=\mu_r'-j\mu_r''$), a relative dielectric constant is $\varepsilon_r$ ($=\varepsilon_r'-j\varepsilon_r''$), and a wavelength is $\lambda$, a material impedance Z, and a propagation constant $\gamma$ are represented by the following formulae (6) and (7).

[Formula 2]

$$Z = Z_0 \sqrt{\frac{\mu_r}{\varepsilon_r}} \quad (6)$$

$$\gamma = (j2\pi/\lambda)\sqrt{\varepsilon_r}\sqrt{\mu_r} \quad (7)$$

When an object has a thickness d, a reflection attenuation amount and a transmission attenuation amount are represented by the formulae (8) and (9) below from the above Z and $\gamma$ based on the transmission line theory:

Transmission attenuation amount (dB)=20 log {2/(A+B/$Z_0$+C$Z_0$+D)} (8)

Reflection attenuation amount (dB)=20 log {(A+B/$Z_0$−C$Z_0$−D)/(A+B/$Z_0$+C$Z_0$+D)} (9), in which A=cosh ($\gamma$d), B=Z sinh ($\gamma$d), C=(1/Z)sinh ($\gamma$d), and D=cosh ($\gamma$d).

Here, $\mu_r$ and expected predetermined $\varepsilon_r$ are substituted into the formulae (6) and (7), and based on the obtained Z and γ, and the measured thickness d, a reflection attenuation amount and a transmission attenuation amount at a frequency of 70 to 90 GHz are calculated from the formulae (8) and (9), respectively.

Figure 35A:
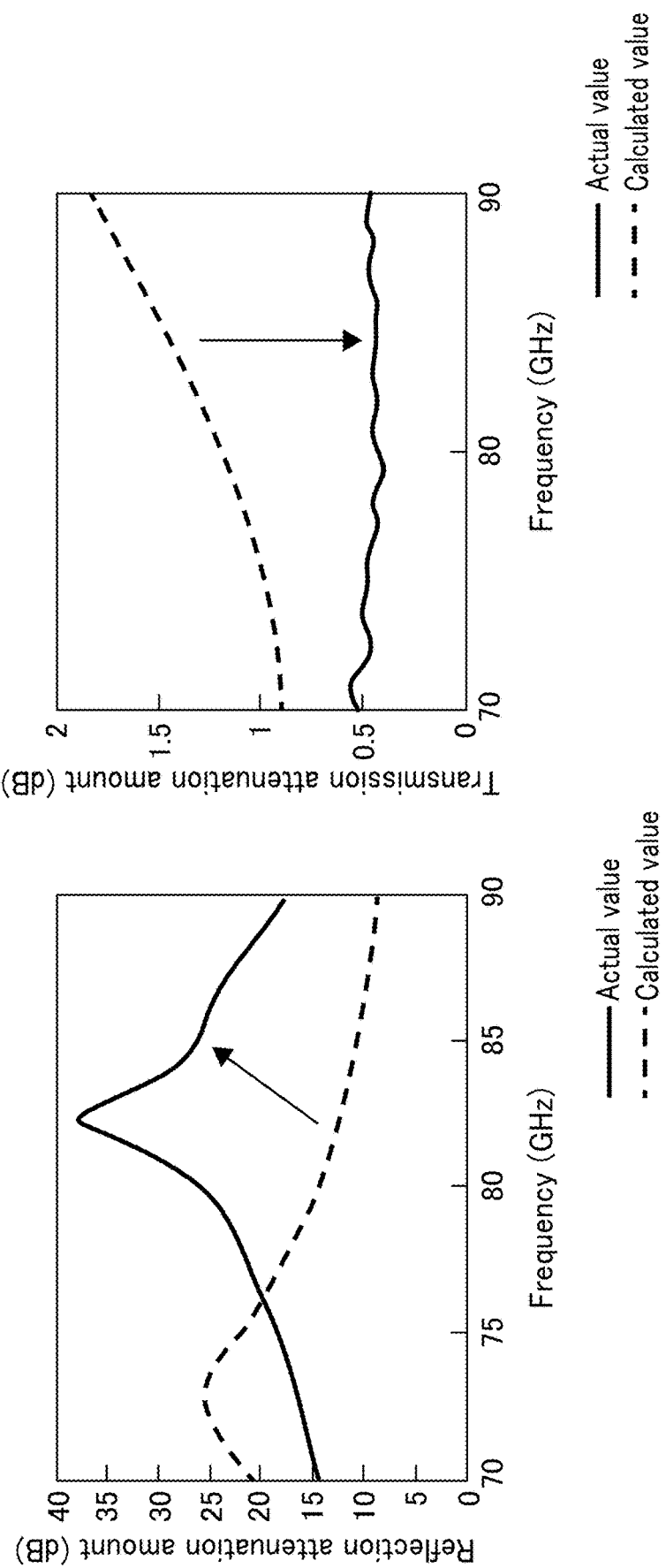
FIG. 35A shows an example of curve fitting in the calculation of transmittance.
Figure 35B:
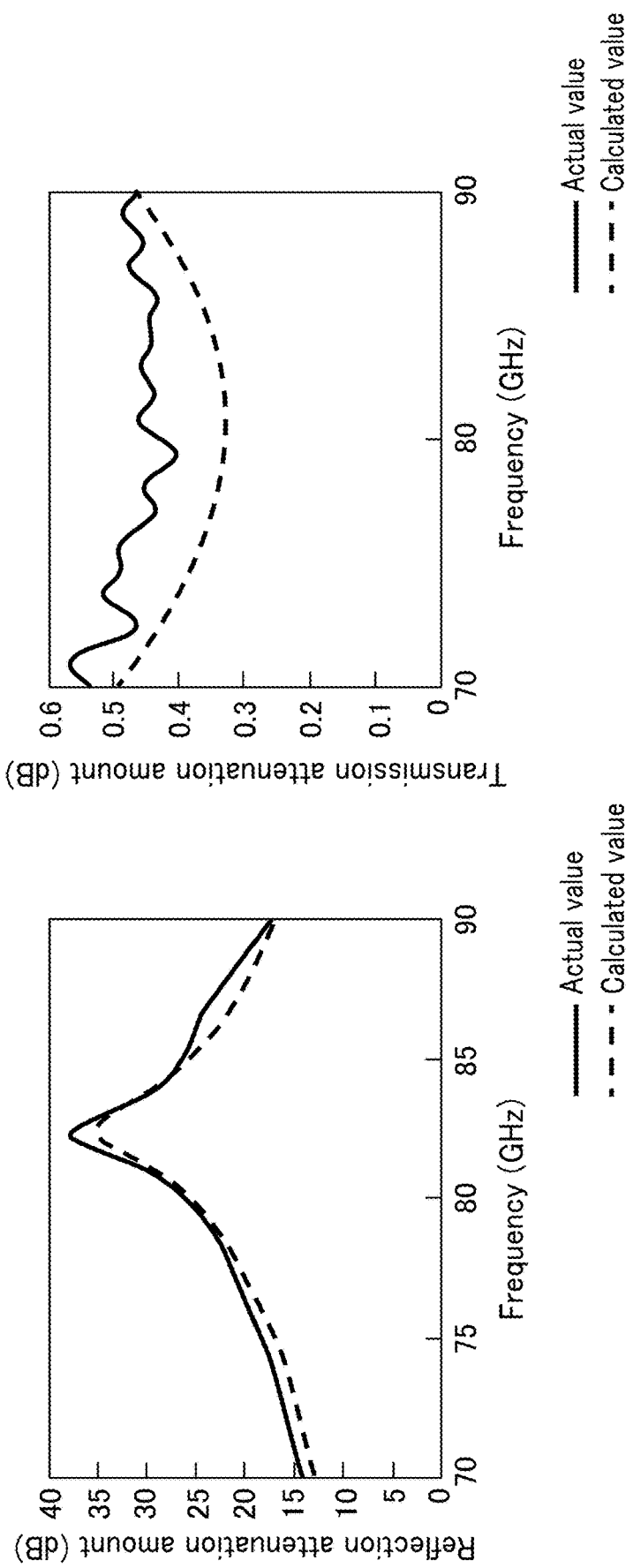
FIG. 35B shows an example of curve fitting in the calculation of transmittance.

With respect to curves of a reflection attenuation amount calculated from measured values and of a reflection attenuation amount calculated from the above formulae (6), (7), and (9), and curves of a transmission attenuation amount calculated from measured values and of a transmission attenuation amount calculated from the above formulae (6) to (8), curve fitting by a method of least squares was performed to derive a likely $\varepsilon_r$, which was used as a relative dielectric constant of each flat-plate member. FIGS. 35A and 35B show examples of the curve fitting. When an expected predetermined $\varepsilon_r$ is set to $\varepsilon_r'$:3.50 and $\varepsilon_r''$:0.20, both curves deviate from each other as shown in FIG. 35A, but when curve fitting by a method of least squares is performed by changing $\varepsilon_r$, an $\varepsilon_r$ being $\varepsilon_r'$:2.73 and $\varepsilon_r''$:0.06 at which an error between both curves is minimum is obtained. At that time, both curves are fitted as shown in FIG. 35B.

Based on Z and γ obtained by substituting the derived $\varepsilon_r$ into the formulae (6) and (7) again, a transmittance (%) when a thickness d is 3 mm is calculated from the following formula (10).

$$\text{Transmittance (\%)}=2/(A+B/Z_0+CZ_0+D)\times 100 \quad (10)$$

Calculation of Transmission Attenuation Amount:

A transmission attenuation amount was measured by the same measurement method as that described in the above section (Measurement of scattering ratio), except for employing a different measurement device, a frequency measurement device, a different diameter of transmitted radio waves, and measuring a transmission attenuation amount of transmitted straight waves alone. Referring to JIS R 1679, a transmission attenuation amount was measured in accordance with the procedures below using a radio wave transmitter/receiver (EAS02, produced by KEYCOM Corporation) at a frequency of 70 to 90 GHz. The transmission attenuation amount is represented by an absolute value of a value calculated from the following formula (1):

$$10 \text{ Log}|P_i/P_0| \quad (1)$$

($P_i$: received power, $P_0$: transmitted power)

As shown in the outline in FIG. 6, a sample holder 11, a millimeter wave lens 12, a transmitter 9 and a receiver 10 were arranged. The transmitter 9 transmitted a radio wave with a diameter of 30 mm. Radio waves were transmitted and received in a state in which the transmitter 9 and receiver 10 were arranged but no sample was set on the sample holder 11, and the state in which the transmission attenuation amount was 0 dB (total amount of radio waves were transmitted) was determined to be a reference for the measurement of the transmission attenuation amount of an incident radio wave perpendicular to a surface direction of each radio wave scattering body. Subsequently, each sample was set on the sample holder 11 and radio waves were transmitted and received to measure a transmission attenuation amount at a frequency of 76.5 GHz. With respect to the radio wave scattering bodies of Examples, the samples were such that a designated projection was imparted to a support body with a width Q of 50 mm and a length P of 50 mm, and in cases of projection streaks, a measurement was performed in a state in which a longitudinal direction of a projection streak formed on a principal surface of the support body was perpendicular to an amplitude direction of the electric field of an incident wave. With respect to measurement positions, measurement was performed at a total of five positions, namely a center position of a sample and further positions displaced by 5 mm and 10 mm from the center position to the left and right, and the obtained values were averaged for evaluation.

Evaluation:

Tables 5-1, 5-2 and 6-1 to 6-8 show: in Examples, the transmission attenuation amount of a transmitted straight wave was 2.9 dB or greater, exceeding the transmission attenuation amount in Comparative Examples being from 0 to 2 dB. This shows that the radio wave scattering bodies in Examples could effectively attenuate transmitted straight waves.

In addition, Tables 5-1, 5-2, and 6-1 to 6-8 show: the transmission attenuation amount of a transmitted straight wave was 4.0 dB or greater in Examples 1 to 4.4, 8, 9, 11, 13, 14, 16 to 19, 21, 54, 57, 60, 61, 63, 69, 70, 72 to 76, and 78 to 82 in which when a wavelength of an incident radio wave is λ, the height H and width W of a projection 6, and the interval S of projections 6 are 0.51λ or greater and 1.5λ or less, 0.26λ or greater and 3.1λ or less, and 0.51λ or greater and 2.6λ or less, respectively, (when a projection 6 is a projection streak, in Examples 1 to 4.4, 7, 8, 9, 11, 13, 14, 16 to 19, 21, 23, 33, 37, 38, 42, 46, 47, 49, 50, 52 to 58, 65 to 68, and 78 to 80 in which the height H, width W, and interval S are 0.51λ or greater and 1.5λ or less, 0.26λ or greater and 3.1λ or less, and 0.26λ or greater and 2.8λ or less, respectively, and when a projection 6 is in a dot shape, in Examples 37, 42, 59 to 64, 69, 70, 72 to 76, 81, and 82 in which the height H, width W, and interval S are 0.51λ or greater and 1.5λ or less, 0.51λ or greater and 3.1λ or less, and 0.51λ or greater and 2.6λ or less, respectively). This exceeds the transmission attenuation amount of a transmitted straight wave in Comparative Examples that was from 0 to 2 dB. This shows that the radio wave scattering bodies in Examples could further effectively attenuate transmitted straight waves.

In addition, Tables 5-1, 5-2, and 6-1 to 6-8 show: with respect to a transmitted straight wave, a transmission attenuation amount of 5.0 dB or greater may be achieved by a projection volume ratio being 3% or greater and 90% or less, a transmission attenuation amount of 10.0 dB or greater may be achieved by a projection volume ratio being 15% or greater and 65% or less, and a transmission attenuation amount of 15.0 dB or greater may be achieved by a projection volume ratio being 25% or greater and 55% or less, whereas in Comparative Examples in which a projection volume ratio is 0%, a transmission attenuation amount is 0 to 2 dB. This can be understood that the radio wave scattering bodies having a projection volume ratio in the above range may effectively attenuate transmitted straight waves.

In addition, Example 11 shows a favorable transmission attenuation amount. This can be understood that a favorable attenuation of transmitted straight waves can be achieved while suppressing the weight increase of a radio wave scattering body by a configuration in which holes are provided on a support section of the radio wave scattering body.

Figure 10:
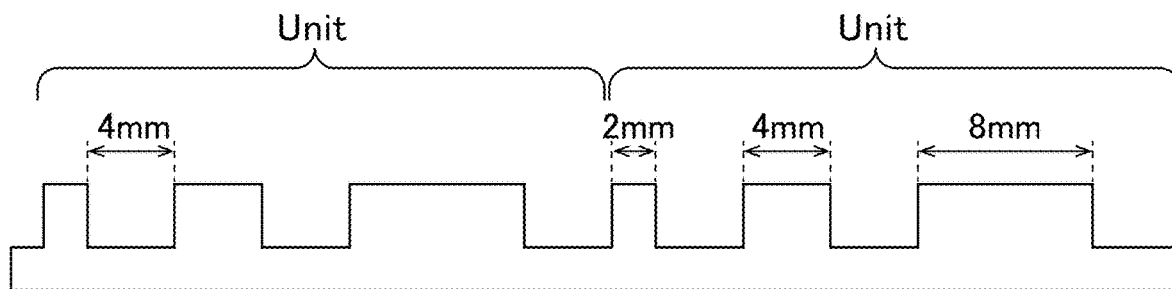
FIG. 10 is a cross-sectional view of an example of a radio wave scattering body in a shape such that a unit in which projections having different widths are arranged is repeated.
Figure 11:
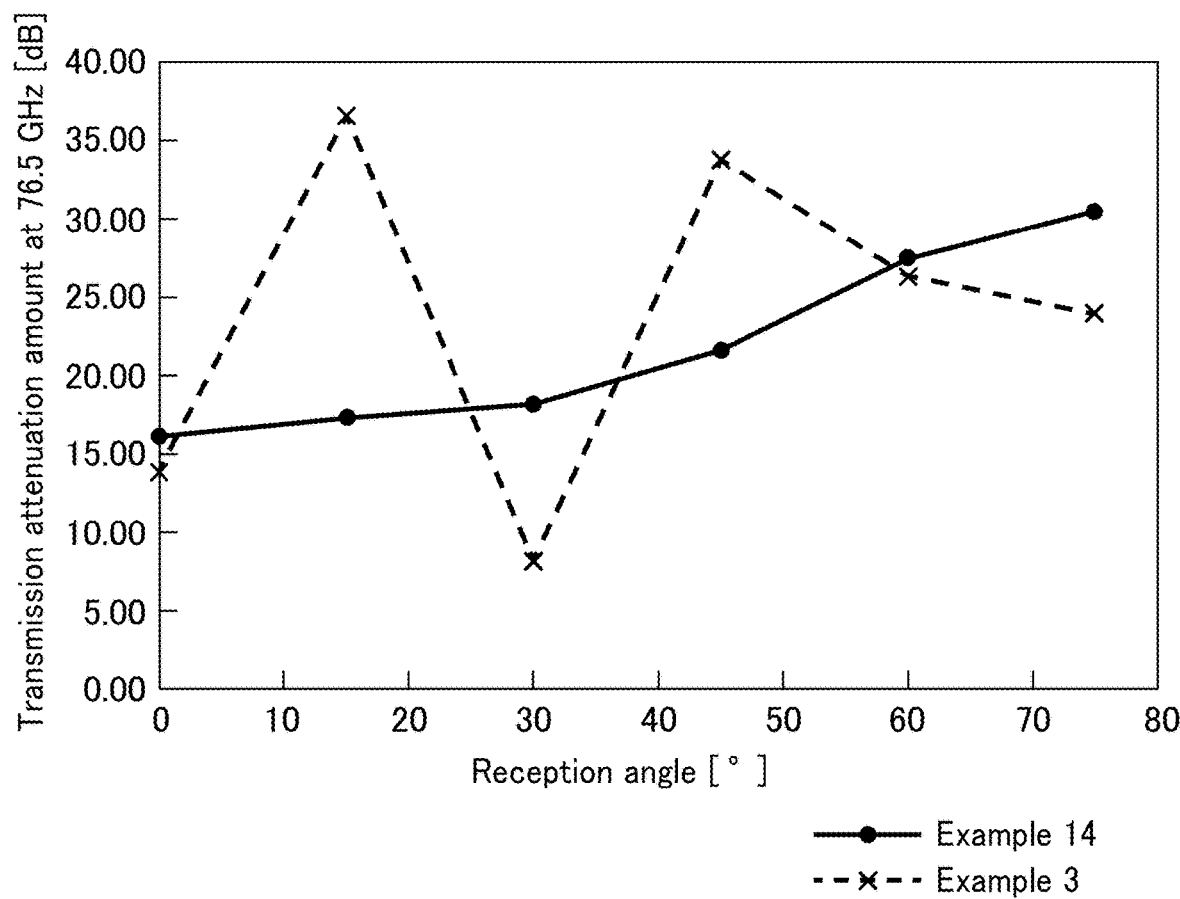
FIG. 11 shows a comparison between the samples of Examples 14 and 3 in respect of transmission attenuation amount at each angle.

Table 3 and FIG. 10 show a transmission attenuation amount at each reception angle in Example 3 and Example 14. Table 3 and FIG. 10 show: in Example 3, a transmission attenuation amount is the highest in a specific direction, namely at a reception angle of 30°, but in Example 14, a transmission attenuation amount is uniform in all directions, namely all the reception angles, without strong radio wave emission in a specific direction, which indicates the capability of effectively suppressing strong radio wave emission.

This can be understood that a configuration in which different widths are mixed in a repeating structure of a width and an interval can suppress radio waves from strengthening in a specific direction, and thereby strong radio wave emission can be effectively suppressed in every emission direction.

As in the foregoing, the present invention has been explained regarding specific embodiments by referring to the drawings, but the present invention can be modified in many ways other than the configurations described and shown in the drawings. Accordingly, the present invention should not be limited to the configurations described and shown in the drawings, and the scope of the invention should be determined exclusively by the scope of claims attached hereto and by the scope equivalent thereto.

REFERENCE SIGNS LIST

1 Radio wave scattering body
2 First principal surface
3 Second principal surface
4 Support section
5 Structure section
6 Projection
7 Hole
8 Unit structure
81 Unit structural space
83 Bottom face of unit structure
10 Radar assembly
11 Vehicle
31 Cover member
H Height of projection
W Width of projection
S Interval between projections
D Depth of hole
U Interval between holes
V Width of hole

The invention claimed is:

1. A radio wave scattering body, comprising:
a support section having a first surface and a second surface opposite the first surface, the support section being configured to transmit at least a portion of incident radio waves and to emit the transmitted radio waves in a scattering state, wherein
the support section comprises a resin composition in which a resin is a main component, and
the support section is configured to receive the portion of the incident radio waves through the first surface, to communicate the portion of the incident radio waves from the first surface through the resin composition to the second surface, and to emit the transmitted radio waves emitted from the second surface.

2. The radio wave scattering body according to claim 1, wherein the resin composition transmits at least 50% of incident radio waves perpendicular to a flat plate with a thickness of 3 mm made of the resin composition.

3. The radio wave scattering body according to claim 1 having at least two surfaces, one of the surfaces constituting a radio wave incident surface and the other constituting an emission surface, wherein a structure section causing radio wave scattering is formed on at least one of the two surfaces.

4. The radio wave scattering body according to claim 3, wherein the structure section is constituted of at least a projection and/or a hole.

5. The radio wave scattering body according to claim 4, wherein when the wavelength of an incident radio wave is $\lambda$, the height of the projection is 0.26$\lambda$ or greater, the width of the projection is 0.26$\lambda$ or greater, and the interval between the projections is 5.1$\lambda$ or less, and/or the depth of the hole is 0.26$\lambda$ or greater, the width of the hole is 5.1$\lambda$ or less, and the interval between the holes is 0.26$\lambda$ or greater.

6. The radio wave scattering body according to claim 1, wherein the resin composition has a complex relative dielectric constant and the imaginary part $\varepsilon''$ of the relative dielectric constant is 0.1 or less at any one of frequencies of from 10 to 300 GHz.

7. The radio wave scattering body according to claim 1, wherein the resin composition has a relative dielectric constant with a real part $\varepsilon'$ of 2 or greater and 4 or less at any one of frequencies of from 10 to 300 GHz.

8. A member for attenuating radio waves comprising the radio wave scattering body according to claim 1.

9. The member according to claim 8, wherein the member for attenuating radio waves is a molded body, and the radio wave scattering body according to claim 1 is formed on at least a portion of the molded body.

10. The member according to claim 8, wherein the member for attenuating radio waves is a cover member for a radar.

11. A radar assembly wherein a radar is attached to the cover member for a radar according to claim 10.

12. A bumper comprising the member for attenuating radio waves according to claim 8.

13. A vehicle comprising the member according to claim 8, the radar assembly according to claim 11, or the bumper according to claim 12.

14. A radio wave scattering body configured to transmit at least a portion of incident radio waves and to emit the transmitted radio waves in a scattering state, and comprising
a resin composition in which a resin is a main component,
wherein the resin composition transmits at least 50% of incident radio waves perpendicular to a flat plate with a thickness of 3 mm made of the resin composition.

15. The radio wave scattering body according to claim 14 having at least two surfaces, one of the surfaces constituting a radio wave incident surface and the other constituting an emission surface, wherein a structure section causing radio wave scattering is formed on at least one of the two surfaces.

16. The radio wave scattering body according to claim 15, wherein the structure section is constituted of at least a projection and/or a hole.

17. The radio wave scattering body according to claim 16, wherein when the wavelength of an incident radio wave is $\lambda$, the height of the projection is 0.26 $\lambda$ or greater, the width of the projection is 0.26 $\lambda$ or greater, and the interval between the projections is 5.1 $\lambda$ or less, and/or the depth of the hole is 0.26 $\lambda$ or greater, the width of the hole is 5.1 $\lambda$ or less, and the interval between the holes is 0.26 $\lambda$ or greater.

18. The radio wave scattering body according to claim 14, wherein the resin composition has a complex relative dielectric constant and the imaginary part $\varepsilon''$ of the relative dielectric constant is 0.1 or less at any one of frequencies of from 10 to 300 GHz.

19. The radio wave scattering body according to claim 14, wherein the resin composition has a relative dielectric constant with a real part $\varepsilon'$ of 2 or greater and 4 or less at any one of frequencies of from 10 to 300 GHz.

20. A member for attenuating radio waves comprising the radio wave scattering body according to claim 14, wherein the member for attenuating radio waves is a molded body, and the radio wave scattering body is on at least a portion of the molded body.

\* \* \* \* \*